US012631391B2

(12) United States Patent
Lee et al.

(10) Patent No.: US 12,631,391 B2
(45) Date of Patent: May 19, 2026

(54) REFRIGERATOR

(71) Applicant: LG Electronics Inc., Seoul (KR)

(72) Inventors: Hee Jun Lee, Seoul (KR); Jinho Chang, Seoul (KR); Jaehoon Shin, Seoul (KR); Jae Un Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 158 days.

(21) Appl. No.: 18/428,716

(22) Filed: Jan. 31, 2024

(65) Prior Publication Data

US 2024/0318895 A1 Sep. 26, 2024

(30) Foreign Application Priority Data

Mar. 24, 2023 (KR) ........................ 10-2023-0038917

(51) Int. Cl.
*F25D 23/02* (2006.01)
*E05F 5/06* (2006.01)

(52) U.S. Cl.
CPC .............. *F25D 23/028* (2013.01); *E05F 5/06* (2013.01); *E05Y 2900/31* (2013.01); *F25D 2323/024* (2013.01)

(58) Field of Classification Search
CPC ......... E05Y 2201/412; E05Y 2201/638; E05Y 2201/626; E05Y 2201/688; E05Y 2201/41; E05Y 2201/212; E05Y 2900/31; F25D 23/028; F25D 2323/024; F25D 23/02; F25D 23/00; E05D 11/1014; E05F 5/02; E05F 3/10; E05F 5/10; E05F 3/04; E05F 5/06
See application file for complete search history.

(56) References Cited

U.S. PATENT DOCUMENTS 3,722,937 A * 3/1973 Stoeckl .................... E05C 19/02 292/79
4,000,540 A * 1/1977 Newlon ................ E05F 1/1253 16/303
5,020,189 A * 6/1991 Grome .................. E05F 1/1253 16/72
5,522,656 A * 6/1996 Jenkins ................. E05F 1/1246 292/79
6,327,457 B1 * 12/2001 Hashimoto .......... G03G 15/605 355/75
6,415,477 B1 * 7/2002 Hosaka ................ G03G 15/605 16/284
(Continued)

FOREIGN PATENT DOCUMENTS

CN 108061423 A * 5/2018 ........... F25D 23/028
EP 1 884 614 A2 2/2008
(Continued)

*Primary Examiner* — Hiwot E Tefera
(74) *Attorney, Agent, or Firm* — Birch, Stewart, Kolasch & Birch, LLP

(57) ABSTRACT

A refrigerator includes a cabinet provided with a storage compartment; a door rotatably installed at the cabinet and configured to open and close the storage compartment; a hinge assembly configured to rotatably connect the door to the cabinet; and a damper configured to move in association with a rotation of the door, and to generate a damping force by contacting the hinge assembly. The damper is provided in such a way that the damper surface-contacts the hinge assembly.

20 Claims, 45 Drawing Sheets

(56) References Cited

U.S. PATENT DOCUMENTS

| | | | | | |
|---|---|---|---|---|---|
| 8,315,549 | B2 * | 11/2012 | Choi | H04N 1/00557 | 399/377 |
| 8,732,904 | B2 * | 5/2014 | Busch | E05F 3/104 | 16/80 |
| 9,151,101 | B2 * | 10/2015 | Lowe | E05F 5/006 | |
| 11,859,434 | B1 * | 1/2024 | Collene | E05D 3/02 | |
| 2007/0199178 | A1 * | 8/2007 | Katsumata | E05F 1/1261 | 16/286 |
| 2009/0154974 | A1 * | 6/2009 | Katsumata | G03G 21/1628 | 399/380 |
| 2013/0264930 | A1 * | 10/2013 | Kim | E05F 1/00 | 312/405 |
| 2014/0145576 | A1 * | 5/2014 | White | E05F 1/1253 | 312/319.1 |
| 2016/0201975 | A1 * | 7/2016 | Bazzucchi | A47L 15/4261 | 312/405 |
| 2016/0245579 | A1 | 8/2016 | Eom et al. | | |
| 2018/0196385 | A1 * | 7/2018 | Kondo | E05F 1/1253 | |
| 2020/0271372 | A1 * | 8/2020 | Fei | E05F 3/104 | |
| 2021/0222471 | A1 * | 7/2021 | Kobayashi | E05D 3/18 | |
| 2021/0364223 | A1 | 11/2021 | Oh et al. | | |
| 2023/0304726 | A1 * | 9/2023 | Lee | E05D 7/081 | |
| 2024/0167757 | A1 | 5/2024 | Oh et al. | | |

FOREIGN PATENT DOCUMENTS

| | | | | |
|---|---|---|---|---|
| KR | 200307798 | Y1 * | 3/2003 | E05F 3/20 |
| KR | 10-0865494 | B1 | 10/2008 | |
| KR | 10-2016-0102681 | A | 8/2016 | |

* cited by examiner

REFRIGERATOR

CROSS-REFERENCE TO RELATED APPLICATION

This application claims priority to and the benefit of Korean Patent Application No. 10-2023-0038917, filed on Mar. 24, 2023, the disclosure of which is incorporated herein by reference in its entirety.

TECHNICAL FIELD

The present invention relates to a refrigerator, and in particular, a refrigerator provided with a door for opening and closing a storage compartment in which a storage target such as a food item and the like is stored.

BACKGROUND

Refrigerators produce cold air, based on a circulation of refrigerants, and supply the cold air to a storage compartment, to keep a variety of storage targets fresh in the storage compartment for a long period of time.

A user can open and close a storage compartment formed in a main body of a refrigerator by using a door. As an example, the door may be embodied in different forms such as a rotary door that rotates around one side of the refrigerator, or a drawer door that is inserted and drawn in the front-rear direction.

The refrigerator is provided with a damper providing a damping force to the door. The damper may reduce a noise while absorbing an impact generated during opening and closing of the door.

Specifically, the damper provides a damping force to the door while the door is closed after the door is opened, to close the door smoothly and adjust the closing speed of the door.

For example, the damper may provide a damping force by using a resistant force caused by friction that is generated while a charging material such as oil or gas charging the damper passes through an orifice.

The movement of the charging material in the damper can be performed based on the reciprocation of a piston. The piston can move the charging material in the damper while reciprocating linearly in the cylinder in the damper.

Additionally, the refrigerator may be provided with a pillar. The pillar is provided to prevent the leakage of cold air in the storage compartment, and installed at one side of the door.

For example, a pair of doors is disposed at the refrigerator in the lateral direction, and opens the storage compartment while rotating in a direction where the pair of doors becomes far from each other. For example, a door disposed at the left side of the refrigerator may open and close of the left side of the storage compartment, while rotating around the end portion of the left side of the door, and a door disposed at the right side of the refrigerator may open and close the right side of the storage compartment, while rotating around the end portion of the right side of the door.

The pillar may be installed at any one of the pair of doors. Additionally, the pillar may be disposed between the pair of doors as the door is closed.

The pillar may rotate in such a way that the pillar is folded as the door is opened and unfolded as the door is closed. The pillar may be folded not to protrude in the lateral direction of the door as the door is opened, and unfolded to block a gap between the pair of doors as the door is closed.

An example of a damper installed at a refrigerator is disclosed in prior art document 1 (KR Patent Publication No. 10-2016-0102681).

Referring to FIGS. 47 and 48, the refrigerator of prior art document 1 comprises a hinge 80, a hinge cover and a damper.

The hinge 80 is provided to connect a cabinet 1 and a door 31 of the refrigerator and rotatably supports the door 31. The hinge 80 is installed at the cabinet 1. The hinge cover covers the hinge 80 and is coupled to the upper wall of the cabinet 1.

The damper 40 comprises a damper apparatus 50 and a damper housing. In the damper, the damper apparatus 50 provides a damping function substantially. Additionally, the damper housing couples the damper apparatus 50 to the hinge cover.

The damper apparatus 50 comprises a cylinder 51, a piston 60, a press rod 61 and a damping fluid.

The piston 60 moves back and forth in the cylinder 51, and the damping fluid filling the inner space of the cylinder 51 provides a damping force to the piston 60 while being pressed slowly as the piston 60 moves.

The press rod 61 connects to the piston 60 and extends up to the outside of the piston 60. The press rod 61 is a portion that is directly pressed against the door 31 as the door 31 is closed.

As the door 31 is closed, the door 31 presses the press rod 31, to move the press rod 31, and accordingly, the press rod 61 presses the piston 60 while moving toward the inside of the cylinder 51.

The piston 60 presses the damping fluid in the cylinder 51, while being moved by the press rod 61. As described above, the damping fluid pressed by the piston 60 is slowly pressed, and accordingly, the damper apparatus 50 provides a damping force.

The door 31 comprises a thermal insulation material for thermally insulating the storage compartment, and a door guard storing a food item may be provided on the rear surface of the door 31. The door 31 weighs significantly because of food items stored in the door guard and the thermal insulation material.

Due to the weight of the door 31, a significant impact may be applied to the press rod 61 that directly contacts the door 31 as the door 31 is closed.

The door 31 may be provided with a press roller part 36. The press roller part 36 may press the press rod 61 gently as the door 31 is closed, and accordingly, an impact applied to the press rod 61 may decrease as the door 31 is closed.

In the refrigerator of prior art document 1, the damper is coupled to a hinge cover 95 installed in the cabinet 1. Accordingly, the damper of prior art document 1 is a component installed in the cabinet 1.

The damper installed in the cabinet 1, as described above, generates a damping force by contacting the door 31 provided with the press roller part 36.

At least a portion of the damper must protrude to the front of the cabinet 1 toward the door 31 while protruding to the front of the cabinet 1.

The damper of prior art document 1 is coupled to the hinge cover 95 disposed further upward than the cabinet 1, and must be disposed at a position protruding upward from the cabinet 1.

Additionally, to avoid the hinge 80, the damper of prior art document 1 needs to be disposed at a position more eccentric to a central portion of the cabinet 1 in the lateral direction thereof than the position of the hinge 80. Accordingly, the damper is disposed at a position that is noticed readily.

That is, the damper of prior art document 1 is disposed at a position where the damper is exposed to the front of the cabinet 1 in the front-rear direction, at a position where the damper is exposed to the upper portion of the cabinet 1 in the up-down direction, at a position where the damper is eccentric to a central portion of the cabinet 1 in the lateral direction thereof than the hinge 80 in the lateral direction, and the like. Thus, the damper must be disposed at a position that is noticed readily.

In prior art document 1, the hinge cover 95 is necessary for installation of the damper. In prior art document 1, the hinge cover 95 covers the damper not to expose the damper to the outside as well as coupling the damper to the cabinet 1.

However, since the hinge cover 95 is provided as a structure protruding in the forward and upward directions of the cabinet 1, the entire size of a refrigerator only increases due to the hinge cover 95 without an increase in the capacity of a storage compartment, and the aesthetic qualities of the entire appearance of the refrigerator deteriorate due to the hinge cover 95.

SUMMARY

Technical Problems

The objective of the present invention is to provide a refrigerator having an improved structure in which components in relation to a damping function do not cause deterioration in the aesthetic qualities of the appearance of the refrigerator.

Another objective of the present invention is to provide a refrigerator having an improved structure in which components in relation to a damping function are protected from wear and damage.

Another objective of the present invention is to provide a refrigerator having an improved structure in which the durability of components in relation to a damping function improves.

Yet another objective of the present invention is to provide a refrigerator having an improved structure in which the generation of noise caused by components in relation to a damping function is suppressed.

Technical Solutions

The invention is specified by the independent claim. Preferred embodiments are defined by the dependent claims. In one aspect, a refrigerator comprises a hinge assembly rotatably connecting a door to a cabinet, and a damper generating a damping force by contacting the hinge assembly, and the hinge assembly is provided with a damper contact part formed in such a way that the damper contact part surface-contacts a contact end provided at one side of the damper.

In another aspect, a refrigerator comprises a hinge configured to rotatably connect a door to a cabinet, a hinge case configured to accommodate at least a portion of the hinge, and a damper configured to generate a damping force by contacting the hinge case, and the hinge case is provided with a damper contact part formed to allow the hinge case and the damper to surface-contact each other.

In another aspect, a refrigerator comprises a hinge configured to rotatably connect a door to a cabinet, a hinge case configured to accommodate at least a portion of the hinge, and a damper configured to generate a damping force by contacting the hinge case, and the hinge assembly is provided with a damper contact part formed in such a way that the damper contact part surface-contacts a contact end provided at one side of the damper, and the contact end and the damper contact part respectively form a planar surface side by side.

A refrigerator in one aspect may comprise a cabinet provided with a storage compartment; a door rotatably installed at the cabinet and configured to open and close the storage compartment; a hinge assembly configured to rotatably connect the door to the cabinet; and a damper configured to move in association with a rotation of the door and to generate a damping force by contacting the hinge assembly.

Preferably, the damper contacting the hinge assembly may have a contact end, at one side thereof, and the hinge assembly may be provided with a damper contact part formed in such a way that the damper contact part surface-contacts the contact end.

The hinge assembly may comprise a hinge which is fixed to the cabinet and to which the door connects rotatably, and a hinge case which accommodates at least a portion of the hinge and is coupled to the hinge or the cabinet.

Preferably, the damper contact part is formed at the hinge case.

The hinge case may comprise a cover upper surface disposed at an upper side of the hinge, and a cover lateral surface configured to connect between the hinge and the cover upper surface in an up-down direction.

Preferably, the damper contact part is disposed on the cover lateral surface.

Preferably, the damper contact part is concavely formed on the cover lateral surface in a lateral direction.

Preferably, the damper contact part forms a planar surface depressed on the cover lateral surface in a lateral direction.

The cover lateral surface may form an inclination surface extending in a direction between a second direction across the first direction and the first direction, while connecting between a rotation center of the door and the cabinet in a first direction.

Preferably, the damper contact part may form an inclination surface having a different gradient from the cover lateral surface.

The cover lateral surface and the damper contact part may respectively form an inclination surface that extends in such a way that the cover lateral surface and the damper contact part become far away from the rotation center of the door as the cover lateral surface and the damper contact part become close to the cabinet in the first direction.

Preferably, the damper contact part may form an inclination surface that inclines further in the second direction than the cover lateral surface.

The damper may comprise a fixation part fixed to the door, and a movement part movably installed in the fixation part.

Preferably, the damper generates a damping force as the movement part moves while contacting the damper contact part, and the damper contact part forms a planar surface crossing a direction in which the movement part moves.

Preferably, the movement part has a contact end contacting the damper contact part, at an end portion thereof, and the damper contact part forms a surface parallel with the connect end.

The hinge assembly may further comprise a reinforcement member configured to connect to the damper contact part and to support the damper contact part.

Preferably, in a state where the contact end contacts a surface of the damper contact part, the damper is pressed by the hinge assembly, and the reinforcement member connects to a back surface of the damper contact part.

Preferably, the damper contact part is formed at the hinge case, the damper contacts the damper contact part, outside the hinge case, and the reinforcement member is disposed in the hinge case.

Preferably, the damper contact part is formed at the hinge case, and the reinforcement member is coupled to the hinge.

Preferably, the hinge and the reinforcement member are made of a material having greater strength than a material of the hinge case.

The reinforcement member may comprise a first reinforcement part coupled to the hinge case while contacting the damper contact part; and a second reinforcement part connected to the first reinforcement part and coupled to the hinge.

Preferably, the first reinforcement part forms a surface parallel with the damper contact part, and the second reinforcement part forms a surface extending in a different direction from the first reinforcement part and connects to the first reinforcement part.

Advantageous Effects

According to the present invention, the refrigerator is provided with a door assembly that remains hidden at a position hardly seen while providing a damping force needed to adjust the rotation speed of a door effectively, thereby ensuring improvement in a quality feeling and exterior of the refrigerator effectively.

According to the present invention, since a damper contact part is concavely provided on the lateral surface of a hinge case, a damper assembly and a hinge assembly surface-contact each other, thereby concentrating a pressing force on a certain portion and suppressing damage to the damper assembly and the hinge assembly.

According to the present invention, while the damper assembly and the hinge assembly surface-contact each other, a reinforcement member installed in the hinge case improves the strength of the damper contact part, thereby protecting the hinge case from damage effectively.

According to the present invention, the damper assembly installed between a cabinet and a door does not form a structure protruding from the door or the cabinet and the like, thereby protecting the damper assembly effectively from damage caused by a collision with another object.

According to the present invention, a slide distance of the damper assembly, which is required until a door is closed completely, decreases, thereby suppressing the wear of the damper assembly and the hinge assembly and improving their durability.

According to the present invention, a slide distance of the damper assembly, which is required until a door is closed completely, decreases, and accordingly, the time for which the damper assembly and the hinge assembly contact each other decreases, thereby suppressing the generation of noise caused by contact between the damper assembly and the hinge assembly effectively.

BRIEF DESCRIPTION OF DRAWINGS

The accompanying drawings constitute a part of the specification, illustrate one or more embodiments in the invention, and together with the specification, explain the invention, wherein.

DETAILED DESCRIPTION

Figure 1:
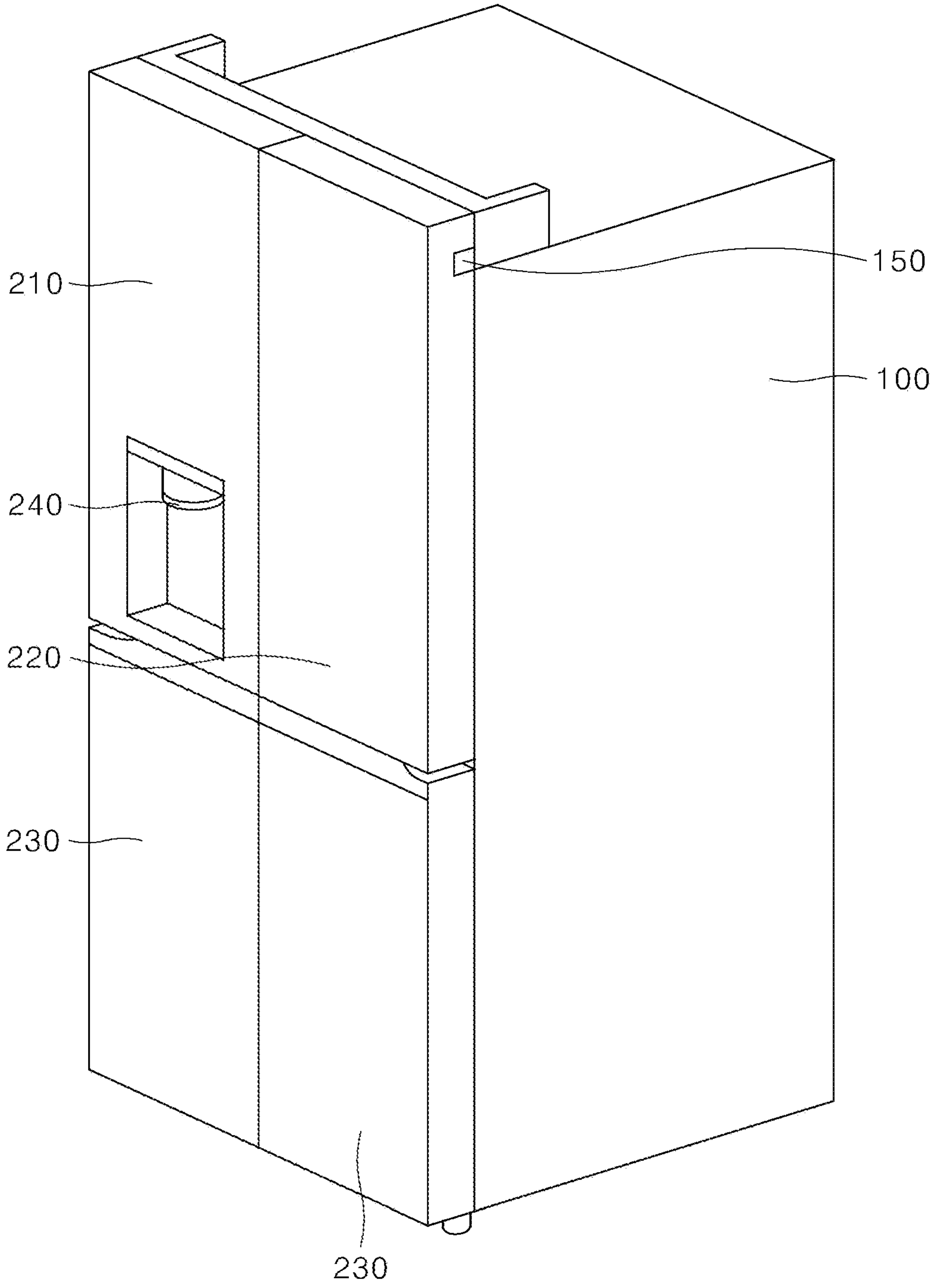
FIG. 1 is a perspective view of a refrigerator of a first embodiment.

The above-described aspects, features and advantages are specifically described hereafter with reference to accompanying drawings such that one having ordinary skill in the art to which the invention pertains can embody the technical scope of the invention easily. In the invention, detailed description of known technologies in relation to the subject matter of the invention is omitted if it is deemed to make the gist of the invention unnecessarily vague. Hereafter, preferred embodiments according to the invention are specifically described with reference to the accompanying drawings. In the drawings, identical reference numerals can denote identical or similar components.

The terms “first”, “second” and the like are used herein only to distinguish one component from another component. Thus, the components are not to be limited by the terms. Certainly, a first component can be a second component, unless stated to the contrary.

Embodiments are not limited to the embodiments set forth herein, and can be modified and changed in various different forms. The embodiments in the invention are provided such that the invention can be through and complete and fully convey its scope to one having ordinary skill in the art. Accordingly, all modifications, or replacements as well as a replacement of the configuration of any one embodiment with the configuration of another embodiment or an addition of the configuration of any one embodiment to the configuration of another embodiment, within the technical scope of the invention, are to be included in the scope of the invention.

The accompanying drawings are provided for a better understanding of the embodiments set forth herein and are not intended to limit the technical scope of the invention. It is to be understood that all the modifications, or replacements within the technical scope of the invention are included in the scope of the invention. The sizes or thicknesses of the components in the drawings are exaggerated or reduced to ensure ease of understanding and the like. However, the protection scope of the subject matter of the invention is not to be interpreted in a limited way.

The terms in the invention are used only to describe specific embodiments or examples and not intended to limit the subject matter of the invention. In the invention, singular forms include plural forms as well, unless explicitly indicated otherwise. In the invention, the terms “comprise”, “comprised of” and the like specify the presence of stated features, integers, steps, operations, elements, components or combinations thereof but do not imply the exclusion of the presence or addition of one or more other features, integers, steps, operations, elements, components or combinations thereof.

The terms “first”, “second” and the like are used herein only to distinguish one component from another component, and the components are not to be limited by the terms.

When any one component is described as “connected” or “coupled” to another component, any one component can be directly connected or coupled to another component, but an additional component can be “interposed” between the two components or the two components can be “connected” or “coupled” by an additional component. When any one component is described as “directly connected” or “directly coupled” to another component, an additional component cannot be “interposed” between the two components or the two components cannot be “connected” or “coupled” by an additional component.

When any one component is described as being “on (or under)” another component, any one component can be directly on (or under) another component, and an additional component can be interposed between the two components.

Unless otherwise defined, all the terms including technical or scientific terms used herein have the same meaning as commonly understood by one having ordinary skill in the art. Additionally, terms such as those defined in commonly used dictionaries are to be interpreted as having a meaning that is consistent with their meaning in the context of the relevant art, and unless explicitly defined herein, are not to be interpreted in an ideal way or an overly formal way.

In the state where a refrigerator stands on the floor, a direction in which a door is installed with respect to the center of the refrigerator is defined as a forward direction. Accordingly, a direction toward the inside of the refrigerator with the door open is defined as a rearward direction. For convenience, the forward direction and the rearward direction can be referred to as a first direction. Then the forward direction is referred to as one direction of the first direction, and the rearward direction is referred to as the other direction of the first direction.

Additionally, a gravitational direction can be defined as a downward direction, and a direction opposite to the gravitational direction can be defined as an upward direction.

Further, a horizontal direction across a front-rear direction of the refrigerator, i.e., a widthwise direction of the refrigerator that is seen in front of the door of the refrigerator, can be referred to as a left-right direction. For convenience, the left-right direction can be referred to as a second direction. The right side can be referred to as one direction of the second direction, and the left side can be referred to as the other direction of the second direction.

Further, the widthwise direction of the refrigerator can also be referred to as a lateral direction. The right side can also be referred to as one side of the lateral direction, and the left side can be referred to the other side of the lateral direction.

Additionally, an up-down direction can be referred to as a third direction. An upward direction can be referred to as one direction of the third direction, and a downward direction can be referred to as the other direction of the third direction.

Furthermore, the up-down direction can be referred to as a vertical direction. The front-rear direction and the left-right direction, i.e., the first direction and the second direction, can be referred to as the horizontal direction.

Throughout the invention, the terms "A and/or B" as used herein can denote A, B or A and B, and the terms "C to D" can denote C or greater and D or less, unless stated to the contrary.

[Entire Structure of Refrigerator]

Figure 2:
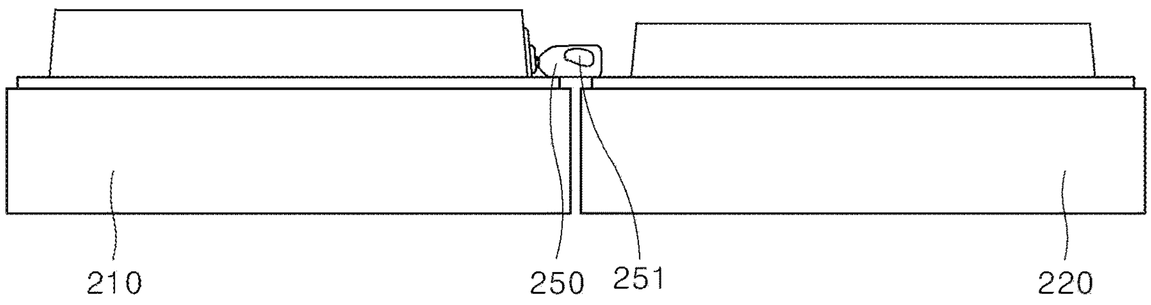
FIG. 2 is a plan view of the refrigerator illustrated in FIG. 1.
Figure 3:
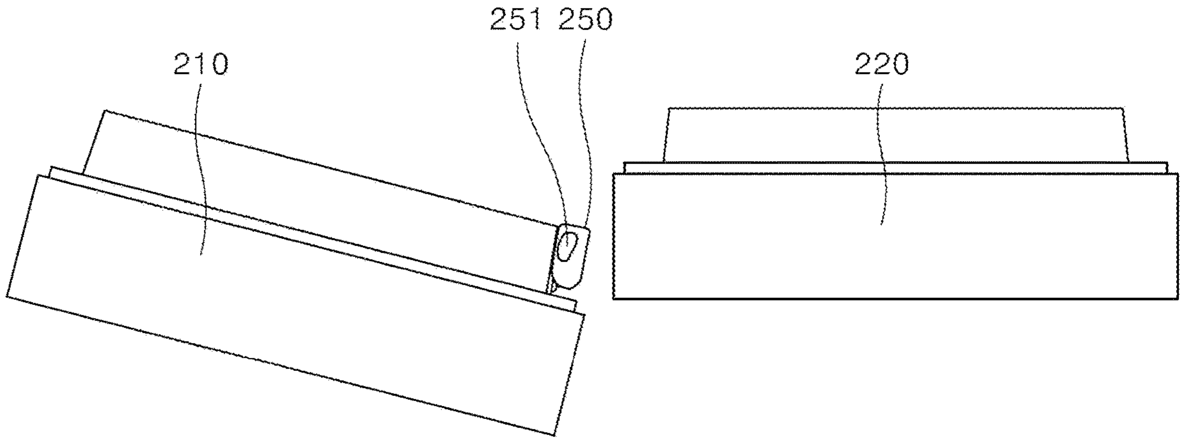
FIG. 3 is a plan view of the refrigerator illustrated in FIG. 2 with a door open.
Figure 4:
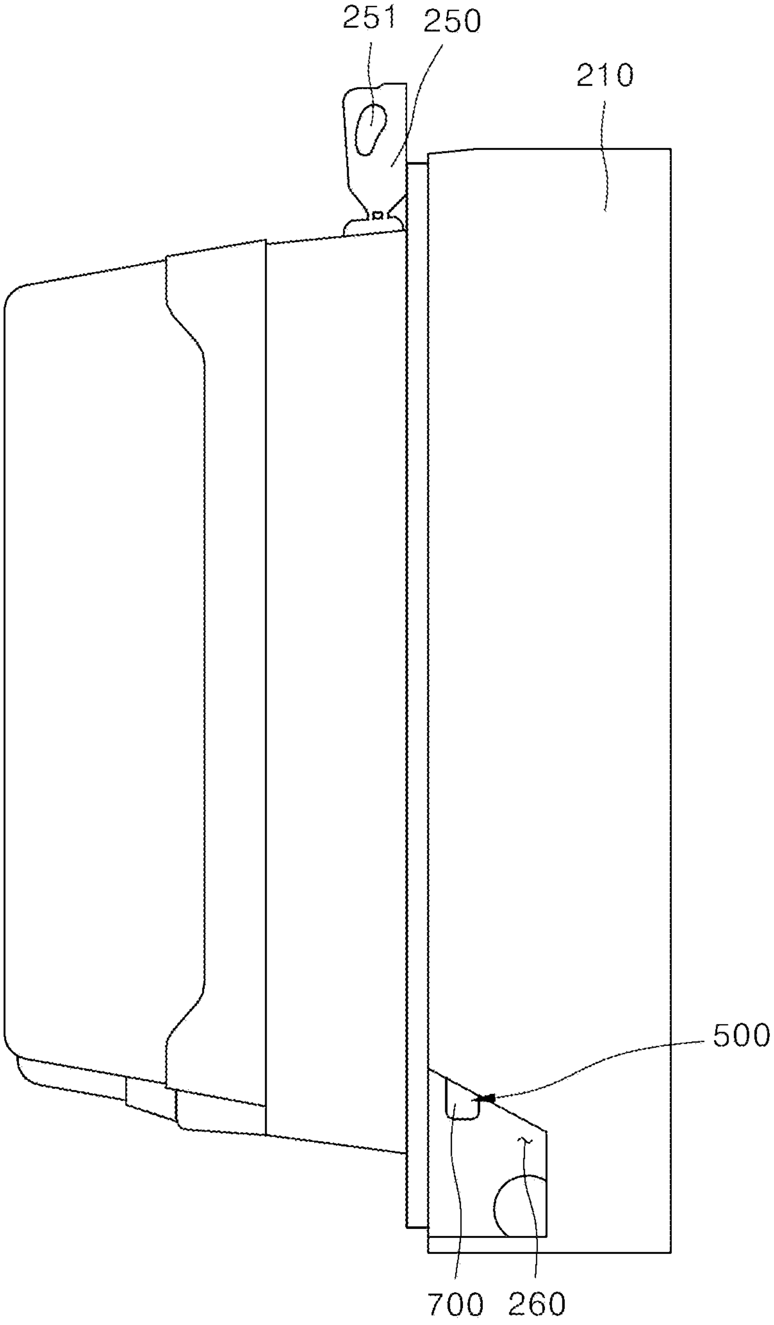
FIG. 4 is a plan view of a portion of a door separate from the refrigerator illustrated in FIG. 1.

FIG. 1 is a perspective view of a refrigerator of a first embodiment, and FIG. 2 is a plan view of the refrigerator illustrated in FIG. 1. Additionally, FIG. 3 is a plan view of the refrigerator illustrated in FIG. 2 with a door open, and FIG. 4 is a rear perspective view of a portion of the refrigerator illustrated in FIG. 1.

Referring to FIGS. 1 and 2, the exterior of a refrigerator 1 may be formed by a cabinet 100 and a door 210, 220, 230.

The cabinet 100 may have one or more of storage compartments therein, as a storage space of the refrigerator 1. An open front surface of the cabinet 100 may be opened and closed by one or more of doors 210, 220, 230.

The cabinet 100 may comprise an outer case, and an inner case coupled to the inside of the outer case.

The cabinet 100 may be shaped into a box the front surface of which is open. The inner portion of the cabinet 100 may be divided into one or more of storage spaces, and comprise a refrigerator compartment and/or a freezer compartment.

For example, an upper storage compartment opened and closed by a pair of upper doors 210, 220 may be provided in the upper portion of the cabinet 100. Additionally, a lower storage compartment opened and closed by a pair of lower doors 230 may be provided in the lower portion of the cabinet 100.

In the embodiment, a bottom freeze refrigerator is described as an example, and the bottom freeze refrigerator has a refrigerator compartment in the upper portion thereof and has a freezer compartment in the lower portion thereof, as storage compartments in the cabinet 100.

However, the subject matter of the present invention is not limited to the above-described refrigerator, and may comprise various types of refrigerators such as a top freezer refrigerator in which a freezer compartment is mounted on a refrigerator compartment, and a side-by-side refrigerator in which a freezer compartment and a refrigerator compartment are partitioned at the left/right side, and the like.

The door 210, 220, 230 may comprise an upper door 210, 220 and a lower door 230. That is, for the refrigerator of the embodiment, a door 210, 220 for opening and closing the upper storage compartment and a door 230 for opening and closing the lower storage compartment may be provided separately. Further, the door 210, 220 for opening and closing the upper storage compartment and the door 230 for opening and closing the lower storage compartment may be provided in such a way that the doors are divided into a left door and a right door.

However, the subject matter of the present invention may not be limited and may comprise refrigerators provided with various types of doors such as a refrigerator provided with one door for opening and closing a freezer compartment and one door for opening and closing a refrigerator compartment, a refrigerator provided with any one of a door for opening and closing a freezer compartment and a door for opening and closing a refrigerator compartment in such a way that any one door is divided into a left door and a right door, a refrigerator provided with a door for opening and closing a freezer compartment and a door for opening and closing a refrigerator compartment in such a way that the doors are rotatably mounted, a refrigerator provided with a door for opening and closing a freezer compartment and a door for opening and closing a refrigerator compartment in such a way that any one of the doors is mounted to be drawn in the front-rear direction, and the like.

As an example, a first door 210 and a second door 220, as a pair of upper doors 210, 220, may be rotary doors that are rotatably coupled to a pair of hinge assemblies 150 installed respectively at both sides of the cabinet 100. The pair of upper doors 210, 220 may be divided into a first door 210 at the left side of the cabinet, and a second door 220 at the right side of the cabinet.

The pair of upper doors 210, 220, as described above, may open the storage compartment by rotating in a direction where the pair of upper doors 210, 220 becomes far away from each other, while respectively rotating in the lateral direction. For example, the first door 210 disposed at the left side of the refrigerator may open and close the left side of the storage compartment, while rotating around the left end portion of the refrigerator, and the second door 220 disposed at the right side of the refrigerator may open and close the right side of the storage compartment while rotating around the right end portion of the refrigerator.

Additionally, the lower door 230 may also be a rotary door, but not limited. As another example, the lower door 230 may be a drawer door that opens and closes the storage compartment in a sliding manner.

Further, a dispenser 240 may be mounted on any one of the first door 210 and the second door 220. The dispenser 240 may be provided to allow the user to take out drinking water and ice outside the storage compartment of the refrigerator.

In the bottom freezer refrigerator, the upper storage compartment and the lower storage compartment may be divided by a horizontal separation wall disposed between the upper storage compartment and the lower storage compartment. Further, a left space and a right space in the lower storage compartment may be divided by a perpendicular separation wall disposed in the lower storage compartment.

The left space of the lower storage compartment may be opened and closed by the lower door 230 disposed at the left side of the lower storage compartment, and the right space of the lower storage compartment may be opened and closed by the lower door 230 disposed at the right side of the lower storage compartment. That is, the lower door 230 may be provided in such a way that the lower door 230 opens and closes each independent storage space individually.

In the bottom freezer refrigerator, a perpendicular separation wall may not be disposed in the upper storage compartment. That is, in the bottom freezer refrigerator, the left space and the right space in the upper storage compartment may connect as one space without separating into separate spaces.

Since the left space and the right space in the upper storage compartment connect as one space as described above, the upper storage compartment may provide a storage space having a wide entrance and large volume.

However, unless a perpendicular separation wall is not disposed in the upper storage compartment, the airtight performance of the refrigerator may deteriorate while a portion of the upper door 210, 220 does not contact the front surface of the cabinet 100.

For example, in the case where a perpendicular separation wall is disposed in the upper storage compartment, cold air may leak through a gap between the first door 210 and the second door 229 that are blocked by the perpendicular separation wall.

In view of this example, a pillar 205 may be installed at the upper door 210, 220. In this embodiment, the pillar 205 is installed at the first door 210, for example.

The pillar 15 may be installed in a lateral portion of the first door 210, preferably, at one side of the first door 210, which faces the second door 220. The pillar 205 may be provided in such a way that the pillar extends in the up-down direction along one side of the first door 210.

The pillar 205, as illustrated in FIG. 2, may remain unfolded in a state where the first door 210 is closed. The unfolded pillar 205 may be disposed between the front surface of the cabinet 100 and the upper door 210, 220 to block between the front surface of the cabinet 100 and the upper door 210, 220 and block a gap between the first door 210 and the second door 220.

The pillar 205, which is unfolded with the upper door 210, 220 closed and blocks a gap between the first door 210 and the second door 220 as described above, may prevent cold air from leaking through the gap between the upper doors 210, 220.

As the first door 210 is opened, the pillar 205 may rotate to be folded toward one side of the first door 210 (see FIG. 3). As the first door 210 is closed, the pillar 205 may rotate to be unfolded (see FIG. 2).

As an example, the pillar 205 may rotate based on an interaction between a cam of a pillar rotation member installed at the upper end of the cabinet 100 and a pillar cam 206 formed at the upper end of the pillar 205.

Additionally, the refrigerator 1, as illustrated in FIGS. 1 and 4, may be provided with a damper assembly 500 that provides a damping force to at least any one of the first door 210 and the second door 220.

In this embodiment, the damper assembly 500 is mounted respectively at the first door 210 and the second door 220, for example.

The damper assembly 500 provides a damping force respectively to the first door 210 and the second door 220 while the first door 210 and the second door 220 are closed, to close the first door 210 and the second door 220 smoothly and reduce a bounce of the first door 210 and the second door 220.

In this embodiment, the structure and operation of the damper assembly 500 are described, in the case where the damper assembly 500 is mounted on the first door 210, for example.

[Installation Structure of Damper Assembly]

Figure 5:
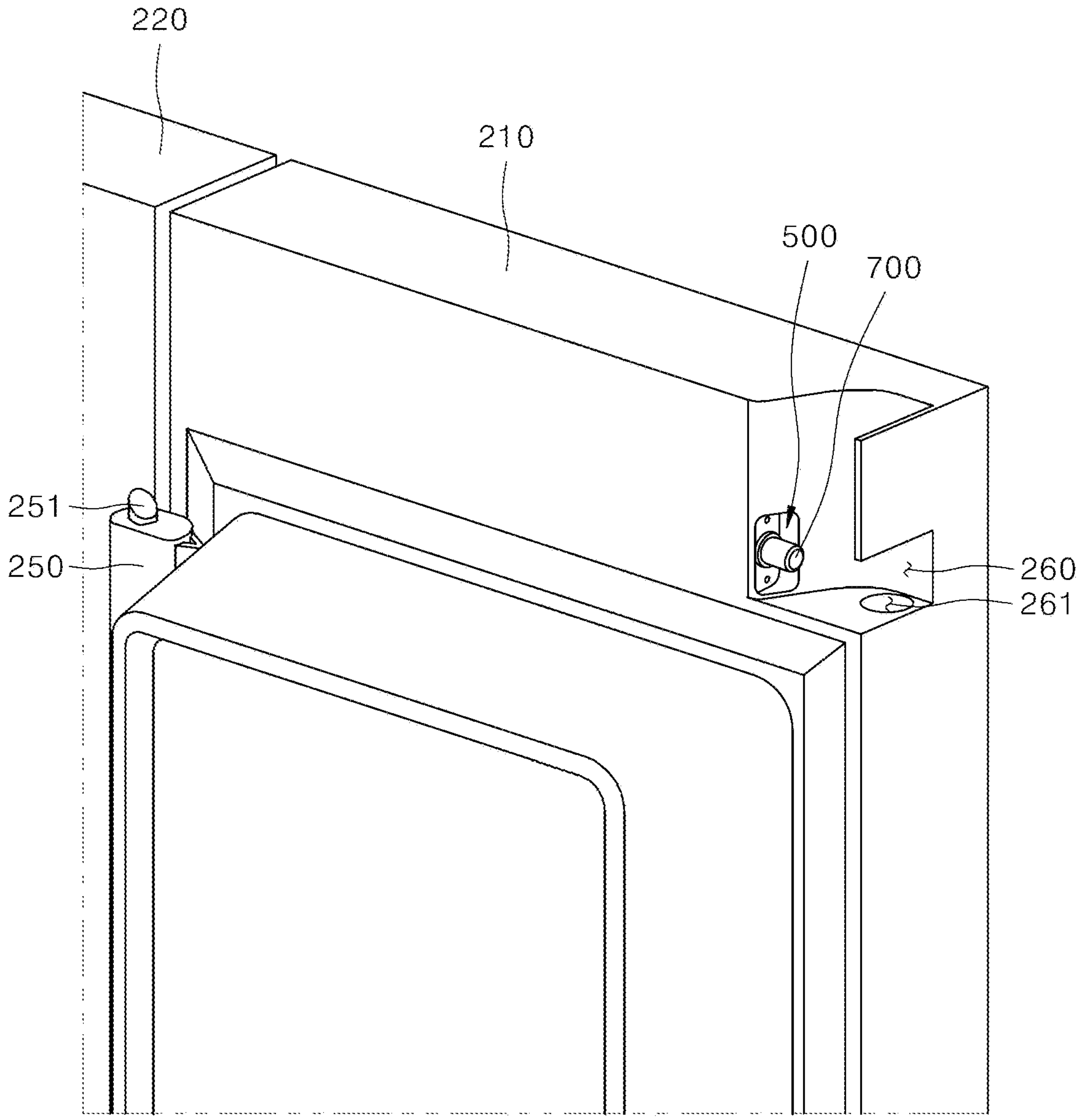
FIG. 5 is a perspective view of the rear surface of the door illustrated in FIG. 4.
Figure 6:
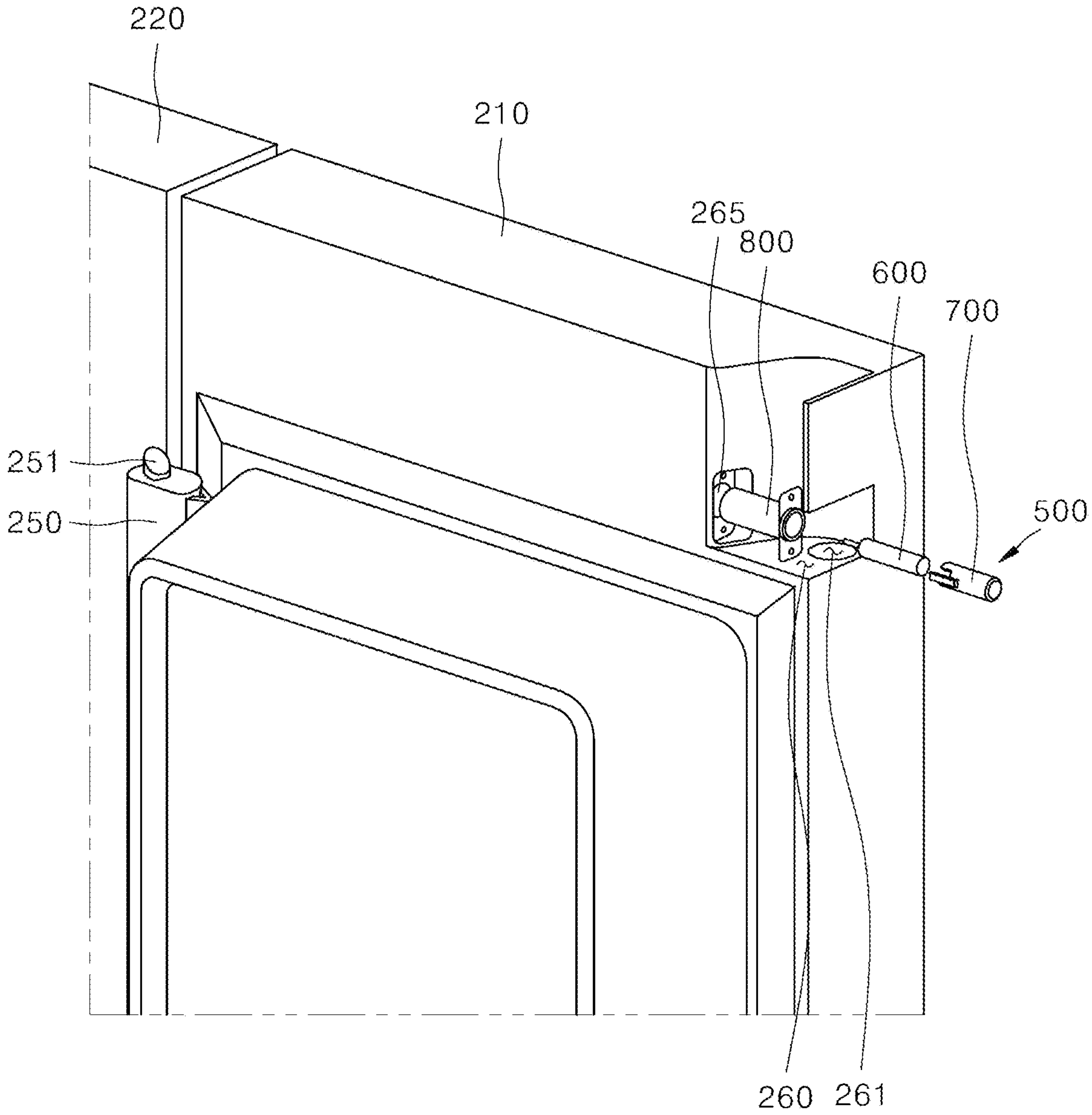
FIG. 6 is an exploded perspective view of an exploded state of a damper assembly illustrated in FIG. 5.

FIG. 5 is a perspective view of the rear surface of a door illustrated in FIG. 4, and FIG. 6 is an exploded perspective view of an exploded state of a damper assembly illustrated in FIG. 5.

Referring to FIGS. 4 to 6, the first door 210 and the second door 220 may have a hinge mounting space 260, respectively. The hinge mounting space 260 may be disposed respectively at one side of the upper area of the first door 210 and at one side of the upper area of the second door 220, while being formed respectively on the rear surface of the first door 210 and the rear surface of the second door 220.

A hinge assembly 150 may be inserted into the hinge mounting space 260. Additionally, a hinge mounting part 261 may be formed in each hinge mounting space 260. A hinge shaft provided at the hinge assembly 150 may be mounted on the hinge mounting part 261 to provide a rotation axis for rotation of the first door 210 or the second door 220.

That is, while at least a portion of the hinge assembly 150 may be inserted into the hinge mounting space 260, the hinge assembly 150 may connect to the first door 210, and the first door 210 may be rotatably installed at the cabinet 100 through the hinge assembly 150.

The hinge mounting space 260 may be disposed at a position near a lateral surface of the cabinet 100, and may be large enough for the hinge assembly 150 to be inserted and operate.

In this embodiment, the damper assembly 500 is installed at the first door 210 and the second door 220 respectively, for example. Hereinafter, the installation structure of the damper assembly 500 is described in the case where the damper assembly 500 is installed at the first door 210, for example. However, particulars in relation to this may also be applied in the same way in the case where the damper assembly 500 is installed at the second door 220.

In this embodiment, the damper assembly 500 may be installed in the hinge mounting space 260. To this end, a damper assembly mounting part 265 may be formed in the hinge mounting space 260.

The damper assembly mounting part 265 may form a space into which at least a portion of the damper assembly 500 is inserted, in the first door 210. The damper assembly mounting part 265 may be formed in such a way that the damper assembly mounting part 265 is depressed in the horizontal direction toward the inside of the first door 210, in the hinge mounting space 260.

The damper assembly 500 may be inserted into the damper assembly mounting part 265 in the horizontal direction, and fixed to the first door 210. The damper assembly mounting part 265 may be depressed in the lateral direction, while being depressed toward the inside of the first door 210.

The damper assembly 500 mounted on the damper assembly mounting part 265 formed as described above may be disposed on the first door 210 in the horizontal direction.

At least a portion of the damper assembly 500 disposed as described above may protrude from the damper assembly mounting part 265 in the lateral direction. Although a portion of the damper assembly 500 protrudes from the damper assembly mounting part 265 in the lateral direction, any portion of the damper assembly 500 does not protrude to the outside of the first door 210, and the entire damper assembly 500 may be disposed in the inner area of the first door 210.

A counterpart structure contacting the damper assembly 500 mounted on the first door 210 may be the hinge assembly 150 disposed at an edge side connecting between the front surface of the cabinet 100 and a lateral surface of the cabinet 100. That is, the damper assembly 500 of this embodiment may generate a damping force while contacting the hinge assembly 150.

Accordingly, based on contact between the damper assembly 500 and the hinge assembly 150, a portion of the damper assembly 500 moves, such that the damper assembly 500 generates a damping force.

The damper assembly 500 may be installed in the lateral direction at the first door 210 that is a structure making a rotation. That is, the damper assembly 500 may be installed in the lateral direction at the first door 210, in such a way that a movement axis of the damper assembly 500 is disposed in the lateral direction.

For example, the damper assembly 500 may be installed at the first door 210 in such a way that the major axis of the damper assembly 500 extends in the lateral direction, while the minor axis of the damper assembly 500 is disposed in the front-rear direction. The damper assembly 500 installed in the lateral direction may generate a damping force by contacting the hinge assembly 150 disposed at the lateral portion of the first door 210.

At this time, a force applied based on a rotation of the first door 210, i.e., a force acting in a direction parallel with the direction in which the first door 210 rotates, is applied to the damper assembly 500. Because of the force acting in the above-described direction, a force acting in the front-rear direction is applied to the damper assembly 500.

The force applied in the front-rear direction is applied as a force in a direction across the movement axis of the damper assembly 500. Accordingly, a side force acting in the lateral direction of the damper assembly 500, as well as a force applied in the lengthwise direction of the damper assembly 500, may be applied to the damper assembly 500.

In particular, in the case where the damper assembly 500 is installed in the hinge mounting space 260, the damper assembly 500 is disposed within a relatively small radius of gyration as the first door 210 and the second door 220 rotate. Accordingly, a greater side force may be applied to the damper assembly 500.

Considering this, the damper assembly 500 in this embodiment may further comprise a damper cover 700 and a damper case 800 in addition to a damper 600.

The damper cover 600 and the damper case 800 may protect the damper 600 from damage caused by a side force applied to the damper assembly 500, and assist with the movement of the damper 600 such that the damper assembly 500 may smoothly move linearly.

Hereinafter, the structure and operation of the damper assembly 500 comprising the damper cover 700 and the damper case 800 are described specifically.

[Schematic Structure of Damper Assembly]

Figure 7:
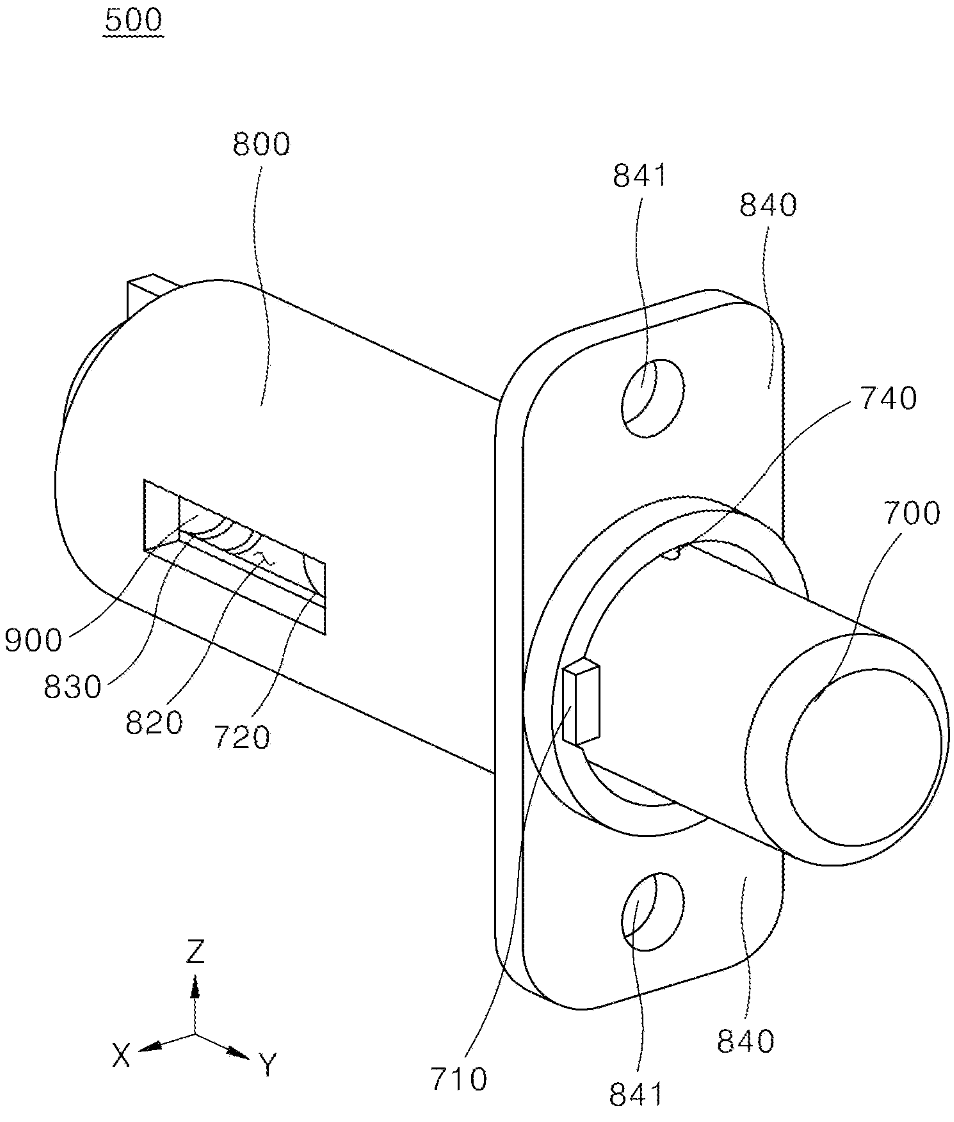
FIG. 7 is a perspective view separately showing the damper assembly illustrated in FIG. 5.
Figure 8:
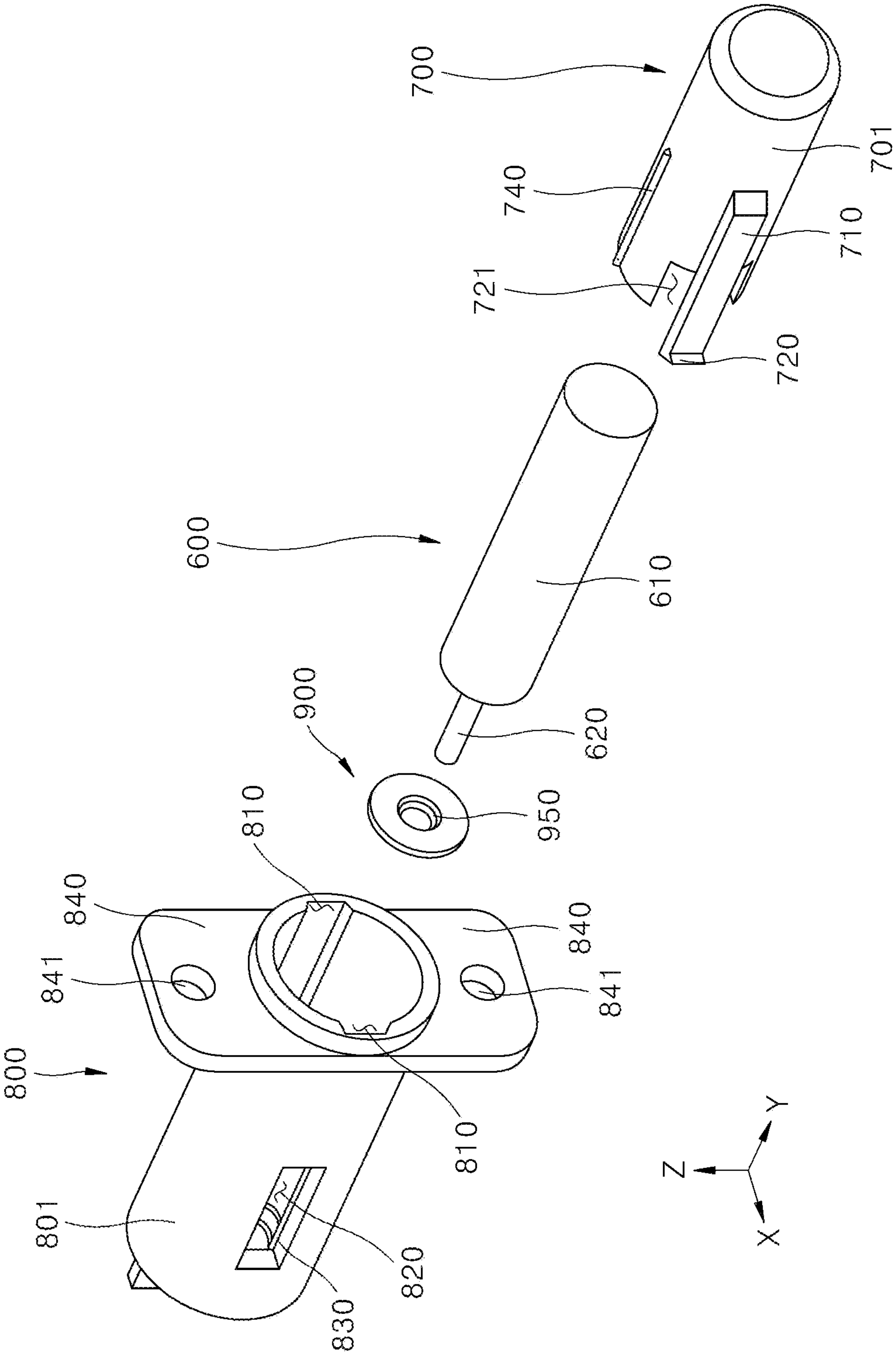
FIG. 8 is an exploded perspective view of an exploded state of the damper assembly illustrated in FIG. 7.
Figure 9:
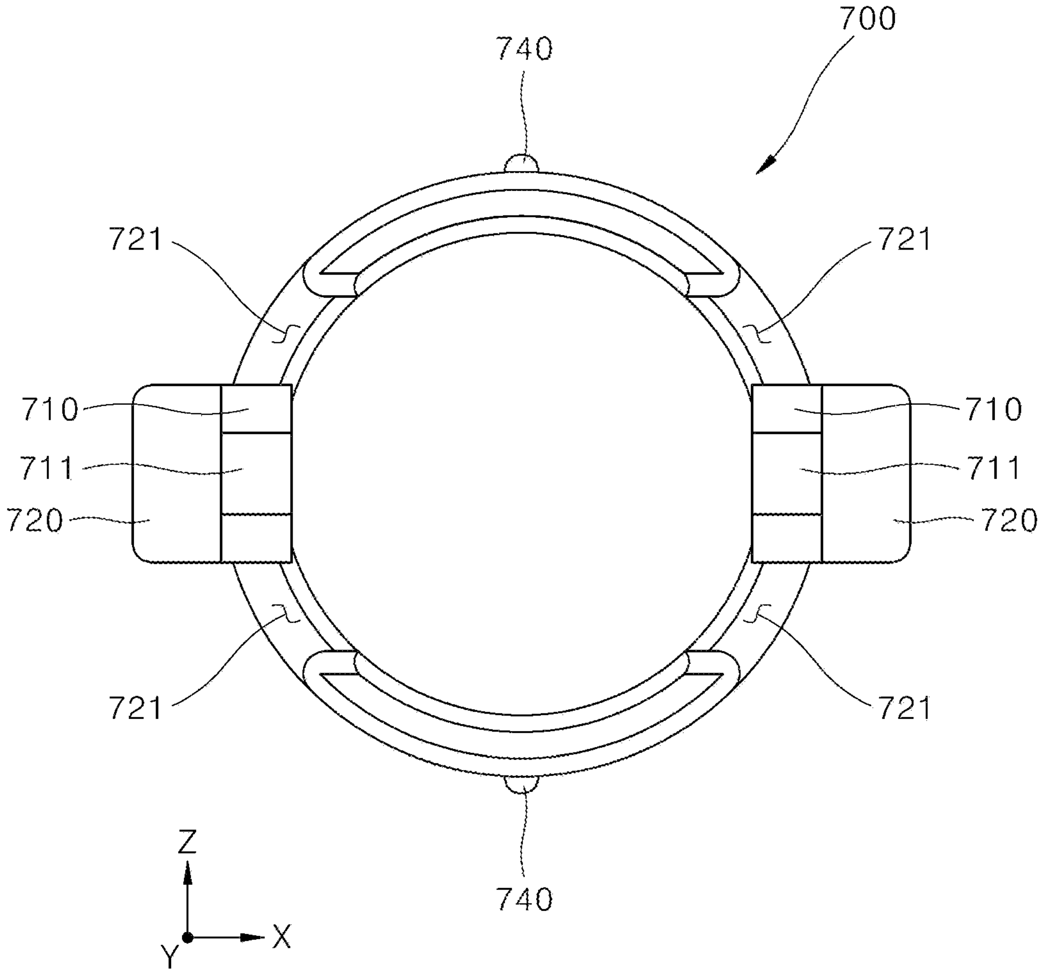
FIG. 9 is a rear view of a damper cover illustrated in FIG. 8.
Figure 10:
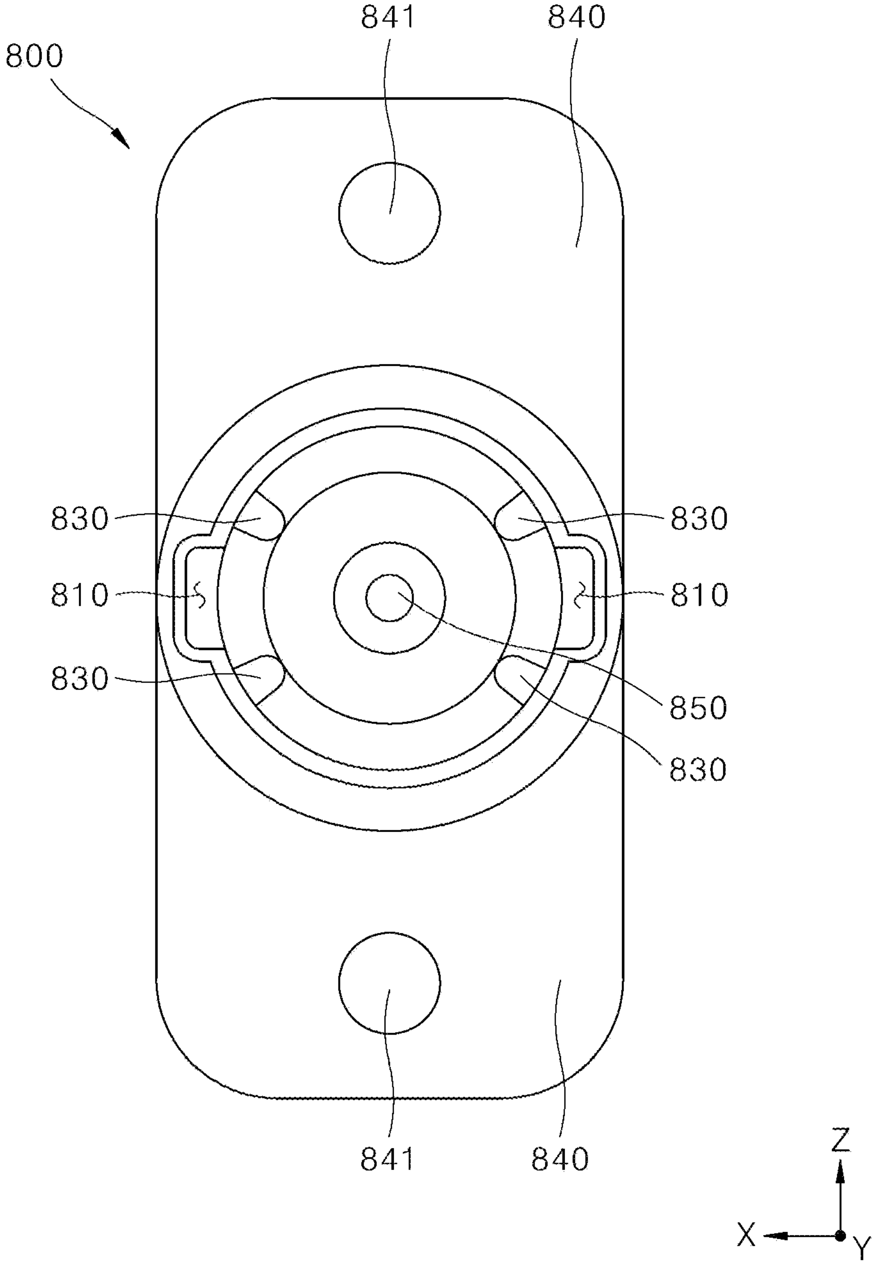
FIG. 10 is a front view of a damper case illustrated in FIG. 7.
Figure 11:
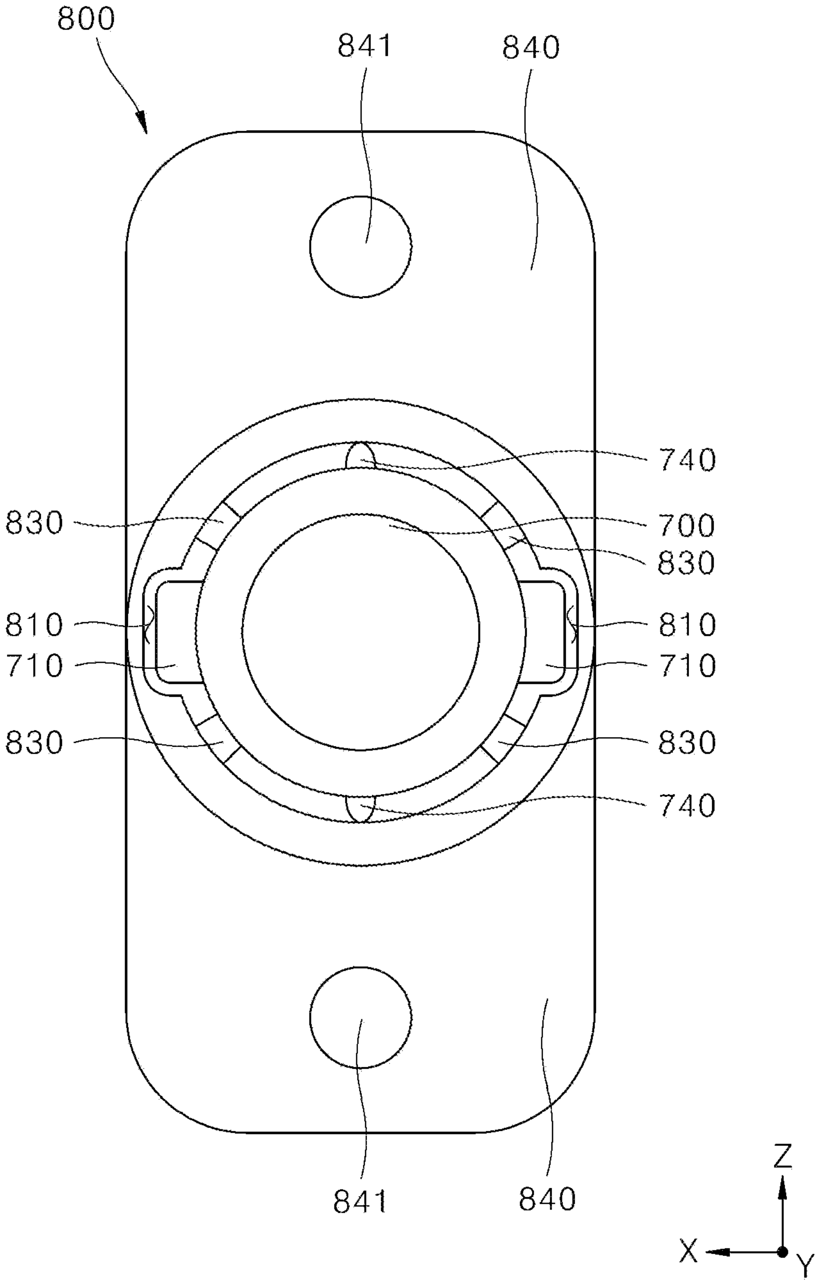
FIG. 11 is a front view of the damper assembly illustrated in FIG. 7.

FIG. 7 is a perspective view separately showing the damper assembly illustrated in FIG. 5, and FIG. 8 is an exploded perspective view of an exploded state of the damper assembly illustrated in FIG. 7, and FIG. 9 is a rear view of a damper cover illustrated in FIG. 8. Additionally, FIG. 10 is a front view of a damper case illustrated in FIG. 7.

Hereinafter, the structure of the damper assembly 500 in this embodiment is briefly described with reference to FIGS. 7 to 11.

The front-rear direction of the damper assembly 500 described in the present invention may be a direction along the Y-axis, as illustrated in FIG. 7, the up-down direction may be a direction along the Z-axis, and the left-right direction may be the X-axis.

The damper assembly 500 may comprise a damper 600. The damper 600 may substantially perform a damping function at the damper assembly 500. The damper 600 may comprise a housing 610 forming the exterior of the damper 600.

As an example, the housing 610 may be shaped into a cylinder the rear end portion of which is open. A space capable of accommodating various types of components constituting the damper 600 may be formed in the housing 610 provided as described above.

The damper 600 may further comprise a rod 620. The rod 620 may be provided to protrude from the rear end portion of the housing 610.

As an example, the rod 620 may be shaped into a cylindrical rod that extends in the lengthwise direction of the damper 600. The rod 620 may be inserted into the housing 610 through the open rear end portion of the housing 610 and reciprocate along the lengthwise direction of the housing 610.

A piston 670 may be fixed to one side of the rod 620 and placed in the housing 610, and a partial area of the other side of the rod 620 may protrude from the rear end portion of the housing 610.

The piston 670 is specifically described hereinafter.

Since the diameter of the rod 620 is much less than that of the housing 610, that is, the thickness of the rod 620 is not that great, the rod 620 may be easily bent or damaged, making it difficult for the damper 600 to operate properly, in the case where a side force is applied to the damper 600.

Considering this, the damper assembly 500 may further comprise a damper cover 700 and a damper case 800 that are provided to protect the damper 600.

The damper cover 700 may surround the front end portion of the damper 600 and at least a partial area of the outer circumferential surface of the damper 600. Additionally, the damper case 800 may surround the rear end portion of the damper 600 and at least a partial area of the outer circumferential surface of the damper 600.

[Structures of Damper Cover and Damper Case]

The damper cover 700 may comprise a cover body 701. As an example, the cover body 701 may be shaped into a cylinder the rear end portion of which is open.

A partial area of the damper 600, comprising the front end portion of the damper 600, may be inserted into the cover body 701 through the open rear end portion of the cover body 701.

The front end portion of the damper 600, inserted into the cover 700 as described above, may contact the rear surface of the front end portion of the body 701, in the cover 701.

To this end, the inner diameter of the cover body 701 may be greater than the outer diameter of the housing 610.

The cover body 701 may comprise a pair of rail parts 710 that extends in the front-rear direction.

The pair of rail parts 710 may respectively protrude from the outer surface of the cover body 701 outward, to have a predetermined thickness. The pair of rail parts 710 may be disposed respectively at the left and right sides of the outer surface of the cover body 701, to face each other.

The rear end portion of the rail part 710 may protrude further rearward than the rear end portion of the cover body 701. Additionally, the rail part 710 may have a holding part 720, at the rear end portion of the rail part 710.

The holding part 720 may be shaped into a hook. The holding part 720 may restrict the movement of the damper cover 700, based on a hook coupling with the damper case 800, in the case where the damper cover 700 is inserted into the damper case 800.

For example, the front end portion of the holding part 720 may protrude further outward than the rail part 710, to form a step between the front end portion of the holding part 720 and the rail part 710. The front end portion of the holding part 720, formed as described above, may be hook-coupled to a slit part 820 of the damper case 800.

The slit part 820 of the damper case 800 may be additionally described hereinafter.

The rear end portion of the holding part 720 may comprise an inclination surface that slopes downward toward the rear of the holding part 720. The rear end portion of the holding part 720, formed as described above, may guide the damper cover 700 such that the damper cover 700 is easily inserted into the damper case 800.

Additionally, the pair of rail parts 710 may be elastically deformable. For example, the pair of rail parts 710 may be made of an elastic material that may slightly bend in a direction where the pair of rail parts 710 faces each other and then return to an original state. The pair of rail parts 710 provided as described above may help the damper cover 700 to be easily inserted into the damper case 800.

The rail part 710 may have a reinforcement part 711, on the inner surface thereof. The reinforcement part 711 may be formed to extend along the direction where the rail part 710 extends, in the front-rear direction, and reinforce the strength of the rail part 710.

A plurality of insertion parts 721 may be provided on the outer surface of the cover body 701. Each insertion part 721 may be formed at the cover body 701 in such a way that the insertion part 721 is open.

For example, the insertion part 721 may be formed in such a way that a partial area is open from the rear end portion of the cover body 701 to the front thereof. The front end portion of the insertion part 721 may be disposed further forward than the rear end portion of the cover body 701. With respect to one rail part 710, a pair of insertion parts 721 may be respectively disposed at both sides of the rail part 710.

The damper cover 700 may further comprise a first guide rib 740. The first guide rib 740 may protrude from the outer surface of the cover body 701 in the front-rear direction.

A pair of first guide ribs 740 may be disposed on the outer surface of the upper portion of the cover body 701 and on the outer surface of the lower portion of the cover body 701. That is, any one of the pair of first guide ribs 740 may be disposed on the outer surface of the upper portion of the cover body 701, and the other may be disposed on the outer surface of the lower portion of the cover body 701.

Each of the first guide ribs 740 may extend up to a predetermined position in the front-rear direction, in a narrow and long shape, while extending from the rear end portion of the cover body 701 forward.

The first guide rib 740 may operate to prevent the entire outer circumferential surface of the cover body 701 from contacting the inner circumferential surface of the damper case 800, as the damper cover 700 is inserted into the damper case 800 and reciprocates in the front-rear direction.

The first guide rib 740 may guide the reciprocation of the damper cover 700 while decreasing friction that may occur between the cover body 701 of the damper cover 700 and the inner circumferential surface of the damper case 800.

The damper case 800 may be coupled to the damper cover 700, while surrounding at least a partial area of the rear end portion of the damper 600 and at least a partial area of the outer circumferential surface of the damper 600. The damper case 800 may comprise a case body 801.

As an example, the case body 801 may be shaped into a cylinder the front end portion of which is open. A partial area of the damper 600, comprising the rear end portion of the damper 600, may be inserted into the case body 801 through the open front end portion of the case body 801. The rod 620 of the damper 600 inserted into the damper case 800 may be supported by the front surface of the rear end portion of the case body 801, in the case body 801.

To this end, the inner diameter of the case body 801 may be greater than the outer diameter of the housing 610.

The case body 801 may have a case groove 850. The case groove 850 may be formed on the front surface of the rear end portion of the case body 801, in such a way that the case groove 850 is concavely depressed. As an example, the case groove 850 may be shaped into a circle corresponding to the shape of the cross section of the rod 620.

The case groove 850, formed as described above, may effectively restrict a movement of the rod 620 in another direction, i.e., a shake of the rod 620 in the up-down and left-right directions, in addition to a movement of the rod 620 in the front-rear direction as well as guiding a coupling position of the rod 620 relative to the case body 801.

Since the damper 600 is inserted into the damper case 800, in the state of being inserted into the damper cover 700, the case body 801 and the housing 610 of the damper 600 may not contact each other directly. The inner circumferential surface of the case body 801 and the outer circumferential surface of the cover body 701 only may contact each other directly.

To this end, the inner diameter of the case body 801 may be greater than the outer diameter of the housing 610 and the outer diameter of the cover body 701.

A pair of guide parts 810 may be provided on the inner surface of the case body 801. The pair of guide parts 810 may be provided to guide the movement of the pair of rail parts 710 of the damper cover 700.

The guide part 810 may be formed in such a way that the guide part 810 is depressed from the inner circumferential surface of the case body 801 toward the outer circumferential surface of the case body 801. Preferably, the guide part 810 may be concavely formed on the inner circumferential surface of the case body 801, to have a depth corresponding to the thickness of the rail part 710. The guide part 810 may be formed in such a way that the guide part 810 extends from the front end portion of the case body 801 rearward.

A pair of guide parts 810 may be disposed at both sides of the inner surface of the case body 801, to face each other. Each of the rail parts 710 may be inserted into each of the guide parts 810 in a sliding manner. As described above, the rail part 710 inserted into the damper case 800 through the guide part 810 may reciprocate along the guide part 810 in the front-rear direction.

A pair of slit parts 820 may be provided on the lateral surface of the case body 801. The pair of slit parts 820 may be formed in such a way that the slit part 820 penetrates the case body 801 in the lateral direction. Each of the slit parts 820 may be disposed to overlap a partial area of the guide part 810, and disposed in an area that is eccentric rearward from the center of the case body 801 in the front-rear direction.

The holding part 720 of the damper cover 700 may be inserted into the slit part 820 and reciprocate along the slit part 820 in the front-rear direction. Accordingly, the damper cover 700 may be coupled to the damper case 800 in such a way that the damper cover 700 reciprocates in the front-rear direction. Additionally, the damper 600 may be compressed or extended in the front-rear direction together with the front end portion of the damper cover 700 reciprocating as described above.

In the case where the damper 600 extends to a maximum degree, the front end portion of the holding part 720 of the damper cover 700 may be limited by the front end portion of the slit part 820 that is open. Accordingly, an additional movement of the holding part 720 may be limited, and a maximum extension distance of the damper 600 may be controlled to prevent an excessive extension of the damper 600.

A plurality of second guide ribs 830 may be provided on the inner surface of the case body 801. Each of the second guide ribs 830 may protrude from the inner surface of the case body 801 inward, and extend along the front-rear direction.

Each of the second guide ribs 830 may have a width less than that of the first guide rib 810 or the slit part 820, while extending from the rear end portion of the case body 801 forward.

The second guide rib 830 may be formed in such a way that the front end portion of the second guide rib 830 is disposed further rearward than the front end portion of the slit part 820.

In this embodiment, a pair of second guide ribs 830 is disposed respectively on the inner surface of the upper portion of the slit part 820 and the inner surface of the lower portion of the slit part 820, for example. Accordingly, the second guide rib 830 may be respectively disposed at both sides of each slit part 820 in the up-down direction thereof.

The plurality of second guide ribs 830 disposed as described above may reinforce the strength of the case body 801, which is weakened by the slit part 820 that is formed at the case body 801 in such a way that the slit part 820 is open.

Further, the second guide rib 830 may guide the movement of the damper cover 700 inserted into the damper case 800. That is, the second guide rib 830 may guide the movement of the damper cover 700 in such a way that the insertion part 721 of the damper cover 700 reciprocates along the second guide rib 830.

In the case where the damper cover 700 extends, the second guide rib 830 is not inserted into the insertion part 721, but in the case where the damper cover 700 is compressed, a partial area of the second guide rib 830 comprising the front end portion of the second guide rib 830 may be inserted into the insertion part 721.

As a partial area of the second guide rib 830 is inserted into the insertion part 721 as described above, the damper cover 700 may movably engage with the second guide rib 830, and the second guide rib 830 may guide the movement of the damper cover 700.

The case body 801 may further comprise at least one of fastening parts 840. The fastening part 840 may protrude from the outer circumferential surface of the case body 801 outward.

As an example, a pair of fastening parts 840 may be provided at the case body 801, and any one of the pair of fastening parts 840 may protrude to the upper side of the case body 801, and the other may extend to the lower side of the case body 801.

Each fastening part 840 may have a fastening hole 341, and each fastening hole 341 may be formed in such a way that the fastening hole 341 penetrates the fastening part 840 in the front-rear direction.

In the case where the damper assembly 500 is coupled to a fixation target, a fastening member such as a screw may fix the fastening part 840 to the fixation target while passing through the fastening part 840 through the fastening hole 341.

The fastening part 840 may be disposed at a position near the open front end portion of the case body 801. Accordingly, at the case body 801, the size of an area at the front side of the fastening part 840 may be much less than the size of an area at the rear side of the fastening part 840.

As illustrated in FIGS. 5 and 6, the damper assembly 500 may be inserted into a damper assembly mounting part 265 formed to have a predetermined insertion hole.

At this time, an area of the case body 801, disposed at the rear side of the fastening part 840, may be inserted into the damper assembly mounting part 265 and not exposed outward.

Additionally, the fastening part 840 may be coupled to the damper assembly mounting part 265, and accordingly, the damper assembly 500 may be fixed to the rear surface of the first door 210.

Accordingly, a partial area of the case body 801 disposed at the front of the fastening part 840 is only exposed to the outside of the first door 210, and most of the area of the case body 801 is not exposed to the outside of the first door 210 and does not protrude to the outside of the first door 210.

The damper assembly 500 provided as described above may help to increase the spatial availability of the hinge mounting space 260 into which the damper assembly 500 is inserted, and enhance aesthetic qualities of the refrigerator.

A reinforcement plate 900 may be disposed between the damper case 800 and the damper 600, and specifically, between the damper case 800 and the rod 620.

The reinforcement plate 900 may be disposed between the rear end portion of the case body 801 having the case groove 850 and the end portion of the rod 620. The reinforcement plate 900 disposed as described above may support the rod 620 moving toward the rear surface of the damper case 800, between the rear surface of the damper case 800 and the rod 620.

The reinforcement plate 900 may prevent a load applied by the rod 620 from concentrating on a partial area of the rear surface of the damper case 800, to protect the damper case 800, such that the damper case 800 is not damaged due to the load applied by the rod 620.

The reinforcement plate 900 may have a drawn groove 950. The drawn groove 950 may be disposed in a central portion of the reinforcement plate 900, and formed in such a way that the drawn groove 950 is depressed rearward from the front surface of the reinforcement plate 900.

Because of the drawn groove 950 formed as described above, a portion of the rear surface of the reinforcement plate 900 may protrude rearward.

Preferably, the drawn groove 950 may be formed to have a shape corresponding to the shape of the cross section of the rod 620. Additionally, the cross section of a protruding portion on the rear surface of the reinforcement plate 900 may have a shape corresponding to the shape of a case groove 850.

Thus, while a portion of the rear surface of the reinforcement plate 900 facing the rear surface portion of the damper case 800 is inserted into the case groove 850, the reinforcement plate 900 may be fixed to the damper case 800.

Additionally, the rod 620 may be inserted into the drawn groove 950, and accordingly, the rod 620 may be fixed to the reinforcement plate 900. Thus, a coupling position of the rod 620 relative to the damper case 800 may be guided by the reinforcement plate 900, and the movement of the rod 620 in the up-down and left-right directions, i.e., a shake of the rod 620 may be effectively restricted by the reinforcement plate 900.

In this embodiment, the damper cover 700 may be inserted into the damper case 800, and reciprocate in the front-rear direction along the inner circumferential surface of the damper case 800.

The movement of the damper cover 700 may depend on the movement of the damper 600.

That is, in the case where the damper 600 is compressed or extended, the damper cover 700 may be compressed or extended along the inner circumferential surface of the damper case 800, together with the damper 600.

In the damper assembly 500 of the embodiment, comprising the damper cover 700 described above, the damper cover 700 and the damper case 800 may protect the damper 600 from the outside. That is, the damper assembly 500 of the embodiment may prevent a side force generated by a structure making a rotation motion from being applied to the damper 600 directly, and accordingly, protect the damper 600 such that the rod 620 of the damper 600 is not bent and damaged.

Further, the damper assembly 500 of the embodiment may assist with the reciprocation of the damper 600 in the front-rear direction, based on a fastening relationship between the damper cover 700 and the damper case 800, and the holding part 720 of the rail part 710, the guide part 810 and the slit part 820.

Thus, the damper assembly 500 of the embodiment may support the damper 600 effectively to ensure a reliable movement of the damper 600 even if a side force generated by a structure making a rotation motion is applied to the damper assembly 500.

Further, in the damper assembly 500 of the embodiment, the damper 600, the damper cover 700 and the damper case 800 may be coupled based on a hook-coupling between the holding part 720 and the slit part 820, formed by an elastic force of the damper 600 itself, without an additional fastening member such as a screw.

The damper assembly 500 may reduce a man hour for assembly, ensure efficient assembly processing, and decrease costs incurred for manufacturing the damper assembly 500.

[Structure of Damper]

Figure 12:
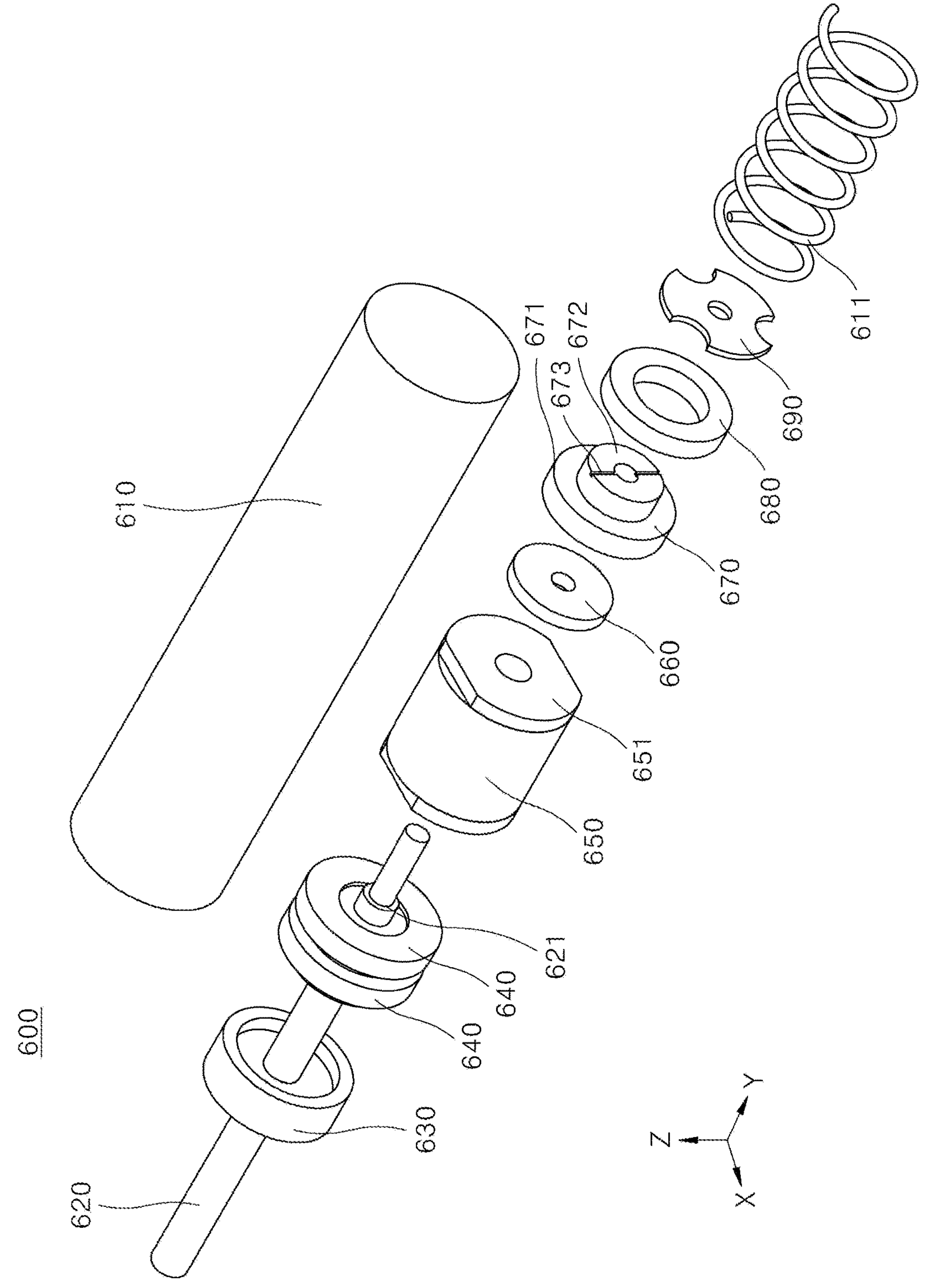
FIG. 12 is an exploded perspective view of an exploded state of a damper illustrated in FIG. 7.
Figure 13:
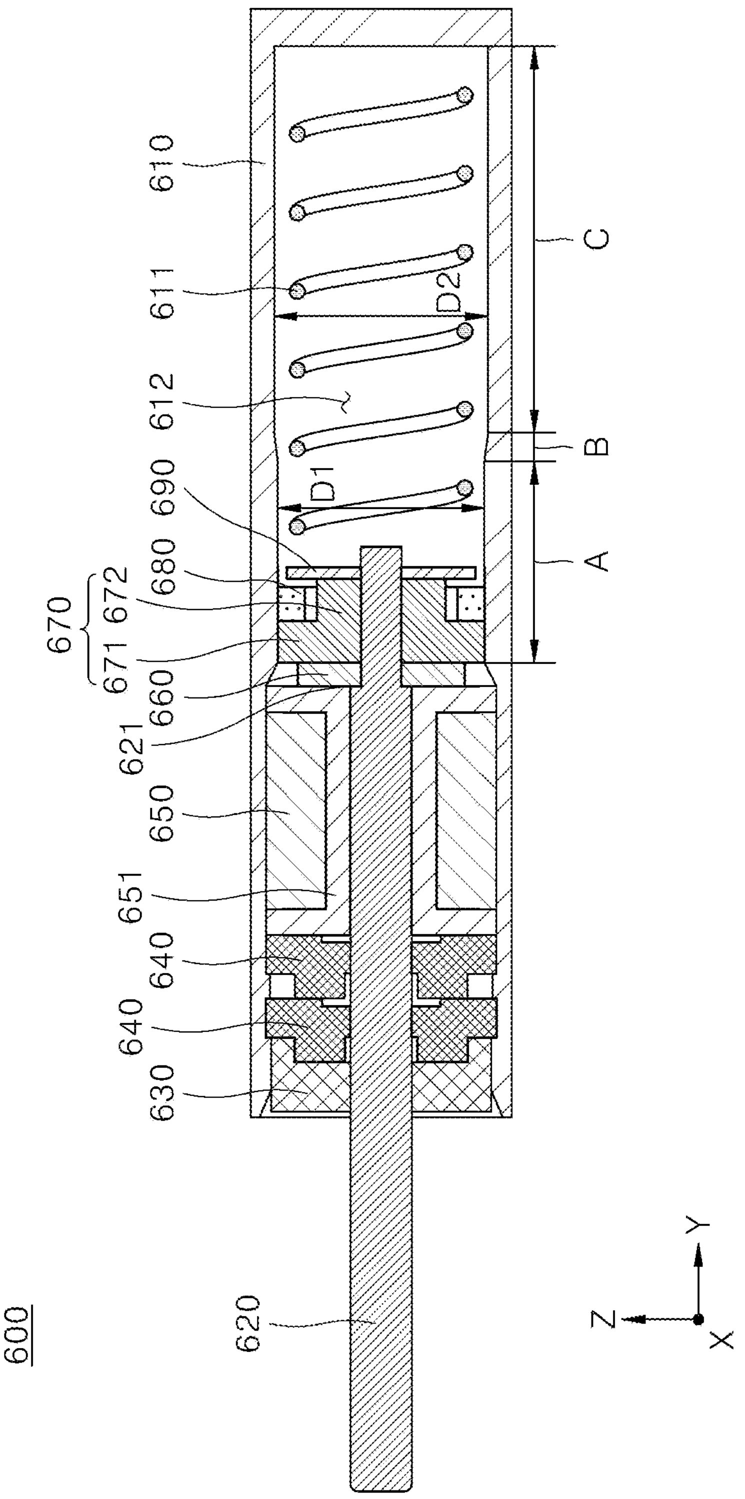
FIG. 13 is a lateral cross-sectional view of the inner structure of the damper illustrated in FIG. 12.
Figure 14:
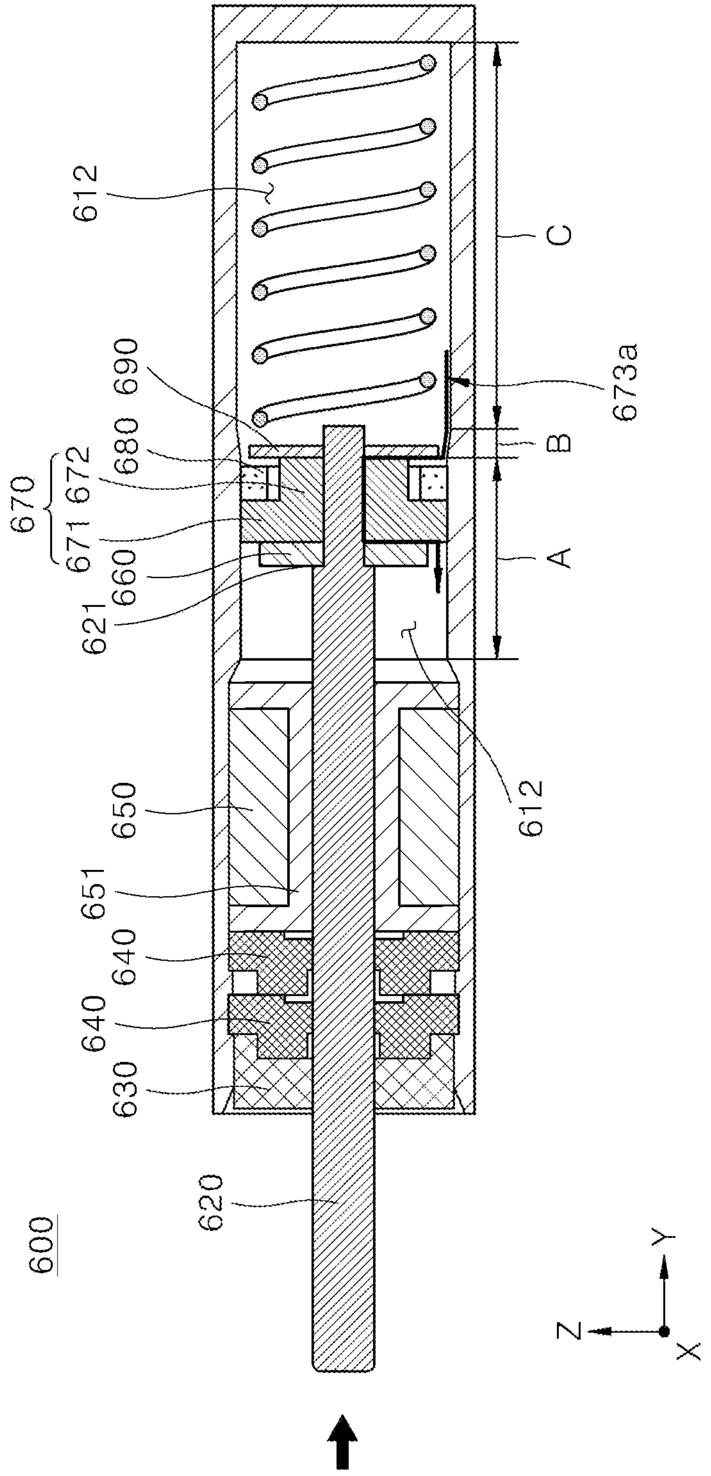
FIGS. 14 and 15 are lateral cross-sectional views of a compressed state of the damper illustrated in FIG. 13.
Figure 15:
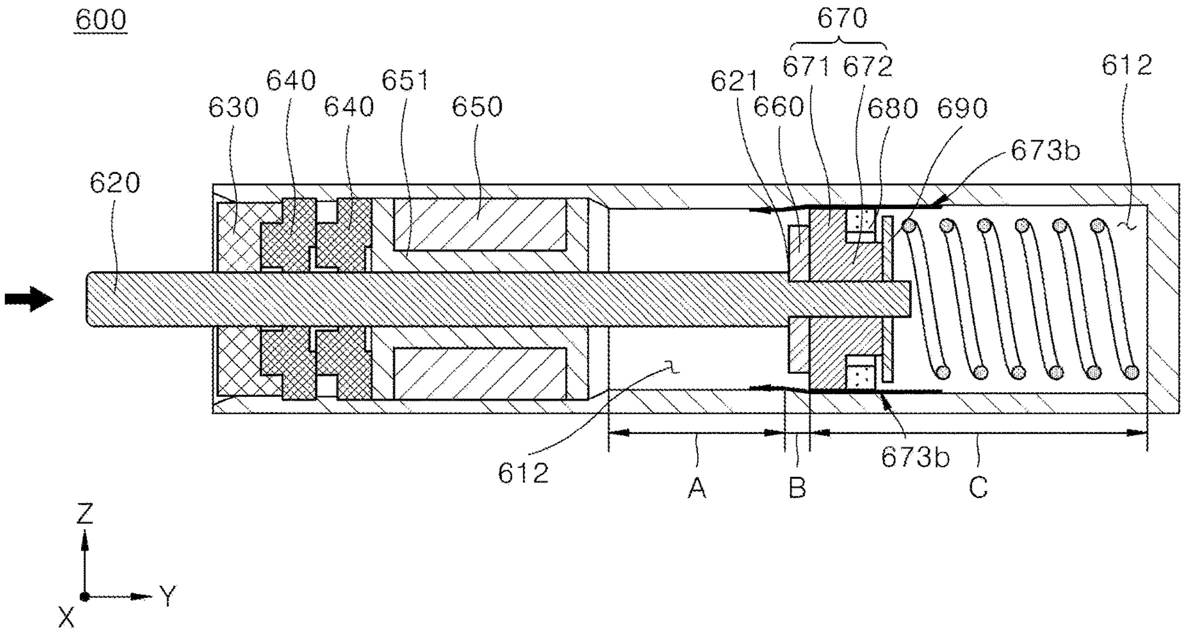
Figure 16:
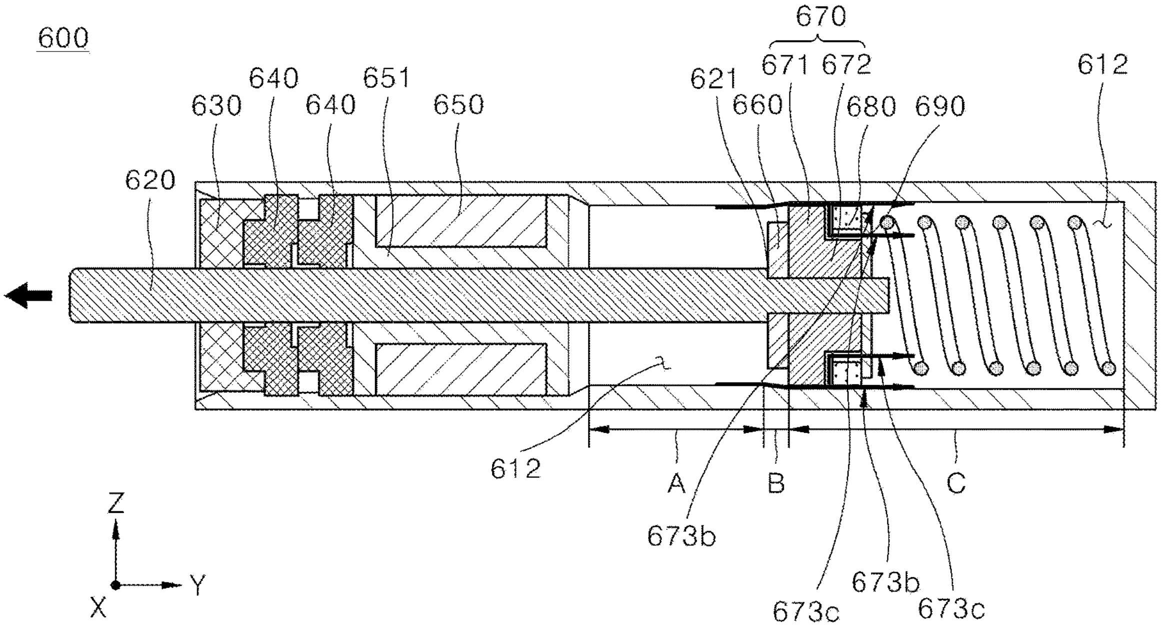
FIGS. 16 and 17 are lateral cross-sectional views of a returned state of the damper illustrated in FIG. 15.
Figure 17:
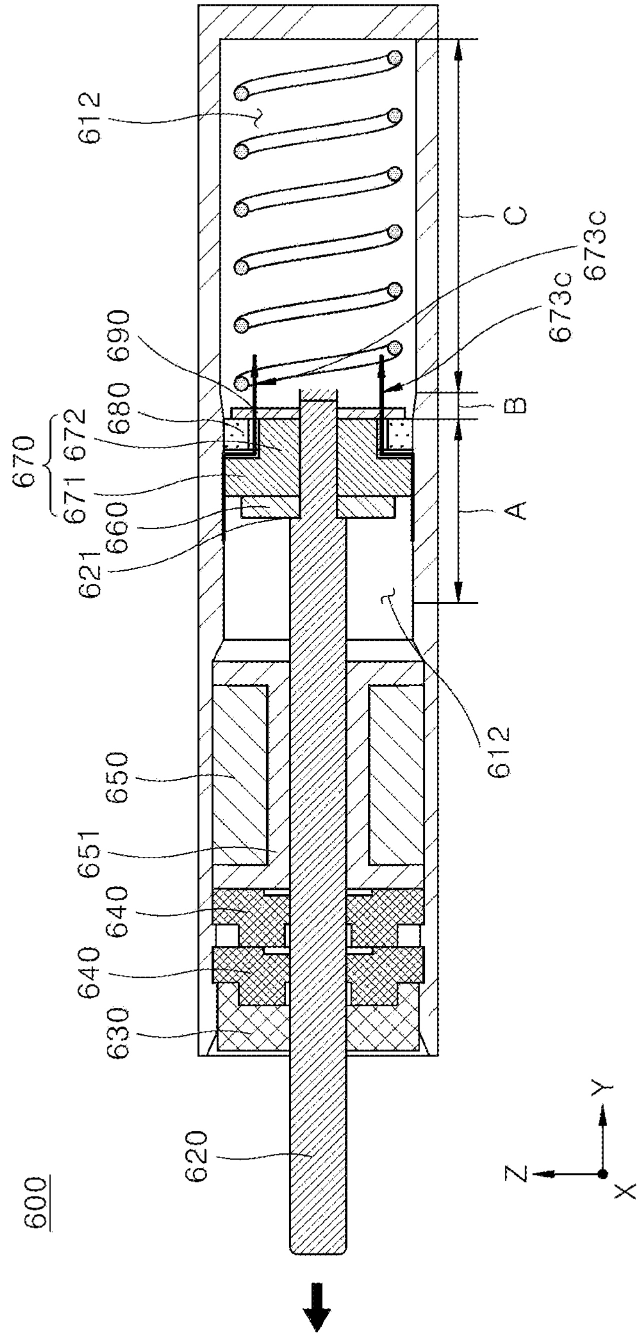
Figure 18:
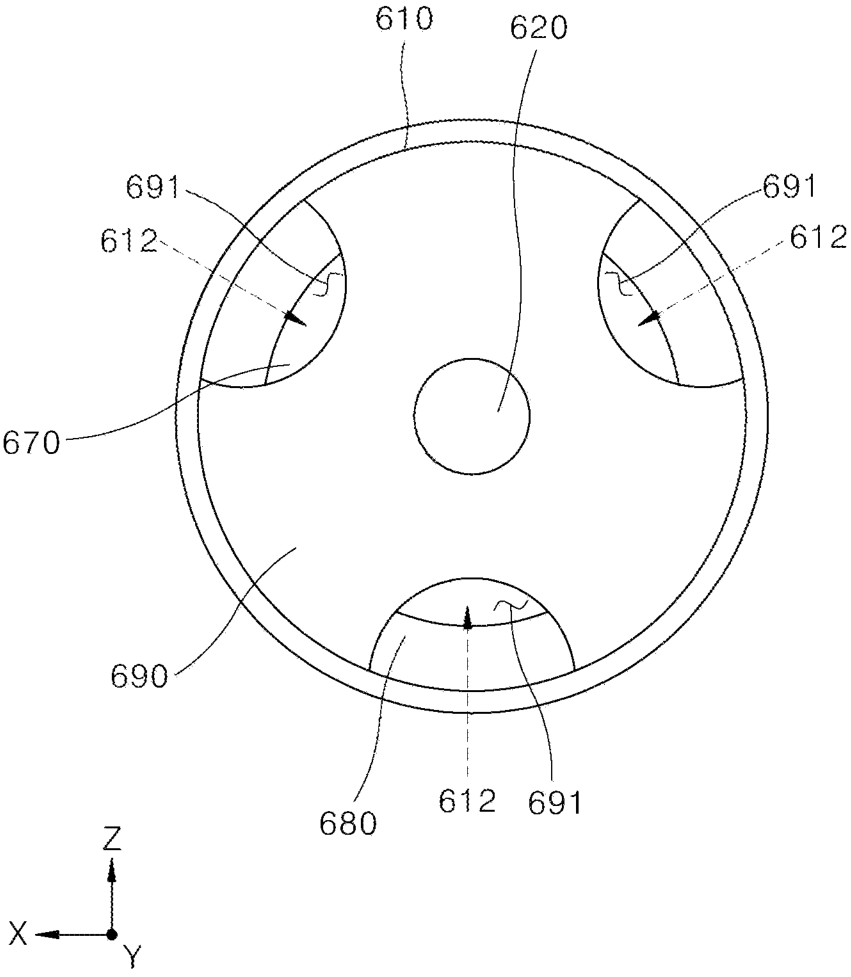
FIG. 18 is a front cross-sectional view of a damper for showing an oil inflow path in the damper.
Figure 19:
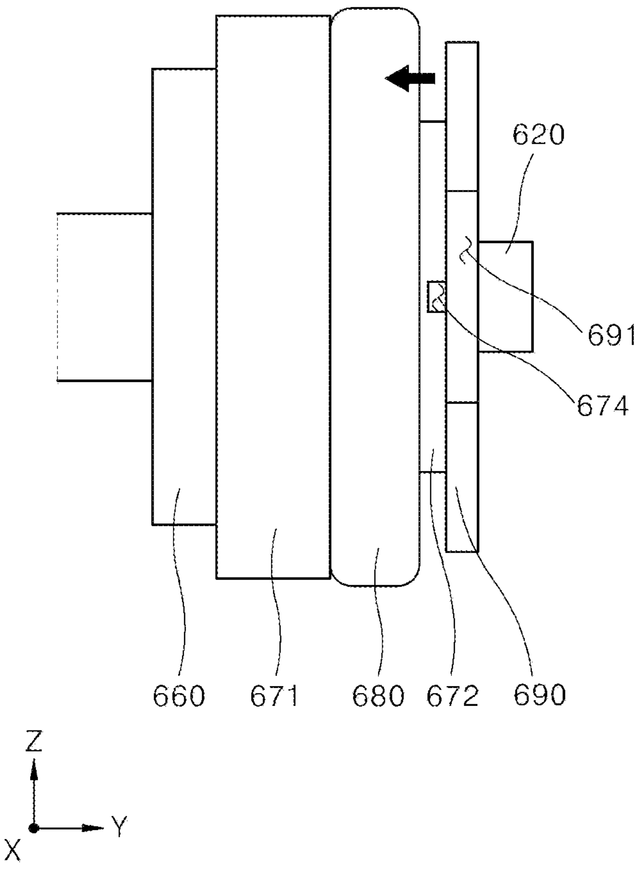
FIG. 19 is a view of an inlet of oil in a state where a ring contacts a first piston part.
Figure 20:
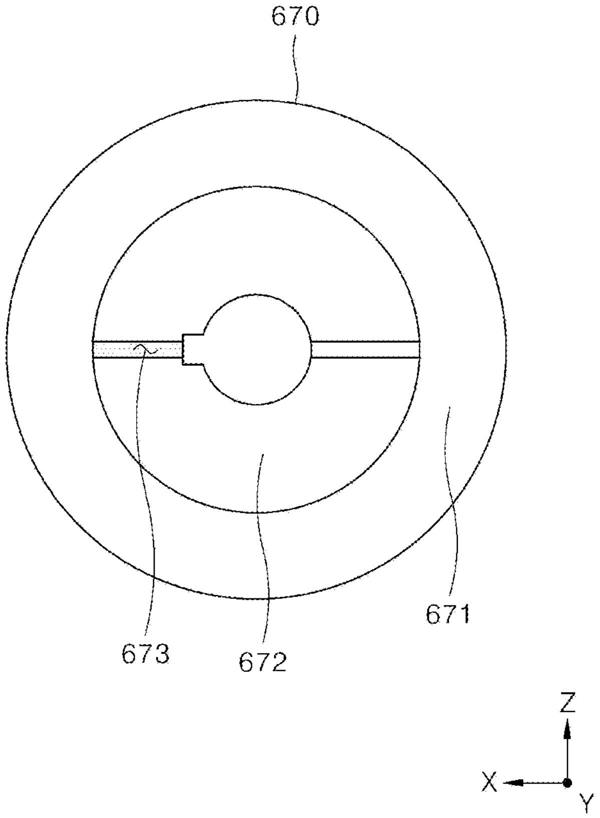
FIG. 20 is a rear view of a piston illustrated in FIG. 19.
Figure 21:
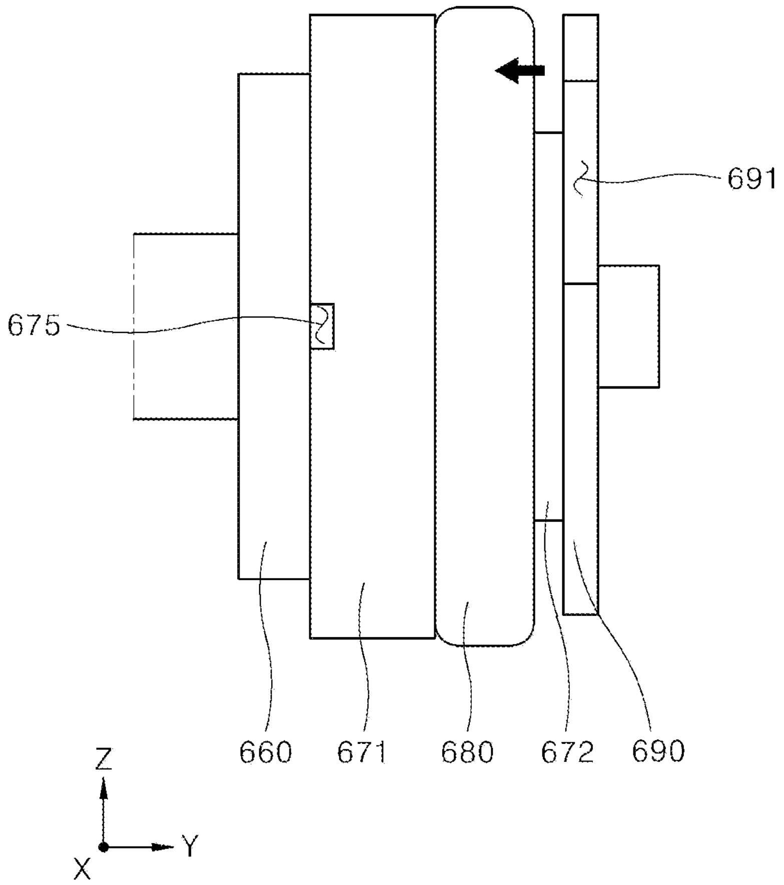
FIG. 21 is a side view of an outlet of oil in a state where a ring contacts a first piston part.
Figure 22:
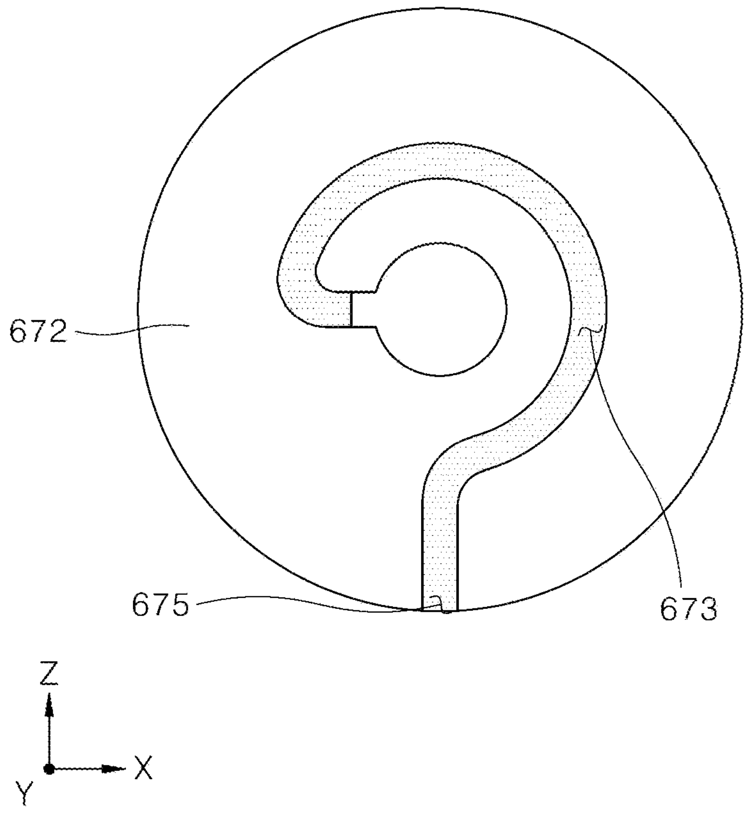
FIG. 22 is a front view of a piston illustrated in FIG. 21.
Figure 23:
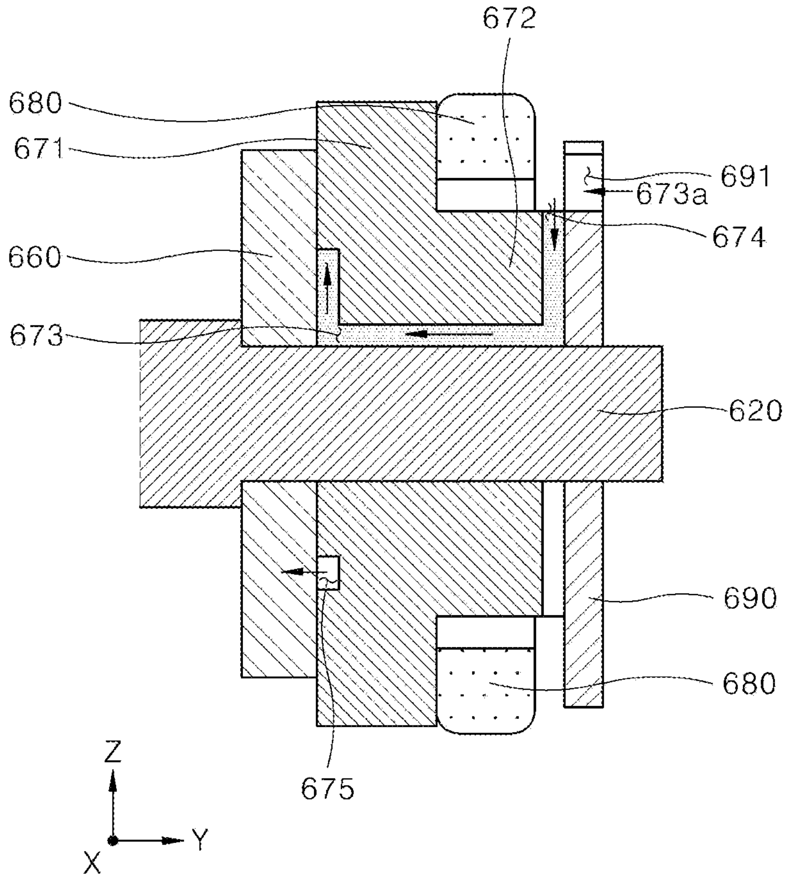
FIG. 23 is a lateral cross-sectional view of a damper for showing an oil flow path part in a state where a ring contacts a first piston part.
Figure 24:
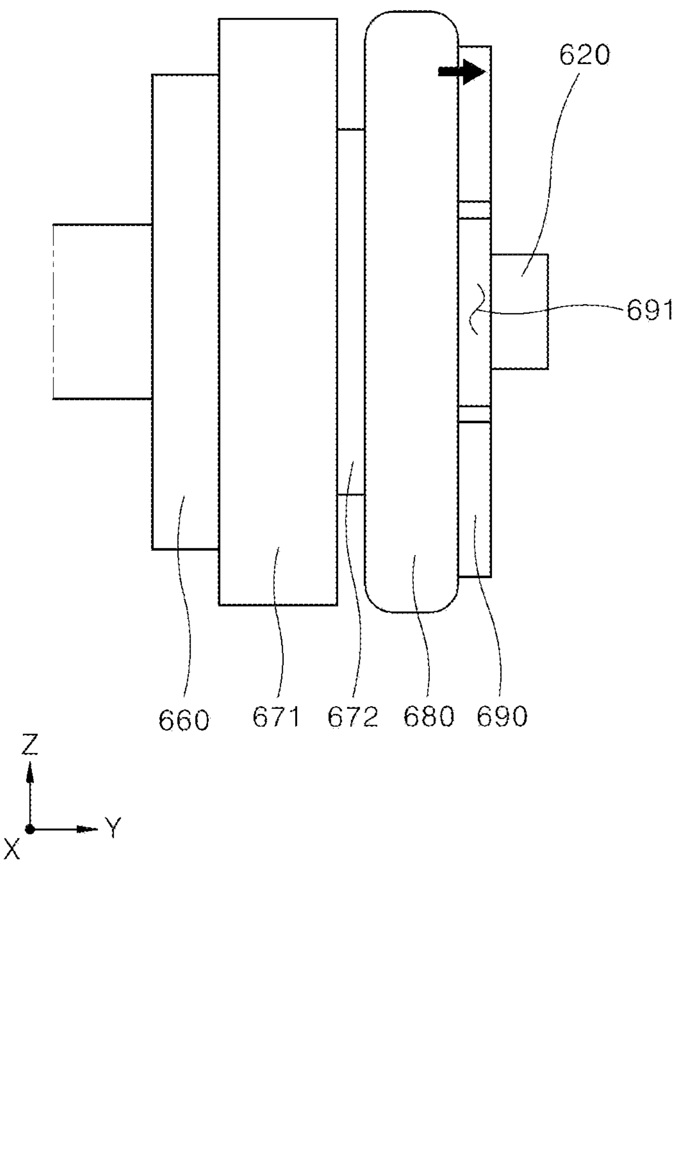
FIG. 24 is a side view of a returned state of a damper.
Figure 25:
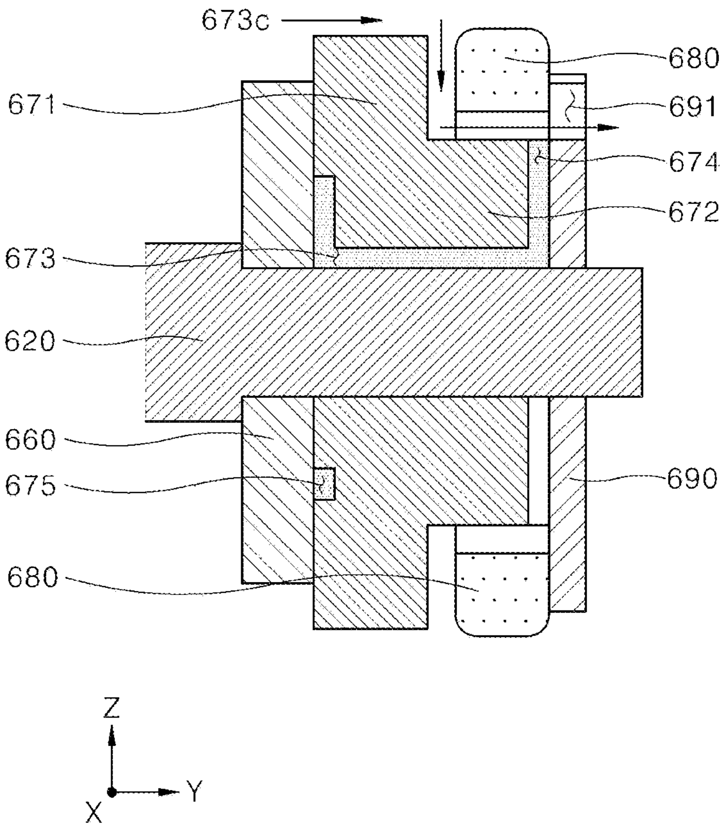
FIG. 25 is a lateral cross-sectional view of the damper illustrated in FIG. 24.

FIG. 12 is an exploded perspective view of an exploded state of a damper illustrated in FIG. 7, and FIG. 13 is a lateral cross-sectional view of the inner structure of the damper illustrated in FIG. 12. FIGS. 14 and 15 are lateral cross-sectional views of a compressed state of the damper illustrated in FIG. 13, and FIGS. 16 and 17 are lateral cross-sectional views of a return state of the damper illustrated in FIG. 15. FIG. 18 is a front cross-sectional view of a damper for showing an oil inflow path in the damper, and FIG. 19 is a view of an inlet of oil in a state where a ring contacts a first piston part. FIG. 20 is a rear view of a piston illustrated in FIG. 19, FIG. 21 is a side view of an outlet of oil in a state where a ring contacts a first piston part, and FIG. 22 is a front view of a piston illustrated in FIG. 21. FIG. 23 is a lateral cross-sectional view of a damper for showing an oil flow path part in a state where a ring contacts a first piston part, FIG. 24 is a side view of a return state of a damper, and FIG. 25 is a lateral cross-sectional view of the damper illustrated in FIG. 24.

Hereinafter, the structure of the damper 600 of the embodiment is described specifically with reference to FIGS. 12 to 25.

Referring to FIG. 12, the damper 600 may comprise a housing 610 forming the exterior of the damper 600. Additionally, the damper 600 may further comprise a guide 630, a sealer 640, a sponge 650, a sponge cover 651, a washer 660, a piston 670, a ring 680 and a bracket 690 that are accommodated in the housing 610.

In the housing 610, the guide 630, the sealer 640, the sponge 650, the sponge cover 651, the washer 660, the piston 670, the ring 680 and the bracket 690 may be coupled to the rod 620.

In this embodiment, the guide 630, the sealer 640, the sponge 650, the sponge cover 651, the washer 660, the piston 670, the ring 680 and the bracket 690 may be coupled to the rod 620 in such a way that central portions of the guide 630, the sealer 640, the sponge 650, the sponge cover 651, the washer 660, the piston 670, the ring 680 and the bracket 690 are penetrated by the rod 620, for example.

As described above, the housing 610 may have a space that accommodates the guide 630, the sealer 640, the sponge 650, the sponge cover 651, the washer 660, the piston 670, the ring 680 and the bracket 690, therein. Additionally, the housing 610 may have a cylinder space charged with oil 612, therein.

The guide 630 may be disposed closest to the open rear end portion of the housing 610 than any other component accommodated in the housing 610. The guide 620 may prevent the other components in the housing 610 from escaping out of the housing 610.

Additionally, the guide 620 may also hold the rod 620 to prevent the rod 620 from shaking in the up-down and left-right directions at a time of reciprocal-translational motion of the rod 620.

As an example, the guide 630 may be made of a plastic material. Preferably, the guide 630 may be made of a polyamide nylon resin material.

The sealer 640 may be disposed at the front of the guide 630. The sealer 640 prevents the oil 612 in the housing 610 from leaking outward, and substantially seal the housing 610.

The inner circumferential surface of the sealer 640 may contact the rod 620 directly, and the outer circumferential surface of the sealer 640 may contact the inner circumferential surface of the housing 610 directly. The sealer 640 disposed between the rod 620 and the housing 610 as described above may block a gap through which the oil 612 leaks out of the housing 610.

A plurality of sealers 640 may be disposed in the housing 610. The plurality of sealers 640 may be arranged in the housing 610 in the front-rear direction. The plurality of sealers 640 may be provided to promote a leakage prevention effect further.

As an example, the sealer 640 may be made of an oil-resistant rubber. Preferably, the sealer 640 may be made of a nitrile butadiene rubber material (NBR).

The sponge 650 may be disposed at the rear of the sealer 640. That is, the sponge 650 may be disposed between the sealer 640 and the piston 670. The sponge 650 may compensate the volume of a space between the sponge 650 and the piston 670, such that the oil 612 moves in a direction opposite to the direction where the piston 670 moves forward as the damper 600 is compressed.

The sponge 650 may be made of a porous material, and the sponge 650 may be compressed by oil that flows into the space between the sponge 650 and the piston 670 as the damper 600 is compressed. The compressed sponge 650 may expand the space between the sponge 650 and the piston 670.

As an example, the sponge 650 may be made of a plastic material. Preferably, the sponge 650 may be made of a synthetic resin material.

The sponge cover 651 may be disposed between the rod 620 and the sponge 650. The sponge cover 651 may be fitted to the outer circumferential surface of the rod 620, and the sponge 650 may be installed at the sponge cover 651 in such a way that the sponge 650 surrounds the circumference of the sponge cover 651.

The sponge cover 651 may be an elastically deformable material. For example, the sponge cover 651 may be made of a plastic material. Preferably, the sponge cover 651 may be made of a polyoxymethylene (POM) material.

The sponge cover 651 may support the sponge 650 such that the sponge 650 is compressed at a time of compression of the damper 600 while the sponge returns to an original state at a time of return of the damper 600.

The washer 660 may be disposed between the sponge 650 and the piston 670. The washer 660 may promote a fastening effect between the rod 620 and the piston 670 while supporting the piston 670 at the front of the piston 670.

The front surface of the washer 660 may contact the rod 620 directly such that the front surface of the washer 660 is held and coupled to a step part 621 where the diameter of the rod 620 decreases.

The rear surface of the washer 660 may contact the front surface of the piston 670 directly, and form a flow path in which the oil 612 flows together with the piston 670. In this embodiment, the washer 660 contacts the front surface of a first piston part 671 of the piston 670, for example.

The washer 660 may be made of a metallic material. As an example, the washer 660 may be made with a steel plate cold commercial (SPCC).

The piston 670 may be disposed at the front sides of the sponge 650 and the washer 660.

At least a portion of an oil flow path part may be provided at the piston 670, as illustrated in FIGS. 12, 19 and 21. The oil flow path part may form a passage required for the oil 612 to pass through the piston 670 and flow, on the piston 670, as the damper 600 is compressed.

As an example, the piston 670 may be made of a plastic material. Preferably, the piston 670 may be made of a polyamide nylon resin material.

The piston 670 may comprise a first piston part 671 and a second piston part 672 that are arranged in the front-rear direction. The second piston part 672 may protrude from the first piston part 671 forward, and the outer diameter of the second piston part 672 may be less than the outer diameter of the first piston part 671.

The bracket 690 may be disposed at the front of the piston 670. The bracket 690 may be disposed to face the second piston part 672.

The rod 620 may protrude to the front sides of the piston 670 and the bracket 690 by passing through the piston 670 and the bracket 690. The end portion of the rod 620 protruding as described above may be rivet-processed, and the piston 670 may be fixed to the rod 620 not to escape from the rod 620.

The bracket 690 may be disposed between the rivet-processed end portion of the rod 620 and the piston 670, such that the piston 670 is protected during rivet-processing for fixing the piston 670.

One surface of the bracket 690 may touch and contact one surface of the second piston part 672 of the piston 670, and form a flow path in which the oil 612 flows together with the piston 670.

As illustrated in FIGS. 12 and 17, a plurality of drawn parts 691 may be provided at the bracket 690. Each of the drawn parts 691 may be formed in such a way that the drawn part penetrates the bracket 690 in the front-rear direction. The plurality of drawn parts 691 may be disposed at the bracket 690 in such a way that the drawn parts 691 are spaced a predetermined distance apart from each other along the circumferential direction of the bracket 690. The oil 612 may flow through a passage formed by the drawn part 691 while passing through the bracket 690.

The bracket 690 may be made of a metallic material. As an example, the bracket 690 may be made with a steel plate cold commercial (SPCC).

A ring 680 may be disposed between the piston 670 and the bracket 690, as illustrated in FIGS. 12 and 18.

The ring 680 may be disposed between the inner circumferential surface of the housing 610 and the piston 670. The outer circumferential surface of the ring 680 may contact the inner circumferential surfaces of the housing 610, to seal between the ring 680 and the housing 610.

That is, the ring 680 may block the oil from flowing through a gap between the outer circumferential surface of the ring 680 and the inner circumferential surface of the housing 610.

In this embodiment, the ring 680 and the housing 610 contact each other closely in a first inner diameter section A described hereinafter, to seal between the ring 680 and the housing 610, for example.

The ring 680 may be disposed outside the piston 670, specifically, the second piston part 672, in the diametrical direction thereof. The inner diameter of the ring 680 may be greater than the outer diameter of the second piston part 672.

The ring 680 formed as described above may be spaced a predetermined distance apart from the outer circumferential surface of the second piston part 672 and surround the second piston part 672 from the outside thereof, in the diametrical direction thereof. Accordingly, an oil return passage 681 may be formed between the inner circumferential surface of the ring 680 and the outer circumferential surface of the second piston part 672. The oil return passage 681 may provide a passage allowing the oil 612 to pass through the ring 680 and flow.

Additionally, the ring 680 may be disposed between the first piston part 671 and the bracket 690. A front-rear thickness of the ring 680 may be less than a front-rear thickness of the second piston part 672 disposed between the first piston part 671 and the bracket 690. The ring 680 formed as described above may reciprocate between the first piston part 671 and the bracket 690, in the front-rear direction, along the second piston part 672.

For example, the ring 680 may move toward the first piston part 671 as the damper 600 is compressed. Accordingly, the ring 680 may contact the first piston part 671 closely, to seal between the first piston part 671 and the ring 680, and be spaced from the bracket 690.

As sealing is done between the first piston part 671 and the ring 680 as described above, the oil 612 may not flow through the oil return passage 681, and the flow of the oil 612 may be induced such that the oil 612 only may flow through the oil flow path part provided at the piston 670.

As the damper 600 returns, the ring 680 may move toward the bracket 690. Accordingly, the ring 680 may be spaced from the first piston part 671 and open between the first piston part 671 and the ring 680. As opening is done between the first piston part 671 and the ring 680 as described above, the oil 612 may flow through the oil return passage 681.

In this embodiment, an inner diameter change section B may be in the damper 600, and the ring 680 repeats passing through the inner diameter change section B while the damper 600 is compressed and returned repeatedly.

As the ring 680 passes through the inner diameter change section B, a strong impact may be applied to the ring 680, and as the ring 680 is formed to provide a strong sealing force, frictional resistance applied to the ring 680 increases. In the case where a strong impact and frictional force are repeatedly applied to the ring 680 as described above, the sealing force of the ring 680 decreases, and the possibility of damage to the ring 680 increases.

Considering this, a ring 680 made of a material having a higher strength and a lower friction coefficient than the sealer 640 is provided in this embodiment.

Such a ring 680 may be made of a plastic material. As an example, the ring 680 may be made of fluorine resin. Preferably, the ring 680 may be made of a Teflon material.

More preferably, the ring 680 may be formed in such a way that carbon is contained in Teflon at 10% to 30% with respect to its entire weight.

Teflon exhibits higher strength and lower frictional resistance than rubber. In the case where the ring 680 is made of a Teflon material, the ring 80 may have high durability, and friction resistance applied to the ring 680 may decrease, compared to a ring made of rubber.

The sealing force of the ring 680 may be less than that of a ring made of rubber, but an effect caused by a difference between the sealing force of the ring 680 and the sealing force of the ring made of rubber may be sufficiently offset by the sealer 640 that is provided apart from the ring 680.

Unlike the ring 680, the sealer 640 is not a member that rubs against the housing 610 while moving in the housing 610 and passes through the inner diameter change section B.

That is, the sealer 640 is less affected by a strong impact and frictional resistance then the ring 680. The sealer 640 may compensate a sealing force provided by the ring 680 by providing a sufficiently high sealing force since the sealer 640 is made of rubber.

Thus, the ring 680 made of a material ensuring high durability and low frictional resistance may be disposed in an area that is affected by a strong impact and frictional resistance, and the sealer 640 made of a material providing a high sealing force may be disposed in an area that is relatively free from a strong impact and frictional resistance.

A combination of the sealer 640 and the ring 680 described above helps to provide a sufficiently effective sealing force and protect the ring 680 from damage, ensuring improvement in reliability of repetition of the damper 600.

Additionally, the ring 680 made of a Teflon material, in this embodiment, may reduce friction between the ring 680 reciprocating along the inner circumferential surface of the housing 610 and the housing 610, such that the damper 600 may operate naturally and smoothly without stopping.

The ring 680 in this embodiment may be made of a material having a higher elastic modulus than the material for the sealer 640. For example, the ring 680 in this embodiment may be made of a Teflon material having a higher elastic modulus than rubber. The shape of the ring 680 made of such a material is less deformable than that of the sealer 640.

The ring 680 may contact the housing 610 solidly in a damping section, but there is almost no change in the shape of the ring 680 in a non-damping section despite oil pressure, and the ring 680 does not contact the housing 610.

If like the sealer 640, the ring is made of a rubber material easily deformable, the shape of the ring may be easily deformable because of oil pressure, as the piston 670 compresses oil. At this time, a change in the shape of the ring may be made in such a way that the size of the ring increases in the centrifugal direction.

At this time, as the ring enters into the non-damping section, the shape of the ring changes, and accordingly, a change in the surface area of the flow path is delayed at a time of transition from the damping section to the non-damping section, and a transition to the non-damping section is delayed.

However, the ring 680 in this embodiment is made of a material that is not easily deformable, such that a transition from the damping section to the non-damping section is performed readily.

The rod 620 may be shaped into a long thin rod that extends in the front-rear direction. The rod 620 may extend rearward from the piston 670 and move together with the piston 670 in the front-rear direction.

The rod 620 may be made of a metallic material. For example, the rod 620 may be made of stainless steel.

The rod 620 may have a step part 621. The step part 621 may be formed in such a way that the inner diameter of the step part 621 is less than the inner diameter of another portion of the rod 620. The step part 621 may be disposed in an area of the rod 620 eccentric to the front thereof.

The guide 630, the sealer 640, the sponge 650 and the sponge cover 651 may be disposed at the rear of the step part 621. They may be fixed in the housing 610 without being affected by the reciprocation of the rod 620.

However, the washer 660, the piston 670, the ring 680 and the bracket 690 may be disposed at the front of the step part 621. They may move in the housing 610, together with the rod 620.

The damper 600 may further comprise an elastic member 611. T elastic member 611 may be accommodated in the housing 610, and disposed between the front end portion of the housing 610 and the bracket 690.

As an example, the elastic member 611 may be a coil spring the rear end portion of which is supported by the front end portion of the housing 610 and the front end portion of which supports the bracket 690. The elastic member 611 may provide an elastic force of returning the piston 670 having moved in a direction where the oil 612 is compressed.

The damper 600 may comprise a first inner diameter section A, a second inner diameter section C, an inner diameter change section B disposed between the first inner diameter section A and the second inner diameter section C. That is, the inside of the housing 610 may be divided into the first inner diameter section A, the inner diameter change section B and the second inner diameter section C.

The inner diameter D2 of the housing 610 in the second inner diameter section C may be greater than the inner diameter D1 of the housing 610 in the first inner diameter section A.

In the inner diameter change section B, the inner diameter of the housing 610 may continue to decrease or increase in one direction. That is, in the inner diameter change section C, an inclination surface may be formed on the inner circumferential surface of the housing 610.

Since the housing 610 has sections having a different inner diameter as described above, one damper 600 may provide various types of damper forces.

For example, a first damping force provided by the damper 600 in a first damping force section A may be greater than a second damping force provided by the damper 600 in a second damping force section C.

As an example, the first damping force section A may be a damping section in which the damper 600 provides a damping force, and the second damping force section C may be a non-damping section in which the damper 600 provides no damping force, or in which the damping section is transitioned to the non-damping section as the damper 600 is compressed.

As the damper 600 is compressed, the outer circumferential surface of the ring 680 may contact the inner circumferential surface of the housing 610 closely in the first damping force section A, such that the ring 680 blocks between the ring 680 and the housing 610.

As a gap between the ring 680 and the housing 610 is blocked by the ring 680, the oil 612 may flow only through the oil flow path part of the piston 670, and the damper 600 may provide the first damping force.

In the case where the ring 680 enters into the non-damping section, i.e., the second damping force section B, past the damping section, as the damper 600 continues to be compressed, a gap is generated between the ring 680 and the inner circumferential surface of the housing 610.

Accordingly, the oil 612 may flow through the gap between the ring 680 and the inner circumferential surface of the housing 610 as well as the oil flow path part of the piston 670.

The gap between the ring 680 and the housing 610 may form a passage that has lower flow resistance than the passage in the piston 670. Additionally, since the oil 612 flows through both of the passage formed by the gap and the oil flow path part of the piston 670, flow resistance in the second damping force section B may become much less than flow resistance in the first damping force section A.

Thus, in the second damping force section B, a damping force provided by the damper 600 becomes very low, thereby producing a non-damping effect.

The damper 600 in this embodiment may adjust a damping force in stages, in the case where the damper 600 is compressed, based on a difference in the inner diameter of the housing 610 through a step.

The damper 600 may readily provide a damping force in stages without causing large costs based on a simple process in which the inner shape of the housing 610 changes slightly, rather than a complex and expensive process in which the viscosity of oil 612 varies in each section or in which the diameter of the oil flow path part of a piston 670 varies in each section.

[Operation Structure of Damper]

Hereinafter, the operation structure of the damper 600 is described specifically.

Referring to FIGS. 19 and 23, the second piston part 672 may have an inlet 674. The inlet 674 may be provided in a groove shape that is concavely formed on the front surface the second piston part 672.

The inlet 672 formed as described above may extend toward the open center of the piston 670, and extend rearward along the inner circumferential surface of the piston 670 at the open center of the piston 670. The inlet 672 may extend to a position where the inlet 672 connects to the rear surface of the piston 670.

The first piston part 671 may have an outlet 675. The outlet 675 may be provided in a groove shape that is concavely formed on the rear surface of the first piston part 671.

The oil 612 having flown into the inlet 674 and then having passed through the piston 670 through the open center of the piston 670 may be discharged out of the piston 670 through the outlet 675.

Referring to FIGS. 14, 15 and 23, the oil flow path part in this embodiment may comprise a first flow path 673*a*. The first flow path 673*a* may provide a path comprising the drawn part 691 formed at the bracket 690, the space formed between the drawn part 691 and the ring 680, the inlet 674 and the outlet 675.

The first flow path 673*a* may provide a path comprising the drawn part 691 formed at the bracket 690, the space formed between the drawn part 691 and the ring 680, the inlet 674 and the outlet 675.

For example, in the first flow path 673*a*, the oil 612 may pass through the bracket 690 through the drawn part 691, flow into the space formed between the drawn part 691 and the ring 680 and then be drawn between the second piston part 672 and the bracket 690 through the inlet 674.

As described above, the oil 612 drawn between the second piston part 672 and the bracket 690 may flow into the outlet 675 through a passage formed between the rod 620 penetrating the center of the piston 670 and the piston 670.

The oil 612 having flown into the outlet 675 may flow through a passage formed between the first piston part 671 and the washer 660 and then be discharged to the rear side of the piston 670.

As the entire length of the first flow path 673*a* increases, a deviation from the damping force of the damper 600 may decrease. To minimize the deviation from the damping force of the damper 600, the first flow path 673*a* is preferably designed to make the longest detour.

To this end, in this embodiment, the outlet 675 may be shaped to comprise a section in which the outlet 675 extends along the circumferential direction of the piston 670, as illustrated in FIGS. 21 and 22.

As an example, the outlet 675 may be divided into three sections. A first section of the outlet 675 is a section connecting to the open center of the piston 670, i.e., a section connecting to the inlet 674. The first section of the outlet 675 may be formed in such a way that the first section extends at the open center of the piston 670 in the centrifugal direction.

A third section of the outlet 675 is a section connecting to the outside of the first piston part 671 in the diametrical direction thereof, i.e., a section in which the outlet 675 is exposed outward in the diametrical direction of the piston 670. The third section of the outlet 675 may be formed in such a way that the third section extends from the outer circumferential surface of the first piston part 671 in the centripetal direction thereof.

A second section of the outlet 675 is a section connecting between the first section and the third section of the outlet 675. The second section of the outlet 675 may be formed in such a way that the second section extends along the circumferential direction of the piston 670. That is, the second section of the outlet 675 may extend in such a way that the second section detours in a round manner, around the open center of the piston 670, along the circumferential direction of the piston 670, rather than connecting between the first section and the third section of the outlet 675 linearly.

Due to the second section of the outlet 675 formed described above, the entire length of the outlet 675 may extend effectively. Accordingly, the entire length of the first flow path 673*a* increases, and a deviation from the damping force of the damper 600 may decease effectively.

Referring to FIGS. 14 and 23, the rod 620 and the piston 670 may move forward as the damper 600 is compressed. As the rod 620 and the piston 670 move forward, the ring 680 may contact the first piston part 671 closely.

Because of a frictional force acting between the inner circumferential surface of the housing 610 and the ring 680, the position of the ring 680 may be maintained until the ring 680 contacts the first piston part 671. In the case where the piston 670 continues to move forward in the state where the ring 680 contacts the first piston part 671, the ring 680 may move forward together with the piston 670.

While the piston 670 compresses the oil 612 and the ring 680 moves in the first inner diameter section A, the oil 612 in a space disposed further forward than the piston 670, i.e., a space between the anterior portion of the housing 610 and the piston 670 (hereinafter, "anterior space"), may pass through the piston 670 through the first flow path 673*a* and flow to a space between the piston 670 and the sponge 650 (hereinafter, "posterior space").

The oil flow path part in this embodiment, as illustrated in FIGS. 15 and 16, may further comprise a second flow path 673*b*. The second flow path 673*b* may provide a path comprising a path between the outer circumferential surface of the first piston part 671 and the inner circumferential surface of the housing 620, and a path between the outer circumferential surface of the ring 680 and the inner circumferential surface of the housing 610.

For example, in the second flow path 673*b*, the oil 612 may flow forward or rearward by consecutively passing through a path between the outer circumferential surface of the first piston part 671 and the inner circumferential surface of the housing 620 and between the outer circumferential surface of the ring 680 and the inner circumferential surface of the housing 610.

As an example, as illustrated in FIG. 15, while the piston 670 compresses the oil 612 and the ring 680 moves in the second inner diameter section C, the oil 612 in the anterior space may flow rearward while passing through the piston 670 though the second flow path 673*b*.

Since the inner diameter of the housing 610 in the second inner diameter section C is greater than in the first inner diameter section A, a gap is created between the outer circumferential surface of the ring 680 and the inner circumferential surface of the housing 610. The gap between the ring 680 and the housing 610 in the second flow path 673*b* may form a passage having lower flow resistance than in the first flow path part 673*a*.

That is, the second flow path 673*b* may form a passage having lower flow resistance than the first flow path 673*a*, such that the oil 612 may flow in the second flow path 673*b* rather than the first flow path 673*a*.

Additionally, the oil flow path part in this embodiment may further comprise a third flow path 673*c* as illustrated in FIGS. 16, 17 and 25. The third flow path 673*c* may provide a path comprising a path between the outer circumferential surface of the first piston part 671 and the inner circumferential surface of the housing 620, the oil return passage 681 and the drawn part 691.

For example, in the third flow path 673*c*, the oil 612 may flow forward by consecutively passing through a path between the outer circumferential surface of the first piston part 671 and the inner circumferential surface of the housing 620, the oil return passage 681 and the drawn part 691.

As the piston 670 returns, that is, the piston 670 moves forward, the bracket 690 may move forward together with the piston 670. Because of a frictional force acting between the inner circumferential surface of the housing 610 and the ring 680, the position of the ring 680 may be maintained until the ring 680 contacts the bracket 690.

After the ring 680 contacts the bracket 690, the ring 680 may move forward together with the piston 670 and the bracket 690. In this process, the ring 680 may be spaced from the first piston part 671 and open between the first piston part 671 and the ring 680. As opening is done between the first piston part 671 and the ring 680, the oil 612 may flow through the oil return passage 681.

As illustrated in FIGS. 16, 24 and 25, while the piston 670 returns and the ring 680 moves in the second inner diameter section C, the oil 612 in the posterior space may flow forward while passing through the piston 670 through the third flow path 673*c*.

Referring to FIGS. 17, 24 and 25, while the piston 670 returns and the ring 680 passes through the first inner diameter section A, the ring 680 and the housing 610 contact each other closely, and the gap between the outer circumferential surface of the ring 680 and the inner circumferential surface of the housing 610 disappears.

Thus, the second flow path 673*b* is blocked, and the oil 612 in the posterior space may pass through the piston 670 through the third flow path 673*c* and flow to the anterior space.

[Structure of Hinge Assembly]

Figure 26:
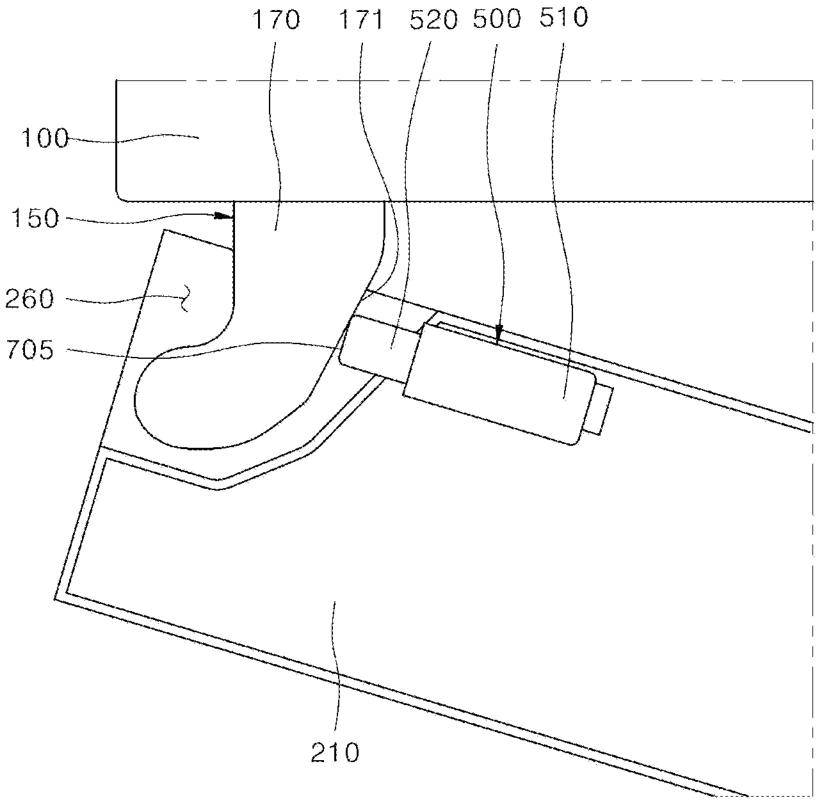
FIG. 26 is a planar cross-sectional view of a mounted state of a damper assembly of a first embodiment.
Figure 27:
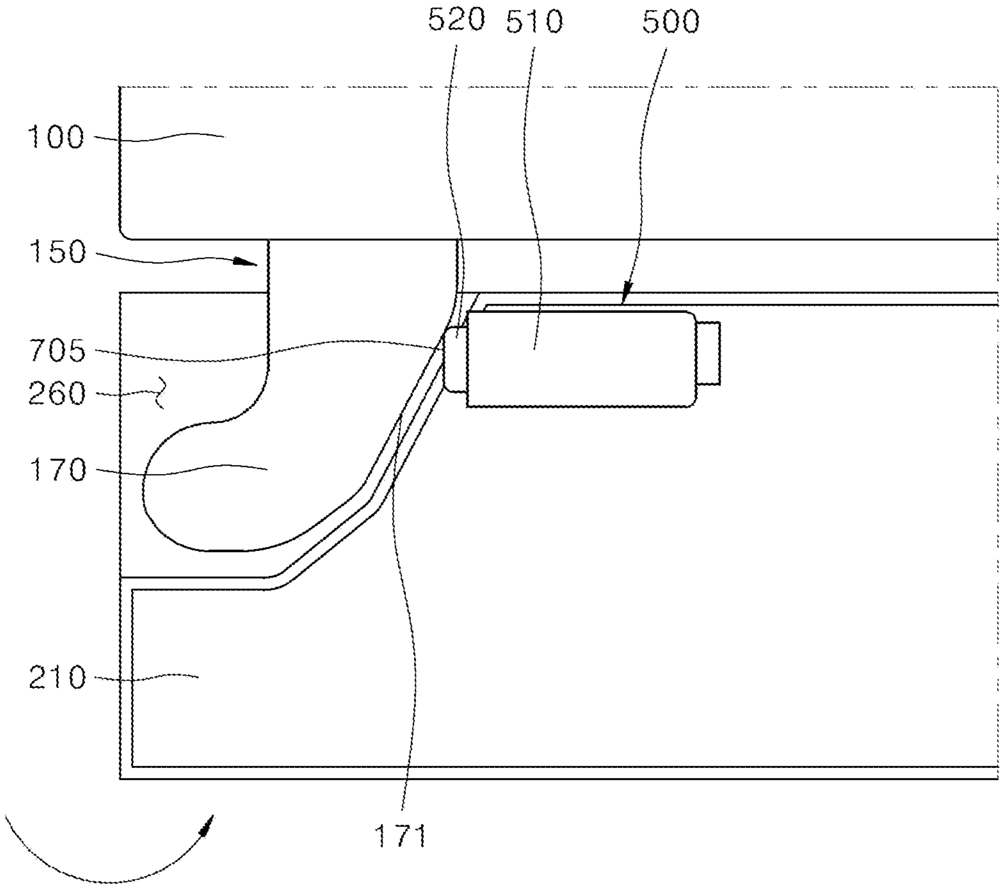
FIG. 27 is a planar cross-sectional view of a state in which the damper assembly illustrated in FIG. 26 is moved along a door that is rotated in a closing direction.

FIG. 26 is a planar cross-sectional view of a mounted state of a damper assembly of a first embodiment, and FIG. 27 is a planar cross-sectional view of a state in which the damper assembly illustrated in FIG. 26 is moved along a door that is rotated in a closing direction.

Referring to FIGS. 1 to 6 and 26 to 27, the damper assembly 500 of the first embodiment may be installed at any one of the doors 210, 220, 230 and the hinge assembly 150. The damper assembly 500 may generate a damping force while contacting the other of the door 210, 220, 230 and the hinge assembly 150.

In this embodiment, the damper assembly 500 is installed at the door 210, 220, 230, and generates a damping force while contacting the hinge assembly 150, for example. Hereinafter, the operation and effect of the damper assembly 500 are described in the case where the damper assembly 500 is installed at the first door 210.

The hinge assembly 150, as described above, may be provided to connect the first door 210 to the cabinet 100 rotatably. One side of the hinge assembly 150, i.e., the rear side of the hinge assembly 150, may be fixed to the cabinet 100.

Additionally, the other side of the hinge assembly 150, i.e., the front side of the hinge assembly 150, may connect to the first door 210. At least a portion of the hinge assembly 150 may be inserted into the hinge mounting space 260.

As an example, the hinge assembly 150 may comprise a hinge 160 (see FIG. 40), a hinge shaft 166 (see FIG. 40) and a hinge case 170. The hinge 160 may be fixed to the first door 210, and the hinge shaft 166 may be supported by the hinge 160. The hinge shaft 166 may be mounted on the hinge mounting part 261 and provide a rotation axis for a rotation of the first door 210.

The hinge case 170 may be coupled to the hinge 160 while surrounding a portion of the hinge 160 from the outside. The hinge case 170 may form the exterior of the hinge assembly 150 and be provided as a counterpart object contacting the damper assembly 500.

The hinge case 170 may cover the hinge 160 from the outside such that the hinge 160 is not exposed to the outside. The rear of the hinge case 170 may be coupled to the front surface of the cabinet 100, and the lower end of the hinge case 170 may be coupled to the hinge.

Most of the area of the hinge case 170 may be accommodated in the hinge mounting space 260. The hinge case 170 may be coupled only to the hinge 160 and not directly coupled to the first door 210 such that the hinge case 170 is immune from the rotation of the first door 210.

The hinge 160 may be coupled to the lower surface of the hinge mounting space 260, and the hinge 160 may be disposed at a position lower than the position of the damper assembly 500 that is spaced upward from the lower surface of the hinge mounting space 260 by a predetermined distance.

The hinge case 170 may be formed in such a way that the hinge case 170 protrudes upward from the hinge 160. The hinge case 171 may have a sliding surface 171, on a lateral surface thereof.

The sliding surface 171 may be provided on one lateral surface of the hinge case 170, facing the damper assembly 500.

As an example, the hinge cover 170 may comprise an upper surface disposed upward from the hinge 160 by a predetermined distance, and lateral surfaces extending downward from the upper surface. The hinge 160 disposed at the lower side of the hinge cover 170 may be coupled to the lower ends of the lateral surfaces of the hinge cover 170, and disposed in a space surrounded by the upper surface and lateral surfaces of the hinge cover 170.

The sliding surface 171 may be formed by any one of the lateral surfaces of the hinge cover 170 formed as described above, and specifically, by any one of the lateral surfaces of the hinge cover 170, facing the damper assembly 500.

In this embodiment, the hinge cover 170 may be provided in the first direction, that is, in such a way that the hinge cover 170 connects between the rotation center of the first door 210 and the cabinet 100 that are disposed in the front-rear direction. The sliding surface 171 forming one lateral surface of the hinge cover 170 may connect between the rotation center of the first door 210 and the cabinet 100.

The damper assembly 500 installed at the first door 210 may be disposed to face the sliding surface 171. At this time, the damper assembly 500 and the sliding surface 171 may be disposed to face each other in the second direction, i.e., in the lateral direction. The damper assembly 500 disposed as described above may generate a damping force while sliding along the sliding surface 171 as the first door 210 rotates in the closing direction.

The sliding surface 171 may form an inclination surface. As an example, the sliding surface 171 may form an inclination surface that extends in a direction between the first direction and the second direction, i.e., a direction between the front-rear direction and the lateral direction.

In the case where the a direction from the cabinet 100 toward the first door 210, i.e., the forward direction, is one direction of the first direction, and the opposite direction, i.e., the reward direction, is the other direction of the first direction, the sliding surface 171 may form an inclination surface that extends from the front surface of the cabinet 100 in one direction of the first direction.

Additionally, in the case where a direction from the center of the cabinet 100 in the lateral direction thereof toward the end portion of the cabinet 100 in the lateral direction thereof is one direction of the second direction, and the opposite direction is the other direction of the second direction, the sliding surface 171 may form an inclination surface that extends in one direction of the second direction.

That is, the sliding surface 171 may form an inclination surface that extends in a direction between one direction of the first direction and one direction of the second direction, in other words, in a direction between the outside and the front of the cabinet 100 in the lateral direction thereof.

As another example, the sliding surface 171 may form an inclination surface that extends in such a way that the inclination surface becomes far away from the rotation center of the first door 210 in the second direction as the inclination surface becomes close to the cabinet 100 in the first direction, while forming an inclination surface that connects between the front surface of the cabinet 100 and the first door 210 in an inclined manner.

That is, the sliding surface 171 may form an inclination surface that extends in such a way that the inclination surface becomes far away from the rotation center of the first door 210, in the lateral direction, further toward the rear thereof. In other words, the sliding surface 171 may form an inclination surface that extends in such a way that the inclination surface becomes close to the rotation center of the first door 210, in the lateral direction, further toward the front thereof.

In this embodiment, the damper assembly 500 may be installed at the first door 210 and rotate together with the first door 210. The damper assembly 500 may be disposed at a position spaced a predetermined distance apart from the rotation center of the first door 210, and rotate along a circular orbit the center of which is the rotation center of the first door 210.

In this embodiment, the damper assembly 500 may be divided into a fixation part 510 and a movement part 520. The fixation part 510 may comprises a portion of the damper assembly 500, which is fixed to the first door 210 and is not moved. For example, the fixation part 510 may comprise a damper case 800.

Additionally, the movement part 520 may comprise a portion of the damper assembly 500, which is movable based on a movement of the piston. For example, the movement part 520 may comprise a damper cover 700.

The sliding surface 171 may form an inclination surface that extends in such a way that the least distance between the rotation orbit of the fixation part 510 and the sliding surface 171 decreases as the sliding surface 171 becomes close to the cabinet 100 in the first direction.

That is, the sliding surface 171 may form an inclination surface that that extends in such a way that the least distance between the damper case 800 and the sliding surface 171 decreases further toward the rear of the sliding surface 171.

Accordingly, as the first door 210 rotating in the closing direction becomes close to a position where the first door 210 closes the storage compartment, a distance between the damper case 800 and the sliding surface 171 may decrease.

[Mounting Structure of Damper Assembly]

As described above, the damper assembly 500 may be installed at the first door 210. The fixation part 510 of the damper assembly 500 may be inserted into the damper assembly mounting part 265 and fixed to the first door 210. Additionally, at least a portion of the movement part 520 of the damper assembly 500 may protrude to the outside of the damper assembly mounting part 265 toward the hinge assembly 150.

In this embodiment, the damper cover 700 is inserted into the damper assembly mounting part 265 and fixed to the first door 210, and a portion of the damper case 800 protrudes to the outside of the damper assembly mounting part 265 toward the hinge assembly 150, for example.

The damper assembly 500 installed as described may generate a damping force while contacting the hinge assembly 150. For example, the damper assembly 500 may generate a damping force while contacting the hinge assembly 150, as the first door 210 rotates in the closing direction.

Accordingly, as the first door 210 rotates in the closing direction, the damper assembly 500 may contact the hinge assembly 150 from a timepoint when an angle formed by the front surface of the cabinet 100 and the first door 210 is a predetermined angle or less.

In the case where the first door 210 continues to rotate in the closing direction in the state where the damper assembly 500 and the hinge assembly 150 contact each other, the operation of the damper assembly 500 may proceed and generate a damping force, while the damper assembly 500 is pressed by the hinge assembly 150.

The damper assembly 500 may be provided with a contact end 705. The contact end 705 may be provided at an end portion of one side of the movement part 520 in the lateral direction thereof, which faces the hinge assembly 150, while the contact end 705 is provided at the movement part 520.

As an example, as the movement part 520 is pressed by the hinge assembly 150, a lateral end of the movement 520, contacting the hinge assembly 150, may be provided as the contact end 705. As the damper assembly 500 contacts the hinge assembly 150, the contact end 705 may contact the sliding surface 171.

While the operation of the damper assembly 500 proceeds, the movement part 520 may move in the lateral direction, such that the position of the contact end 705 is changed in the lateral direction. For example, while the operation of the damper assembly 500 proceeds based on a rotation of the first door 210 in the closing direction, the movement part 520 may move in the other direction of the second direction. Additionally, the position of the contact end 705 may be changed in a direction where the contact end 705 becomes close to the fixation part 510.

That is, the movement part 520 may be inserted into the fixation part 510 by moving in a direction where the contact end 705 becomes close to the fixation part 510, while the operation of the damper assembly 500 proceeds. As the movement part 520 moves in a direction opposite to the direction, the movement part 520 may protrude from the fixation part 510 while the position of the contact end 705 is moved in a direction where the contact end 705 becomes far away from the fixation part 510.

The operation of the damper assembly 500 may be performed in such a way that the movement part 520 moves as described above. At a time of movement of the movement part 520, the length of the damper assembly 500 may change, and considering this, the operation of the damper assembly 500 may be performed in such a way that the length of the damper assembly 500 changes.

Thus, as the first door 210 rotates in the closing direction, the hinge assembly 150 may press the damper assembly 500 installed at the first door 210 to change the length of the damper assembly 500, and as the length of the damper assembly 500 is changed as described above, the damper assembly 500 may generate a damping force.

In this embodiment, the damper assembly 500 may be shaped into a rod the major axis of which is parallel with the second direction, i.e., the lateral direction, and the minor axis of which is parallel with the first direction, i.e., the front-rear direction. At the damper assembly 500, the fixation part 510 and the movement part 520 are arranged in the major axis direction, and the movement part 520 may move in the major axis direction.

That is, the movement part 520 may move in the lateral direction, and accordingly, a change in the position of the sliding surface 171 and a change in the length of the damper assembly 500 may occur in the lateral direction.

The damper assembly 500 may be installed in such a way that the major axis of the damper assembly 500 is parallel with the rear surface of the first door 210 or the front surface of the cabinet 100. Hereinafter, the installation form of the damper assembly 500 installed as described above is referred to as a “horizontal installation form”.

In this embodiment, the damper assembly 500 is installed at the first door 210 in a horizontal installation form, for example.

[Operations and Effects of Hinge Assembly and Damper Assembly]

As described above, the damper assembly 500 of this embodiment may be installed at the first door 210 and generate a damping force while contacting the hinge assembly 150.

The hinge assembly 150 installed at the door as described above may be disposed in the first door 210 not to protrude to the outside of the first door 210. That is, in this embodiment, the entire hinge assembly 150 may be disposed in the first door 210, not to protrude to the outside of the first door 210.

As an example, the damper cover 700, i.e., the fixation part 510, of the damper assembly 500 may be inserted into the damper assembly mounting part 265. Most of the area of the fixation part 510 inserted into the damper assembly mounting part 265 does not protrude to the hinge mounting space 260 as well as the outside of the first door 210.

Additionally, a portion of the movement part 520 that is movably installed in the fixation part 510 may be inserted into the fixation part 510. The remaining portion of the movement part 520, which is not inserted into the fixation part, may be disposed in the hinge mounting space 260.

Thus, the entire damper assembly 500 may be disposed in the first door 210, not to protrude to the outside of the first door 210. The movement part 520 of the damper assembly 500, disposed as described above, does not protrude to the rear of the first door 210 as well as the front of the first door 210. This is because the movement of the movement part 520 is performed only in the lateral direction and not in the front-rear direction.

Further, the movement part 520 may also not protrude in the lateral direction of the first door 210. The movement part 520 may protrude to the hinge mounting space 260 only, and not escape from the inner space of the first door 210, even if the movement part 520 protrudes from the fixation part 510 at a maximum level. That is, the position of the contact end 705, corresponding to the end portion of the movement part 520 in the lateral direction thereof, may be changed only in an area within the hinge mounting space 260.

Further, in the case where the movement part 520 contacts the hinge assembly 150, the contact end 705 must be disposed between the sliding surface 171 and the fixation part 510. That is, the movement part 520 does not protrude to the outside of the first door 210 in any direction of the forward, rearward and lateral directions and remains in the inner area of the first door 210.

In this embodiment, the damper assembly 500 is installed at the door. Accordingly, in the case where a contained angle between the front surface of the cabinet 100 and the door remains at an interior angle even if the door is closed or opened, the damper assembly 500 is hardly seen at the front side of the refrigerator.

Additionally, the damper assembly 500 of this embodiment is installed in the door, i.e., at a position hidden by the door, such that the damper assembly 500 is hardly identified at the front side of the refrigerator and is hardly identified in any direction.

As described above, the damper assembly 500 of this embodiment maybe installed at the first door 210 in the horizontal installation form. At the damper assembly 500, the movement part 520 may move in the second direction or the lateral direction or the major axis direction of the damper assembly 500.

Additionally, based on the movement of the movement part 520, a change in the length of the damper assembly 500 and a change in the position of the sliding surface 171 may occur in the second direction or the lateral direction or the major axis direction of the damper assembly 500.

The damper assembly 500 of this embodiment, installed as described above at the first door 210 in the horizontal installation form, may generate a damping force, while contacting the hinge assembly 150. Thus, the movement part 520 may move in the lateral direction while contacting the hinge cover 170, and the movement part 520 moving as described above may be inserted into the fixation part 510. While the movement part 520 moves and is inserted into the fixation part 510 as described above, the damper assembly 500 may generate a damping force.

While the first door 210 rotates in the closing direction, the damper assembly 500 may move together with the first door 210 in a direction where the damper assembly 500 becomes close to the cabinet 100. In the case where the first door 210 continues to rotate in the closing direction in the state where the damper assembly 500 contacts the hinge assembly 150, the damper assembly 500 may continue to move in the direction where the damper assembly 500 becomes close to the cabinet 100, and the movement part 520 may move in the lateral direction while being pressed by the hinge cover 170.

At this time, the movement part 520 may be inserted into the fixation part 510, moving in the lateral direction, at the same time as the movement part 520 moves rearward together with the first door 210, sliding along the sliding surface 171.

As an example, the damper cover 700 forming the movement part 520, and the hinge cover 170 contacting the damper cover 700 may be made of a plastic material having high strength. For example, the damper cover 700 and the hinge cover 170 may be made of a material such as polyoxymethylene (POM) and the like that has high strength and is capable of providing a smooth surface.

The strength of the damper cover 700 and the hinge cover 170 provided as described above is high enough to ensure durability despite repetitive use, and the damper cover 700 and the hinge cover 170 help the movement part 520 to slide smoothly in a state where the movement part 520 and the hinge cover 170 contact each other.

In this embodiment, at least a portion of the hinge assembly 150 may be inserted into the hinge mounting space 260. Additionally, the movement part 520 may contact the hinge assembly 150 in the hinge mounting space 260.

As an example, the movement part 520 may contact the hinge assembly 150 in the inner area of the first door 210. That is, the movement part 520 may contact the hinge assembly 150 only at a position where the movement part 520 does not protrude to the outside of the first door 210, while the movement part 520 does not contact the hinge assembly 150 outside the inner area of the first door 210.

If the movement part 520 is provided in such a way that the movement part 520 generates a damping force while contacting the cabinet 100 rather than the hinge assembly 150, at least a portion of the movement part 520 needs to protrude to the rear of the first door 210. Unless the movement part 520 protrudes to the rear of the first door 210, the movement part 520 cannot move due to contact between the movement part 520 and the cabinet 100.

That is, the movement part 520 needs to protrude rearward toward the cabinet 100 from the first door 210 by a distance that is moved by the movement part 520 until the first door 210 is closed after the movement part 520 and the cabinet 100 contact each other.

However, in the case where the movement part 520 protrudes to the outside of the door as described above, the damper assembly is easily seen as the first door 210 is opened.

Considering this, the damper assembly 500 in this embodiment may be disposed in the door without protruding to the outside of the door, and the damper assembly 500 disposed as described above generate a damping force while contacting the hinge assembly 150 in the door rather than the cabinet 100.

The damper assembly 500 may be disposed at the lateral portion of the hinge assembly 150, in the door, and may be installed in the horizontal installation form, in the door. The damper assembly 500 of this embodiment may be disposed in the door before the damper assembly 500 operates, and remain in the inner area of the door without protruding to the outside of the door in the state where the damper assembly 500 operates to generate a damping force.

The damper assembly 500 of this embodiment, installed as describe above, may effectively provide a damping force needed to adjust the rotation speed of the door and remain hidden at a position that is hardly seen.

Further, the damper assembly 500 of this embodiment, installed as described above, does not form a structure protruding from the door or the cabinet 100 and the like, such that the damper assembly 500 is effectively protected from damage caused by a collision with another object.

[Second Example of Damper Assembly—Second Embodiment of Refrigerator]

Figure 28:
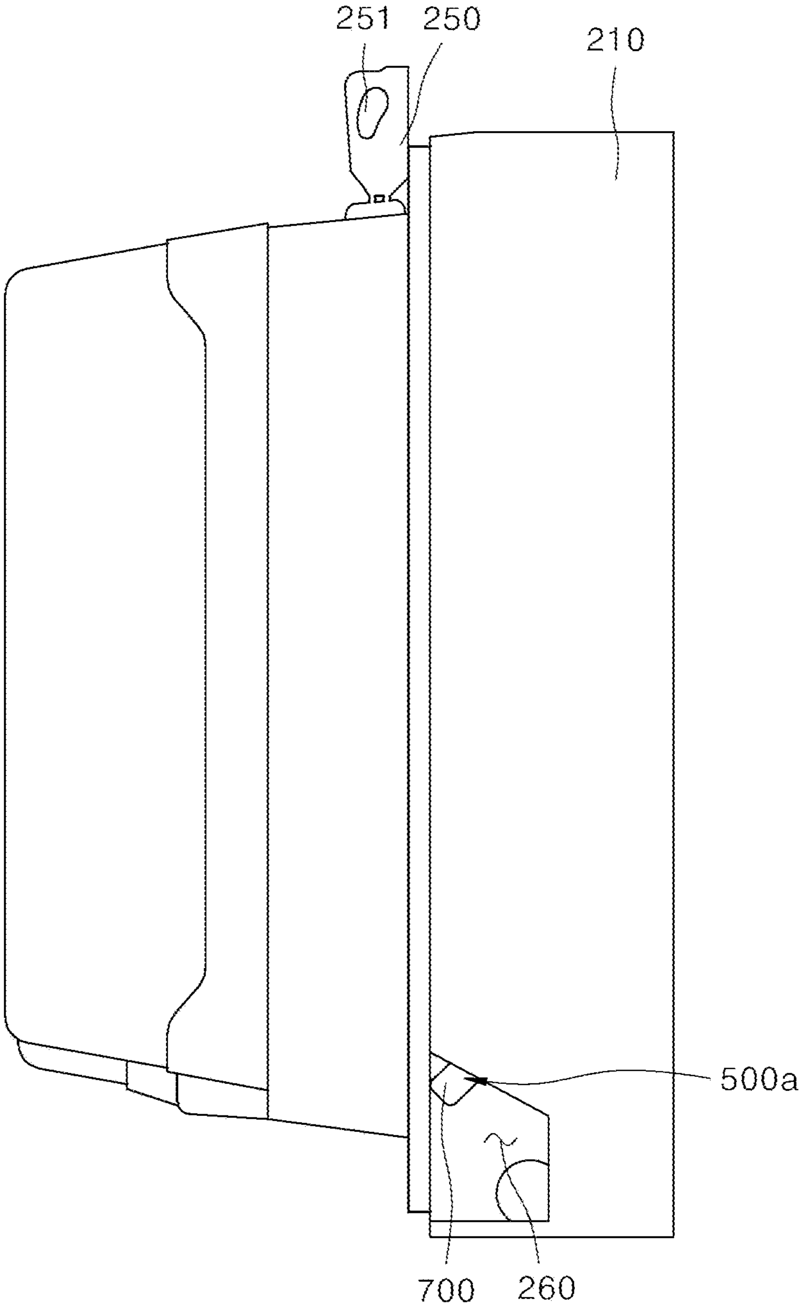
FIG. 28 is a plan view of a portion of a door provided with a damper assembly of a second embodiment.
Figure 29:
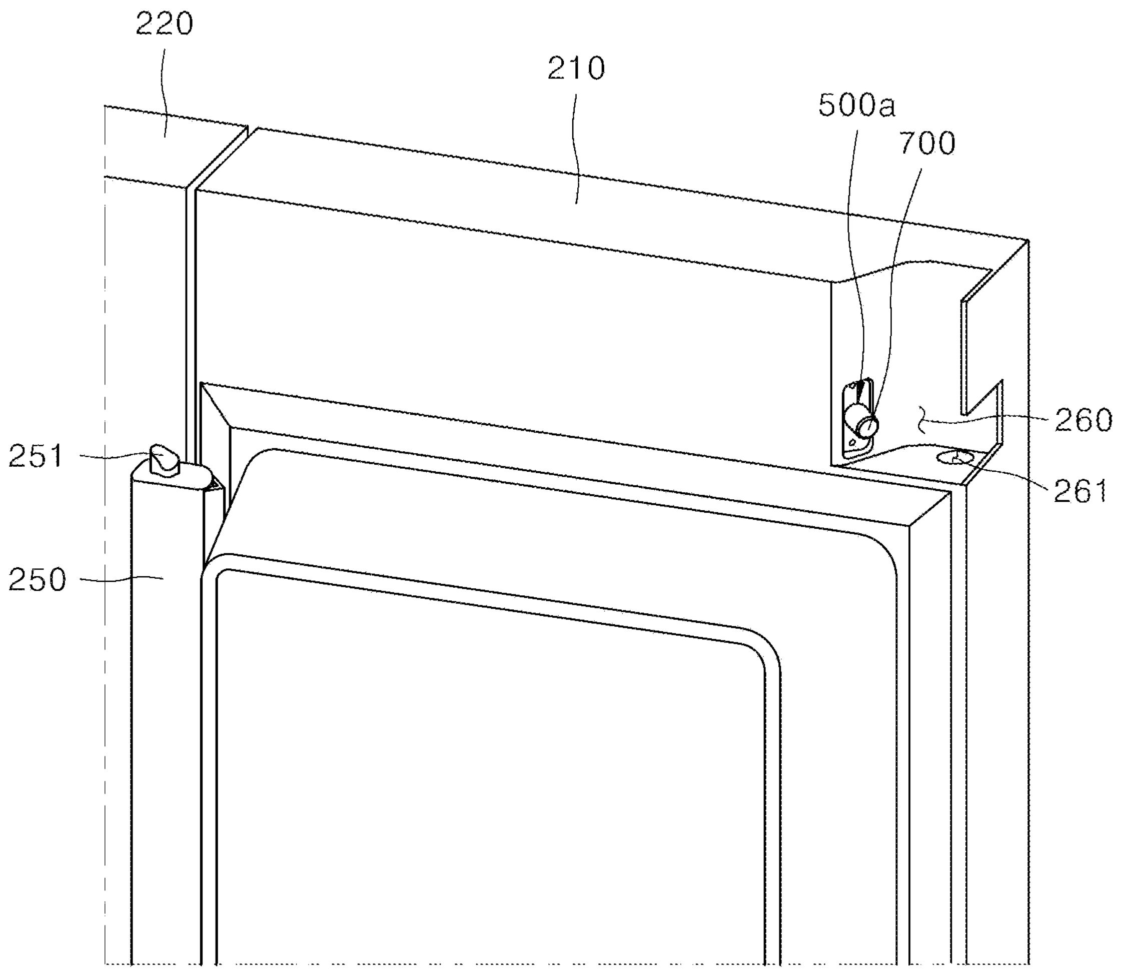
FIG. 29 is a perspective view of the rear surface of the door illustrated in FIG. 28.
Figure 30:
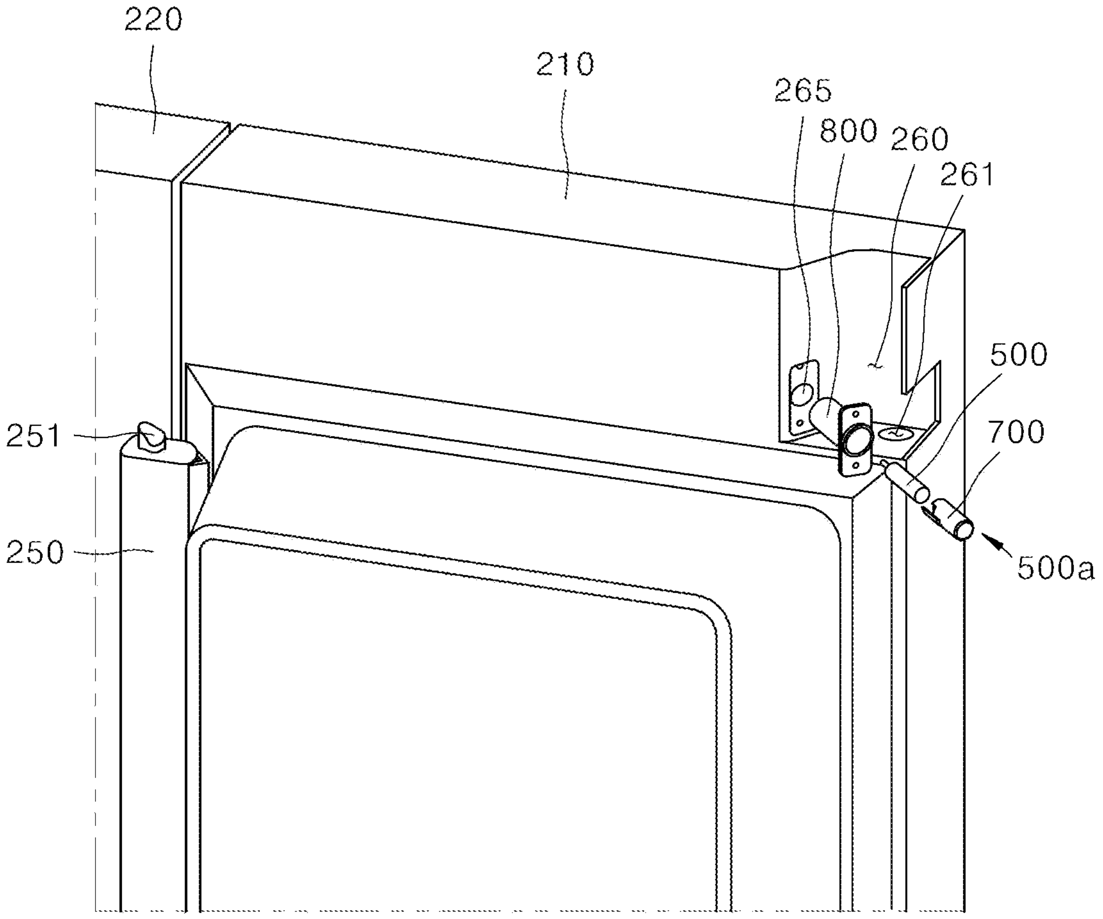
FIG. 30 is an explode perspective view of an exploded state of a damper assembly illustrated in FIG. 29.
Figure 31:
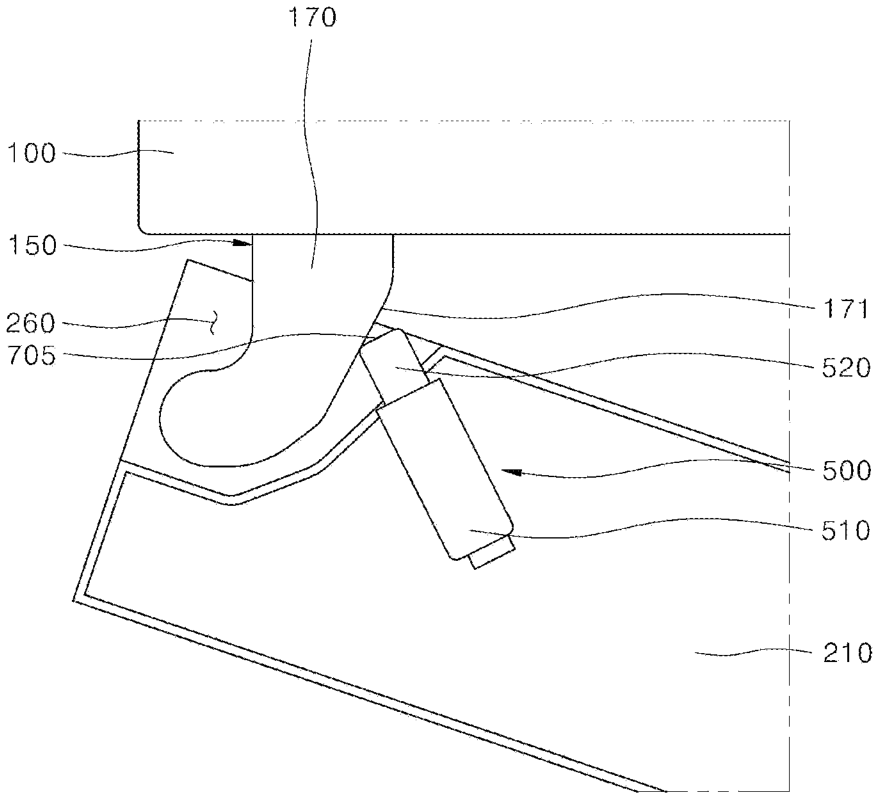
FIG. 31 is a planar cross-sectional view of a mounted state of a damper assembly of a second embodiment.
Figure 32:
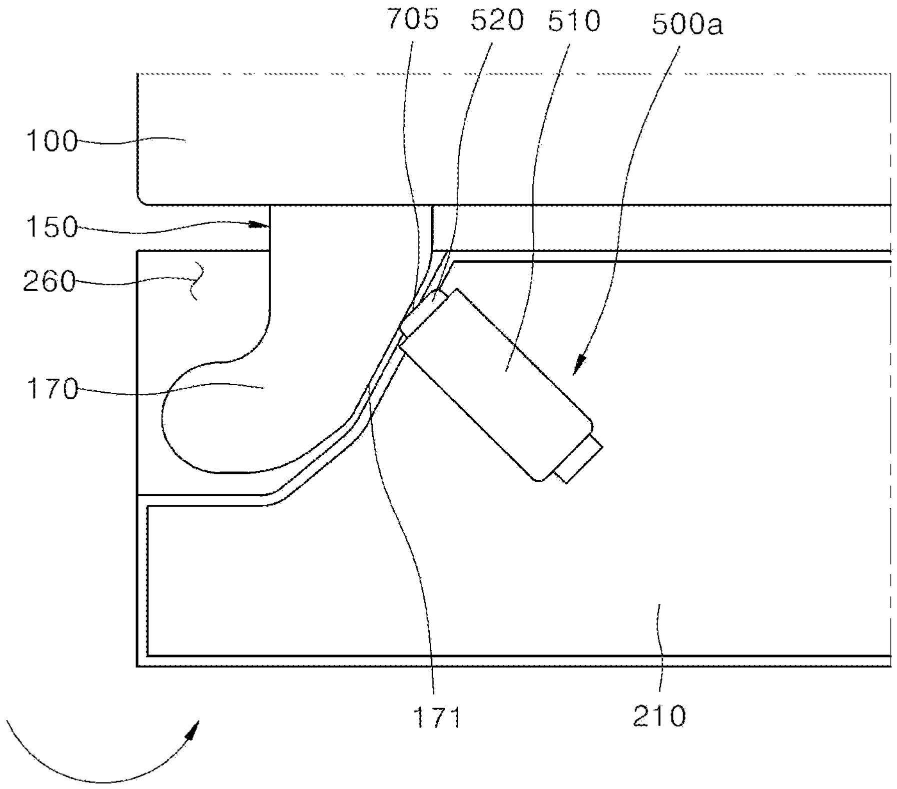
FIG. 32 is a planar cross-sectional view of a state in which the damper assembly illustrated in FIG. 31 is moved along a door that is rotated in a closing direction.
Figure 33:
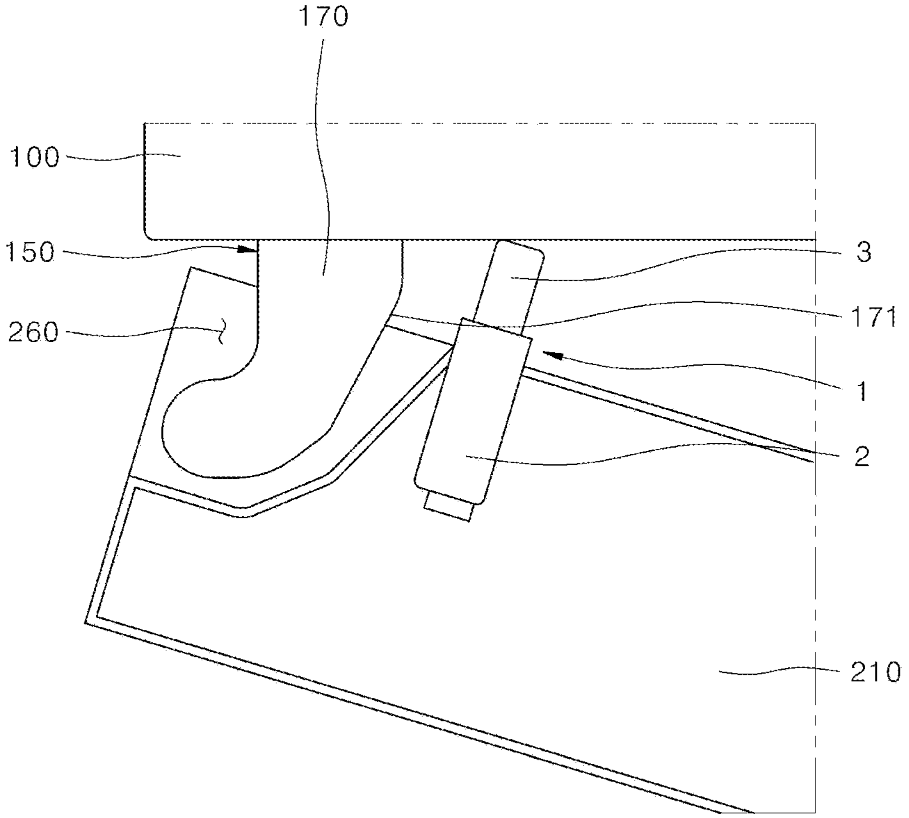
FIG. 33 is a planar cross-sectional view of a damper assembly perpendicularly mounted on a door.
Figure 34:
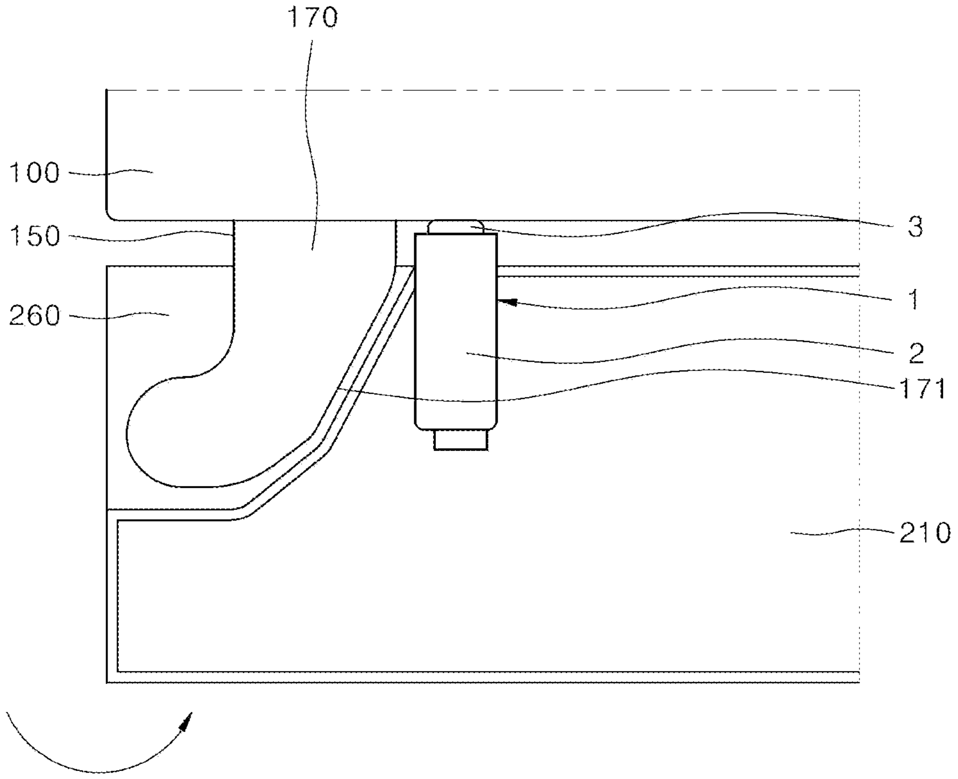
FIG. 34 is a planar cross-sectional view of a state in which the damper assembly illustrated in FIG. 33 is moved along a door that is rotated in a closing direction.
Figure 35:
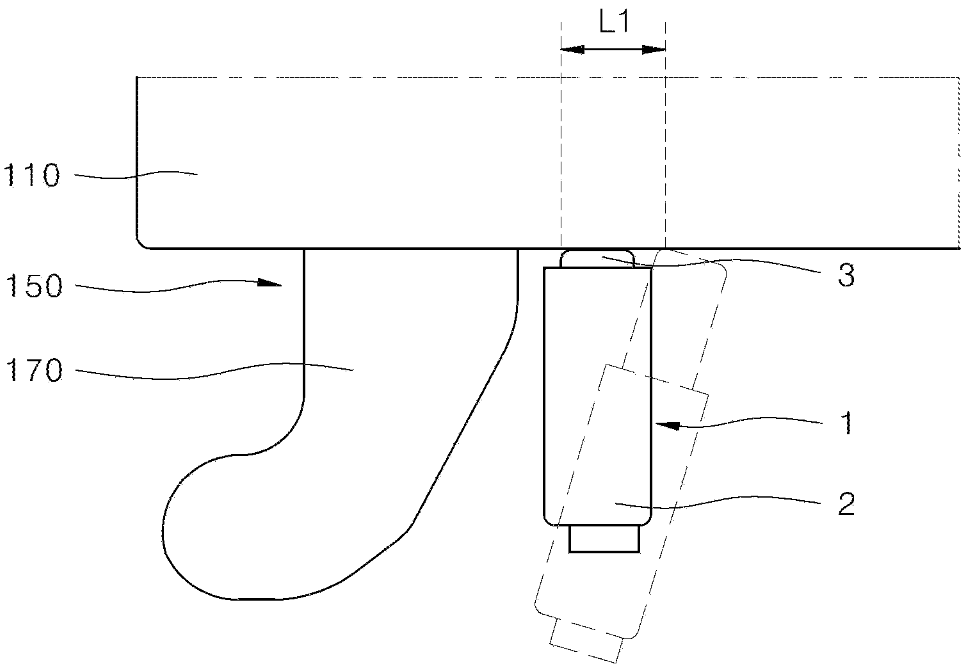
FIG. 35 is a planar cross-sectional view of a moved state of a damper assembly perpendicularly mounted on a door.
Figure 36:
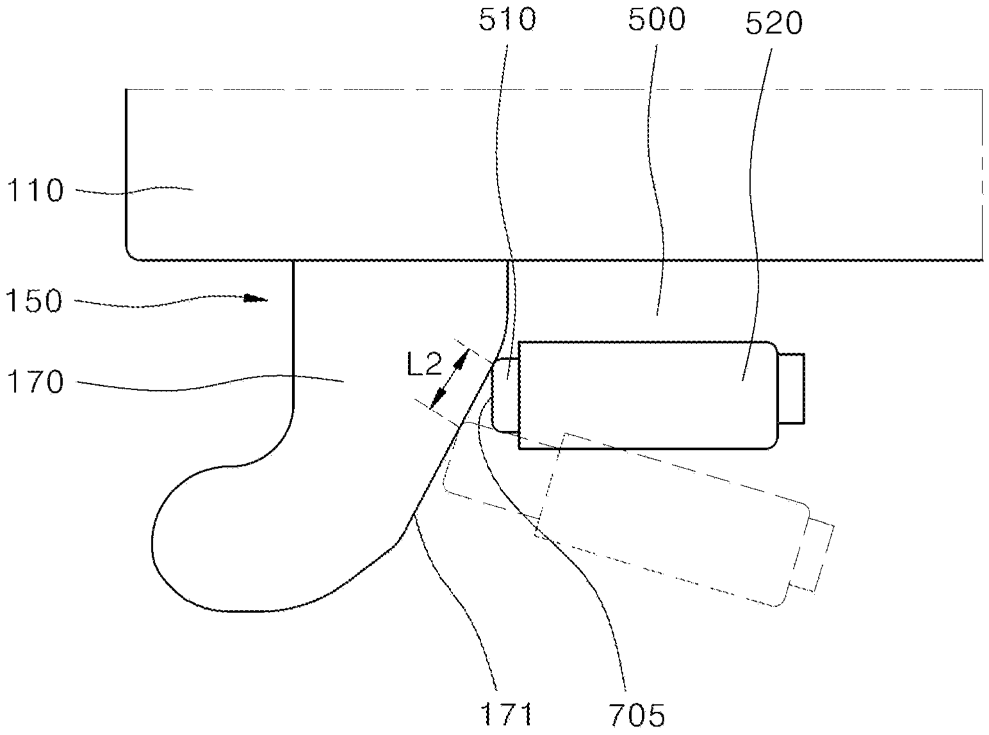
FIG. 36 is a planar cross-sectional view of a moved state a damper assembly of the first embodiment.
Figure 37:
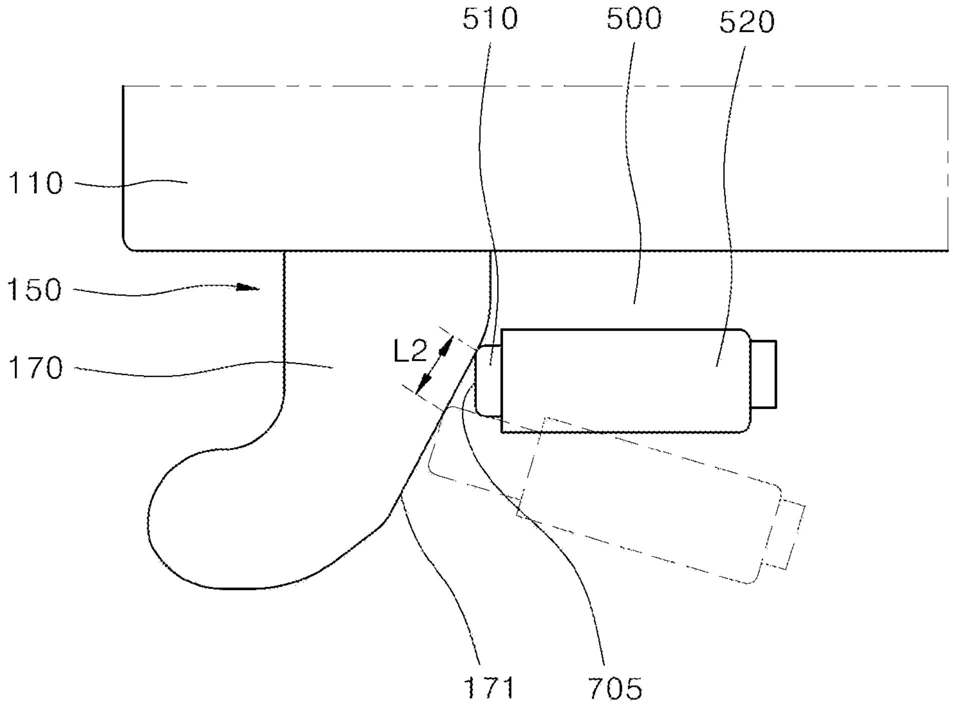
FIG. 37 is a planar cross-sectional view of a moved state of the damper assembly of the second embodiment.

FIG. 28 is a plan view of a portion of a door provided with a damper assembly of a second embodiment, FIG. 29 is a perspective view of the rear surface of the door illustrated in FIG. 28, and FIG. 30 is an exploded perspective view of an exploded state of a damper assembly illustrated in FIG. 29. FIG. 31 is a planar cross-sectional view of a mounted state of the damper assembly of the second embodiment, and FIG. 32 is a planar cross-sectional view of a state in which the damper assembly illustrated in FIG. 31 is moved along a door that is rotated in a closing direction. FIG. 33 is a planar cross-sectional view of a damper assembly perpendicularly mounted on a door, and FIG. 34 is a planar cross-sectional view of a state in which the damper assembly illustrated in FIG. 33 is moved along a door that is rotated in a closing direction. FIG. 35 is a planar cross-sectional view of a moved state of a damper assembly perpendicularly mounted on a door, FIG. 36 is a planar cross-sectional view of a moved state the damper assembly of the first embodiment, and FIG. 37 is a planar cross-sectional view of a moved state of the damper assembly of the second embodiment.

Referring to FIGS. 28 to 30, like the damper assembly 500 (see FIG. 4) illustrated in the above-described embodiment, the damper assembly 500*a* of the second embodiment may be installed at the first door 210. The damper assembly 500*a* may be installed in the hinge mounting space 260, and disposed in the first door 210 without protruding to the outside of the first door 210.

The damper assembly 500 illustrated in the above-described embodiment significantly differs from the damper assembly 500*a* of the second embodiment, in their installation form. That is, while the damper assembly 500 illustrated in the above-described embodiment is installed in the horizontal installation form, the damper assembly 500*a* of the second embodiment may be installed in an inclined disposition form.

As an example, the damper assembly 500*a* may be disposed in such a way that the major axis of the damper assembly 500*a* inclines in a direction between the front-rear direction and the lateral direction. Hereinafter, the installation form of the damper assembly 500*a* installed as described above is referred to as an "inclined installation form".

The fixation part 510 of the damper assembly 500*a* may be inserted into a damper assembly mounting part 267 and fixed to the first door 210. In this embodiment, the damper assembly mounting part 267 is formed in such a way that the damper assembly mounting part 267 is depressed in an inclined manner, toward the inside of the first door 210, in a direction between the front-rear direction and the lateral direction, for example.

The damper assembly 500*a* may be inserted into the damper assembly mounting part 267 formed in an inclined manner, and fixed to the first door 210 in such a way that the damper assembly 500*a* inclines in parallel with the damper assembly mounting part 267.

As the damper assembly 500*a* is installed in the inclined installation form as described above, the movement part 520 may protrude from the fixation part 510 in a direction between the other direction of the first direction and one direction of the second direction, in other words, a direction between the outside of the cabinet 100 in the lateral direction thereof and the rear of the cabinet 100.

As illustrated in FIGS. 32 and 33, the movement part 520 protruding from the fixation part 510 as described above may be provided in such a way that the movement part 520 is movable in a direction where a distance in the first direction, i.e., a distance in the front-rear direction, between the front surface of the cabinet 100 and the contact end 705 changes.

Specifically, the movement part 520 may be provided in such a way that the movement part 520 moves in a direction where a distance between the contact end 705 and the fixation part 510 decreases and a direction where a distance between the contact end 705 and the cabinet 100 increases, as the first door 210 rotates in the closing direction.

The movement part 520 provided as described above may be inserted into the fixation part 510, while moving in a direction between one direction of the first direction and the other direction of the second direction, in other words, in a direction between the inside of the cabinet 100 in the lateral direction thereof and the front of the cabinet 100, as the damper assembly 500*a* operates.

That is, the damper assembly 500*a* may be installed in the first door 210, in the inclined installation form, and the movement part 520 may be inserted into the fixation part 510 while the movement part 520 moves in a direction parallel with the major axis of the damper assembly 500*a* disposed in an inclined manner.

The length of the damper assembly 500*a* installed as described above may change in a direction between the first direction and the second direction. Specifically, the length of the damper assembly 500*a* may change in a direction inclined between one direction of the first direction and the other direction of the second direction or in a direction inclined between the inside of the cabinet 100 in the lateral direction thereof and the front of the cabinet 100, while changing based on the movement of the movement part 520.

As the first door 210 rotates in the closing direction, the length of the damper assembly 500*a* in the first direction and the length of the damper assembly 500*a* in the second direction may decrease. At this time, a point at which the damper assembly 500 contacts the hinge assembly 150, i.e., the contact end 705, may become far away from the cabinet 100 in the first direction and become far away from the rotation center of the first door 210 in the second direction.

That is, as the first door 210 rotates in the closing direction, the length of the damper assembly 500 may decrease in such a way that the contact end 705 becomes far away from the rotation center of the first door 210 and the cabinet 100 while moving in a direction between the forward direction and the lateral direction.

On the contrary, as the first door 210 rotates in the opening direction, the length of the damper assembly 500*a* in the first direction and the length of the damper assembly 500*a* in the second direction may increase. At this time, the point at which the damper assembly 500 contacts the hinge assembly 150, i.e., the contact end 705, may become close to the cabinet 100 in the first direction and become far away from the rotation center of the first door 210 in the second direction.

That is, as the first door 210 rotates in the opening direction, the length of the damper assembly 500 may decrease in such a way that the contact end 705 becomes close to the rotation center of the first door 210 and the cabinet 100 while moving in a direction between the rearward direction and the lateral direction.

Hereinafter, the operation and effect of a refrigerator provided with the damper assembly 500*a* of the second embodiment are described.

FIGS. 33 and 34 show a damper assembly 1 where the major axis of the damper assembly 1 is disposed in parallel with an axis in the front-rear direction, for example. Hereinafter, the installation form of the damper assembly 1 installed as described above is referred to as a "perpendicular installation form".

The damper assembly 1 installed in the perpendicular installation form may generate a damping force while contacting the front surface of the cabinet 100. At the damper assembly 1 installed in the perpendicular installation form, a fixation part 2 and a movement part 3 may be disposed in the front-rear direction.

The movement part 3 may move in the front-rear direction, relative to the first door 210.

The movement part 3 may contact the front surface of the cabinet 100, at the rear side of the first door 210, and while the movement part 3 moves forward and is inserted into the fixation part 2, the damper assembly 1 may generate a damping force.

The movement part 3 may move forward while being pressed by the front surface of the cabinet 100. To this end, at least a portion of the movement part 3 may protrude to the rear of the first door 210. For example, after the movement part 3 and the cabinet 100 contact each other, the movement part 3 may protrude rearward toward the cabinet 100 from the first door 210 by a length that is moved by the movement part 3 until the first door 210 is closed.

Accordingly, the damper assembly 1 installed in the perpendicular installation form may be readily exposed forward as the first door 210 is opened. Additionally, the damper assembly 1 installed as described above may form a structure protruding from the door, such that the damper assembly 1 is easily exposed to damage caused by a collision with another object.

Additionally, at the damper assembly 1 installed in the perpendicular installation form, the movement part 3 may move forward while being pressed by the front surface of the cabinet 100. At this time, the movement part 3, as illustrated in FIG. 35, may be inserted into the fixation part 2 while sliding in the lateral direction along the front surface of the cabinet 100.

That is, at the damper assembly 1 installed in the perpendicular installation form, the front surface of the cabinet 100 may press the movement part 3, and the movement part 3 may be inserted into the fixation part 2 while sliding along the front surface of the cabinet 100.

A portion of the front surface of the cabinet 100, contacting the movement part 3, may have a mark, a scratch and the like formed by a press. That is, a press or a scratch and the like of a slide length L1 of the movement part 3 may be formed on the front surface of the cabinet 100. Additionally, the mark or the scratch and the like formed on the front surface of the cabinet 100 may be readily exposed and noticed as the door is opened.

That is, the damper assembly 1 installed in the perpendicular installation form may leave a mark or a scratch and the like, caused by a press, on the front surface of the cabinet 100, while contacting the front surface of the cabinet 100 and operating, causing deterioration in the aesthetic qualities of the refrigerator.

In this embodiment, the damper assembly 500*a*, as illustrated in FIGS. 31 and 32, is installed at the first door 210, in the inclined installation form. Like the damper assembly 500 (see FIG. 26) installed in the horizontal installation form, the damper assembly 500*a* installed at the first door 210 in the inclined installation form may generate a damping force while contacting the hinge assembly 150 in the door, instead of contacting the cabinet 100, and may be disposed in the door without protruding to the outside of the door.

Most of the area of the fixation part 510 inserted into the damper assembly mounting part 265 may not protrude to the hinge mounting space 260 as well as the outside of the first door 210. Further, a portion of the movement part 520 that is movably installed in the fixation part 510 may be inserted into the fixation part 510. The remaining portion of the movement part 520, which is not inserted into the fixation part 510, may be disposed in the hinge mounting space 260.

Accordingly, the entire damper assembly 500*a* may be disposed in the first door 210 without protruding to the outside of the first door 210. The movement part 520 of the damper assembly 500 disposed as described above does not protrude to the rear of the first door 210 as well as the front of the first door 210.

Even if the movement part 520 protrudes from the fixation part 510 at a maximum level, the movement part 520 may protrude only to the hinge mounting space 260 without escaping from the inner area of the first door 210. That is, the position of the contact end 705 corresponding to the end portion of the movement part 520 in the lateral direction thereof may change only in the area within the hinge mounting space 260.

In the case where a maximum distance moved by the movement part 520 of the damper assembly 500*a* installed in the inclined installation form is the same as a maximum distance moved by the movement part 520 of the damper assembly 500 installed in the horizontal installation form, the damper assembly 500*a* installed in the inclined installation form needs to be disposed further forward than the damper assembly 500 installed in the horizontal installation form.

If so, even in the state where the movement part 520 protrudes at a maximum level, the damper assembly 500*a* installed in the inclined installation form may remain in the inner area of the first door 210 without protruding to the outside of the first door 210.

While the position of the movement part 520 of the damper assembly 500 installed in the horizontal installation form changes only in the lateral direction, the position of the movement part 520 of the damper assembly 500*a* installed in the inclined installation form changes in the front-rear direction as well as the lateral direction.

Accordingly, the damper assembly 500*a* installed in the inclined installation form needs to be disposed further forward by a set distance than the damper assembly 500 installed in the horizontal installation form, such that the movement part 520 of the damper assembly 500*a* installed in the inclined installation form does not escape from the inner area of the first door 210 even if the movement part 520 of the damper assembly 500*a* installed in the inclined installation form protrudes at a maximum level.

The set distance may be set considering a range of changes in the position of the movement part 520 in the front-rear direction at the damper assembly 500*a* installed in the inclined installation form. For example, in the case where the front-rear position of the movement part 520 at the damper assembly 500*a* installed in the inclined installation form is changed by a maximum of 10 mm, the set distance may be set to 10 mm or greater.

In the state where the movement part 520 and the hinge assembly 150 have not yet contacted each other or have just started to contact each other, that is, in the state where the movement part 520 protrudes from the fixation part 510 at a maximum level, there is almost no difference between the front-rear position of the contact end 705 at the damper assembly 500*a* installed in the inclined installation form and the front-rear position of the contact end 705 at the damper assembly 500 installed in the horizontal installation form.

In this embodiment, the movement part 520 is inserted into the fixation part 510, and to this end, the diameter of the movement part 520 may be less than the diameter of the fixation part 510. Accordingly, at the damper assembly 500 installed in the horizontal installation form, the end portion of the rear of the movement part 520 is disposed further forward than the end portion of the rear of the fixation part 510.

For the fixation part 510 to be inserted into the first door 210, the fixation part 510 needs to be disposed at a position that is spaced forward from the rear surface of the first door 210 by a predetermined distance. Considering the fact that the movement part 520 is inserted into the fixation part 510, understandably, the movement part 520 must be disposed at a position that is spaced forward from the rear surface of the first door 210 by a significant distance.

Thus, contact between the movement part 520 and the hinge assembly 150 may not be performed on the same line as the rear surface of the first door 210, but may be performed at a position that is spaced forward from the rear surface of the first door 210 by a significant distance (see FIG. 26).

At the damper assembly 500*a* installed in the inclined installation form, since the fixation part 510 is disposed in an inclined manner without being disposed in the horizontal direction, the end portion of the rear of the movement part 520, i.e., the contact end 705, may be dispose further rearward than the fixation part 510.

That is, at the damper assembly 500*a* installed in the inclined installation form, the contact end 705 is disposed on the same line as the rear surface of the first door 210, without causing a problem.

Accordingly, the movement part 520 of the damper assembly 500*a* installed in the inclined installation form may move further rearward than the movement part 520 of the damper assembly 500 installed in the horizontal installation form, within a range where the movement part 520 does not escape from the inner area of the first door 210 (see FIG. 31).

As the first door 210 rotates in the closing direction, the movement part 520 of the damper assembly 500*a* installed in the inclined installation form may move in a direction between the lateral direction and the forward direction, relative to the first door 210. That is, the position of the movement part 520 of this embodiment may change in the forward direction as well as the lateral direction, relative to the first door 210.

As the first door 210 is closed completely, the movement part 520 of this embodiment may contact the hinge assembly 150 while moving in the forward direction as well as the lateral direction, relative to the first door 210. That is, the position of the contact end 705 relative to the first door 210, in the state where the first door 210 is closed completely, may change further forward than in the state where the first door 210 is not yet closed (see FIG. 32).

However, the movement part 520 of the damper assembly 500 installed in the horizontal installation form may contact the hinge assembly 150 at a position where the movement part 520 moves only in the lateral direction, relative to the first door 210 (see FIG. 27).

Referring to FIG. 36, as the first door 210 is closed completely, the movement part 520 of the damper assembly 500 installed in the horizontal installation form contacts the hinge assembly 150 while moving only in the lateral direction, relative to the first door 210, but does not move in the forward direction. Accordingly, the front-rear position of the contact end 705, relative to the first door 210, does not change before the first door 210 is closed or when the first door 210 is closed completely.

Considering this, as the first door 210 rotates in the closing direction, the front-rear position of the contact end 705 may change by a value of a change in the front-rear position of the entire damper assembly 500. For example, in the case where the position of the entire damper assembly 500 moves rearward toward the front surface of the cabinet 100 by 10 mm, the position of the contact end 705, i.e., the position of the contact point between the sliding surface 171 and the contact end 705 may also change to a position where the position the contact point moves rearward toward the front surface of the cabinet 100 by 10 mm.

However, at the damper assembly 500*a* of this embodiment as illustrated in FIG. 37, the position of the contact end 705 may change in the forward direction as well as the lateral direction, relative to the first door 210, as the first door 210 rotates in the closing direction. Accordingly, the front-rear position of the contact end 705 relative to the first door 210 may change gradually while the first door 210 rotates in the closing direction.

As the first door 210 rotates in the closing direction, the movement part 520 may be inserted into the fixation part 510 by sliding along the sliding surface 171, while moving rearward together with the first door 210. The movement part 520 may move in a direction between the lateral direction and the forward direction while sliding along the sliding surface 171. Accordingly, the position of the movement part 520 relative to the first door 210 may change in the lateral direction and the forward direction while the first door 210 rotates in the closing direction.

That is, the movement part 520 may move forward relative to the first door 210 while moving rearward together with the first door 210, as the first door 210 rotates in the closing direction. Thus, a change in the position of the sliding surface 171 may be less than a change in the position of the entire damper assembly 500*a*.

For example, if the position of the entire damper assembly 500 moved rearward toward the front surface of the cabinet 100 by 10 mm, the position of the contact end 705, i.e., the position of the contact point between the sliding surface 171 and the contact end 705, may change to a position where the position of the contact point moves rearward toward the front surface of the cabinet 100 by about 5 mm.

Disposition of the contact point between the sliding surface 171 and the contact end 705, for the contact point to be eccentric further forward at a time when the first door 210 is closed completely, denotes a decrease in the sliding distance L3 of the movement part 520, which is needed until the first door 210 is closed completely.

For example, in the case where the sliding distance L2 of the movement part 520, required until the first door 210 is closed completely, in a refrigerator provided with the damper assembly 500 (see FIG. 36) installed in the horizontal installation form is about 10 mm, while the sliding distance L3 of the movement part 520, required until the first door 210 is closed completely, in a refrigerator provided with the damper assembly 500*a* of this embodiment installed in the inclined installation form may decrease to about 5 mm.

Additionally, the damper assembly 500*a* of this embodiment installed in the inclined installation form may start to contact the hinge assembly 150 at a position where the damper assembly 500*a* installed in the inclined installation form is further rearward than the damper assembly 500 installed in the horizontal installation form.

That is, the damper assembly 500*a* of this embodiment may start to contact the hinge assembly 150 at a position where the damper assembly of this embodiment is further rearward than the damper assembly 500 installed in the horizontal installation form, and allow the movement part 520 to slide up to a position where the damper assembly of this embodiment is further forward than the damper assembly 500 installed in the horizontal installation form, such that the sliding distance L3 of the movement part 520, required until the first door 210 is closed completely, in the damper assembly 500*a* installed in the inclined installation form may be significantly less than in the damper assembly 500 installed in the horizontal installation form.

As the sliding distance L3 of the movement part 520, required until the first door 210 is closed completely, decreases, contact time between the hinge assembly 150 and the damper assembly 500*a*, specifically, between the hinge cover 170 and the damper cover 700, may decrease, such that wear and noise caused by their contact are suppressed effectively.

[Third Example of Hinge Assembly—Third Embodiment of Refrigerator]

Figure 38:
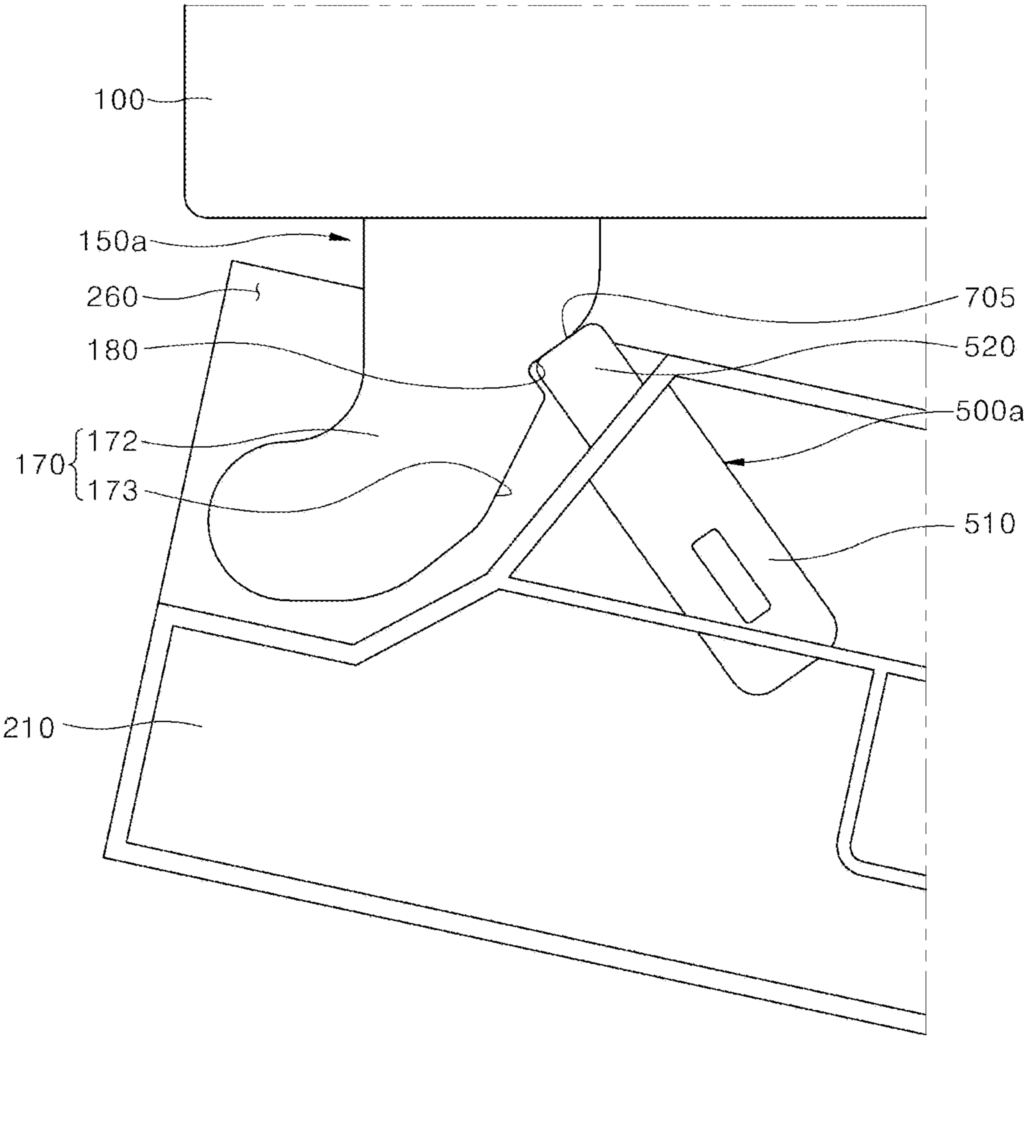
FIG. 38 is a planar cross-sectional view of mounted states of a hinge assembly and a damper assembly of a third embodiment.
Figure 39:
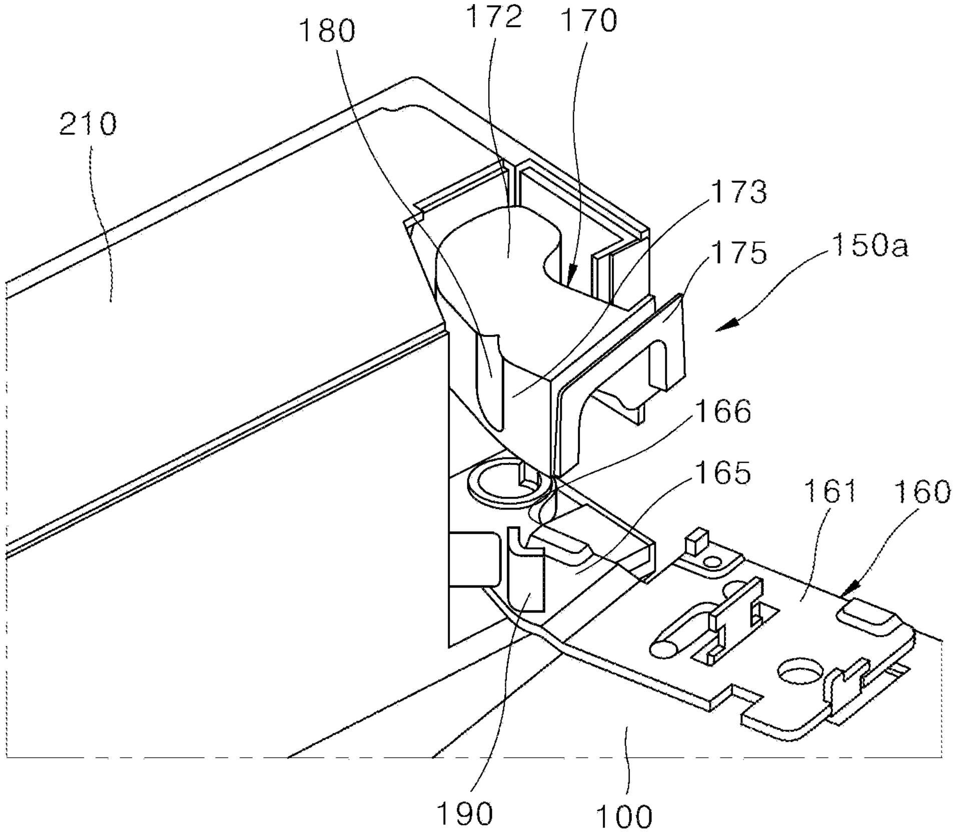
FIG. 39 is an exploded perspective view of an exploded state of the hinge assembly illustrated in FIG. 38.
Figure 40:
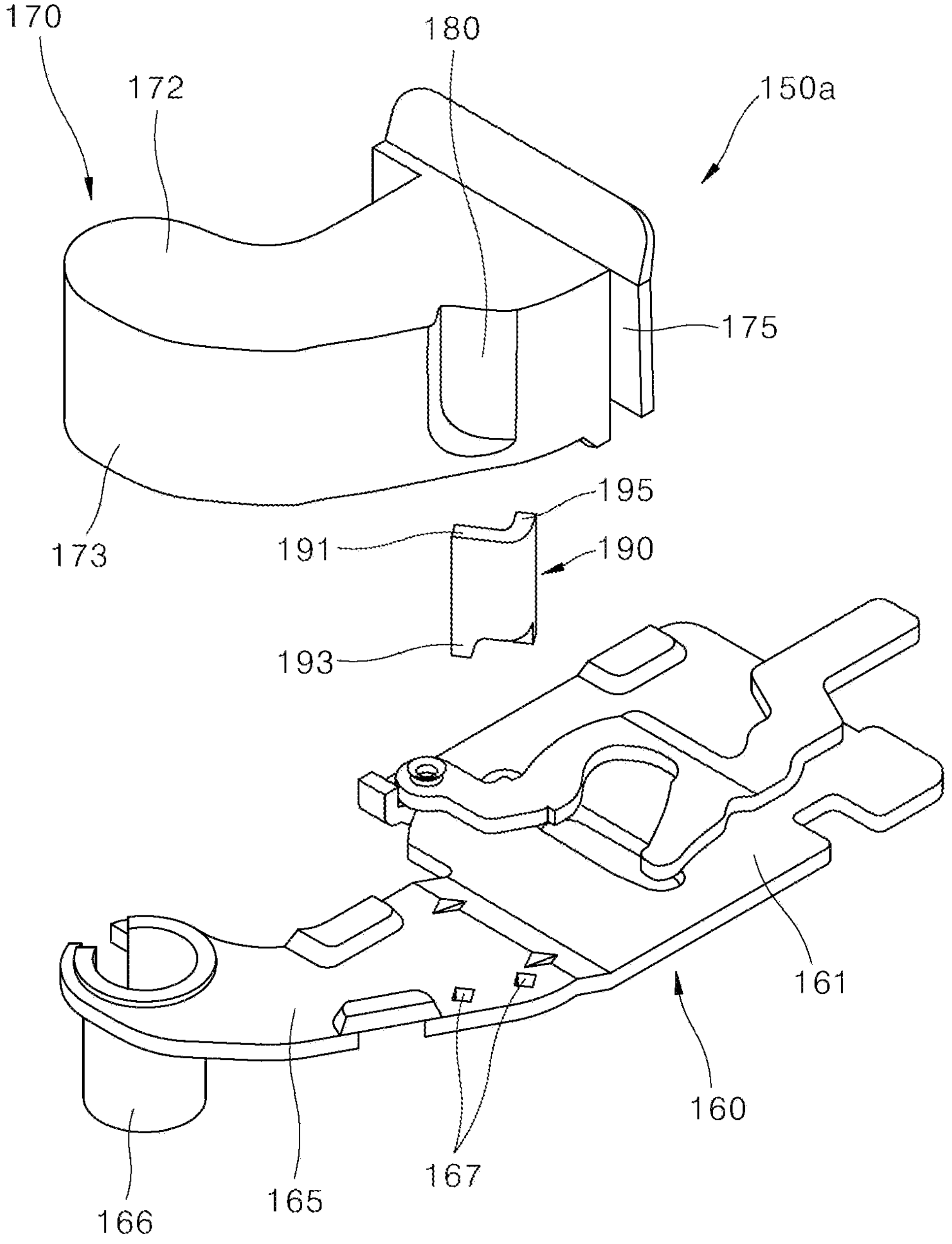
FIG. 40 is an exploded perspective view separately showing the hinge assembly illustrated in FIG. 39.

FIG. 38 is a planar cross-sectional view of mounted states of a hinge assembly and a damper assembly of a third embodiment, FIG. 39 is an exploded perspective view of an exploded state of the hinge assembly illustrated in FIG. 38, and FIG. 40 is an exploded perspective view separately showing the hinge assembly illustrated in FIG. 39.

Referring to FIGS. 38 to 40, a hinge assembly 150*a* of the refrigerator of the third embodiment may comprise a hinge 160 and a hinge case 170.

The hinge 160 may form the skeleton of the hinge assembly 150*a* and be provided to connect the cabinet 100 and the first door 210. The hinge 160 may be coupled to the cabinet 100 and supported by the cabinet 100, and the first door 210 may rotatably connect to the hinge 160.

As an example, the hinge 160 may comprise a first hinge main body 161 and a second hinge main body 165.

The first hinge main body 161 may be disposed at the upper side of the cabinet 100. For example, the first hinge main body 161 may be disposed in an area where the first hinge main body 161 overlaps the cabinet 100 in the up-down direction. The first hinge main body 161 may be coupled to the upper surface of the cabinet 100.

The second hinge main body 165 may connect to the first hinge main body 161 in the front-rear direction, and be provided to protrude to the front of the cabinet 100. The second hinge main body 165 may connect to the first door 210 at the front side of the cabinet 100.

The second hinge main body 165 may be provided with the hinge shaft 166. The hinge shaft 166 may be provided in such a way that the hinge shaft 166 protrudes from the second hinge main body 165 in the up-down direction. The hinge shaft 166 may be mounted on the hinge mounting part 261 (see FIG. 5) and provide a rotation axis for a rotation of the first door 210.

In this embodiment, the hinge 160 may be coupled to the cabinet 100 through the first hinge main body 161 and supported by the cabinet 100, and may be coupled to the first door 210 through the hinge shaft 166 provided at the second hinge main body 165 and rotatably support the first door 210.

The hinge 160 may have enough strength to support the first door 210. For example, the hinge 160 may be made of a metallic material having strength much greater than that of the hinge case 170.

The hinge case 170 may be disposed at the upper sides of the cabinet 100 and the hinge 160, and form the exterior of the hinge assembly 150*a*. The hinge case 170 may be coupled to the upper surface of the hinge 160 or the cabinet 100 while accommodating at least a portion of the hinge 160. In this embodiment, the hinge case 170 accommodates the second hinge main body 165 and a reinforcement member 190 described hereinafter, for example.

The hinge case 170 may have an accommodation space, therein, and be shaped into a box the lower portion of which is open. The hinge case 170 may comprise a cover upper surface 172 and a cover lateral surface 173.

The cover upper surface 172 may be disposed at the upper side of the hinge 160. As an example, the cover upper surface 172 may be disposed at the upper side of the second hinge main body 165, and form a planar surface parallel with the upper surface of the cabinet 100. The cover upper surface 172 may form the upper surface of the hinge case 170 that covers the second hinge main body 165 from above.

The cover lateral surface 173 may form a surface that connects between the hinge 160 and the cover upper surface 172. As an example, the cover lateral surface 173 may connect between the outer edge of the hinge 160 and the outer edge of the cover upper surface 172 in the up-down direction. The cover lateral surface 173 may form a lateral surface that surrounds the lateral portion of the hinge assembly 150*a*.

An inclination surface may be formed on at least a portion of the cover lateral surface 173. As an example, an inclination surface may be formed on one lateral surface of the cover lateral surface 173, facing the damper assembly 500*a*.

In this embodiment, the inclination surface is provided in such a way that the inclination surface is similar to the sliding surface 171 (see FIG. 26) illustrated in the above-described embodiment, for example. The inclination surface may extend in a direction between the second direction and the first direction, while connecting between the rotation center of the first door 210 and the cabinet 100 in the first direction.

Specifically, a portion of the cover lateral surface 173 may form an inclination surface that extends in such a way that the inclination surface becomes far away from the rotation center of the first door 210 in the second direction as the inclination surface becomes close to the cabinet 100 in the first direction, while forming an inclination surface that connects between the front surface of the cabinet 100 and the first door 210 in an inclined manner.

That is, an inclination surface may be formed on one lateral surface of the cover lateral surface 173, facing the damper assembly 500*a*, and extend in such a way that the inclination surface becomes far away from the rotation center of the first door 210 in the lateral direction, toward the rear thereof.

The hinge assembly 150*a* may be provided with a damper contact part 180. The damper contact part 180 may be provided in such a way that the damper contact part 180 contacts the damper assembly 500*a*, specifically, the contact end 705 formed at the end portion of the movement part 520.

The damper contact part 180 may be formed at the hinge case 170. The damper contact part 180 may be disposed on the cover lateral surface 173. Specifically, the damper contact part 180 may be disposed on the inclination surface formed on one lateral surface of the cover lateral surface 173, which faces the damper assembly 500*a*.

The damper contact part 180 may be concavely formed on the cover lateral surface 173. The damper contact part 180 may be formed in such a way that a portion of the cover lateral surface 173 is depressed in the lateral direction.

As an example, the damper contact part 180 may be concavely formed in the lateral direction, on the cover lateral surface 173. The damper contact part 180 may form a planar surface that is depressed in the lateral direction on the cover lateral surface 173.

Specifically, the damper contact part 180 may be concavely formed in a direction between the front-rear direction and the lateral direction, on the cover lateral surface 173, and form a planar surface that is depressed in a direction between the front-rear direction and the lateral direction, on the cover lateral surface 173.

As described above, one lateral surface of the cover lateral surface 173, facing the damper assembly 500*a*, may form an inclination surface. The damper contact part 180 may form an inclination surface having a different gradient from the inclination surface of the cover lateral surface 173, while forming an inclination surface like one lateral surface of the cover lateral surface 173.

As an example, the damper contact part 180 may form an inclination surface that inclines further in the second direction, i.e., inclines further in the lateral direction, than the inclination surface of the cover lateral surface 173. For example, in the case where a contained angle between the inclination surface of the cover lateral surface 173 and the front surface of the cabinet 100 is 110°, a contained angle between the inclination surface formed by the damper contact part 180 and the front surface of the cabinet 100 may be greater than 110°.

In this embodiment, the damper assembly 500*a* may generate a damping force while contacting the damper contact part 180. That is, the damper assembly 500*a* may generate a damping force, at a time when the movement part 520 moves contacting the damper contact part 180.

As described above, the contact end 705 may be provided at the lateral end of the movement part 520. In the state where the contact end 705 contacts the surface of the damper contact part 180, the damper assembly 500*a* may be pressed by the hinge assembly 150*a*, and accordingly, the movement part 520 moves in a direction where the movement part 520 is inserted into the fixation part 510, and in this process, the damper assembly 500$a$ may generate a damping force.

As an example, the contact end 705 may form a planar surface that crosses the direction in which the movement part 520 moves. Additionally, like the contact end 705, the damper contact part 180 may also form a planar surface that crosses the direction in which the movement part 520 moves.

In this embodiment, the direction in which the movement part 520 moves is set to a direction that inclines between the lateral direction and the front-rear direction. Considering this, the contact end 705 substantially forms an inclination surface that crosses the movement direction of the movement part 520, which is set to the direction inclined as described above.

Like the contact end 705, the damper contact part 180 forms an inclination surface that crosses the movement direction of the movement part 520, which is set to the direction inclined as described above. The damper contact part 180 may form a planar surface parallel with the contact end 705.

Additionally, the hinge assembly 150$a$ of this embodiment may further comprise a reinforcement member 190. The reinforcement member 190 is provided to connect to the damper contact part 180 and support the damper contact part 180.

The reinforcement member 190 may be disposed in the hinge case 170. That is, the reinforcement member 190 may be disposed in a space surrounded by the hinge 160 and the hinge case 170. The damper assembly 500$a$ may contact the surface (outer face) of the damper contact part 180, outside the hinge case 170, and the reinforcement member 190 may connect the back surface (inner face) of the damper contact part 180 in the hinge case 170.

In this embodiment, the hinge 160 and the reinforcement member 190 may be made of a metallic material having greater strength than that of the hinge case 170. The reinforcement member 190 may be coupled to the hinge 160 and supported firmly by the hinge 160. The reinforcement member 190 may support the damper contact part 180 at the inside of the hinge case 170, while contacting the back surface of the damper contact part 180.

As an example, the reinforcement member 190 may comprise a first reinforcement part 191 and a second reinforcement part 195.

The first reinforcement part 191 may be coupled to the hinge case 190 while the first reinforcement part 191 and the damper contact part 180 contact each other. As an example, the first reinforcement part 191 may be provided in such a way that the first reinforcement part 191 forms a planar surface parallel with the planar surface formed by the damper contact part 180. The first reinforcement part 191 may be coupled to the hinge case 170 while the first reinforcement part 191 and the back surface of the damper contact part 180 surface-contact each other.

A coupling between the first reinforcement part 191 and the hinge case 170 may be simply based on surface-contact between the first reinforcement part 191 and the damper contact part 180, or based on an attachment of the first reinforcement part 191 to the damper contact part 180 in the state where the first reinforcement part 191 surface-contacts the damper contact part 180.

The second reinforcement part 195 may be coupled to the hinge 160 while connecting to the first reinforcement part 191. The second reinforcement part 195 may form a surface that extends in a different direction from the first reinforcement part 191, while forming a surface that extends from the lateral end of the first reinforcement part 191. As an example, the reinforcement member 190 is formed in such a way that the first reinforcement part 191 and the second reinforcement part 195 connect in an approximate "L" shape, for example.

Additionally, the reinforcement member 190 may further comprise a fitting projection 193. The fitting projection 193 may be provided in the form of a projection that protrudes downward from the lower ends of the first reinforcement part 191 and the second reinforcement part 195.

In response, a coupling groove 167 may be provided at the hinge 160, specifically, the second hinge main body 165. The coupling groove 167 may be provided on the upper surface of the second hinge main body 165, in the form of a groove that is concave downward.

The fitting projection 193 may be fitted and coupled to the second hinge main body 165 while being fitted into the coupling groove 167, and a coupling between the reinforcement member 190 and the hinge 160 may be based on a coupling between the fitting projection 193 and the second hinge main body 165, performed as described above.

The reinforcement member 190 may be coupled to the hinge 160, as described above, and reliably supported by the hinge 160 made of a metallic material having high strength. Additionally, the reinforcement member 190 may be provided in such a way that the first reinforcement part 191 and the second reinforcement part 192 that respectively have a surface extending in a different direction connect to each other, such that the fall of the reinforcement member 190, caused by a force applied intensively in any one direction, is suppressed, while the reinforcement member 190 is reliably fixed to the hinge 160.

[Operation and Effect of Refrigerator of Third Embodiment]

Figure 41:
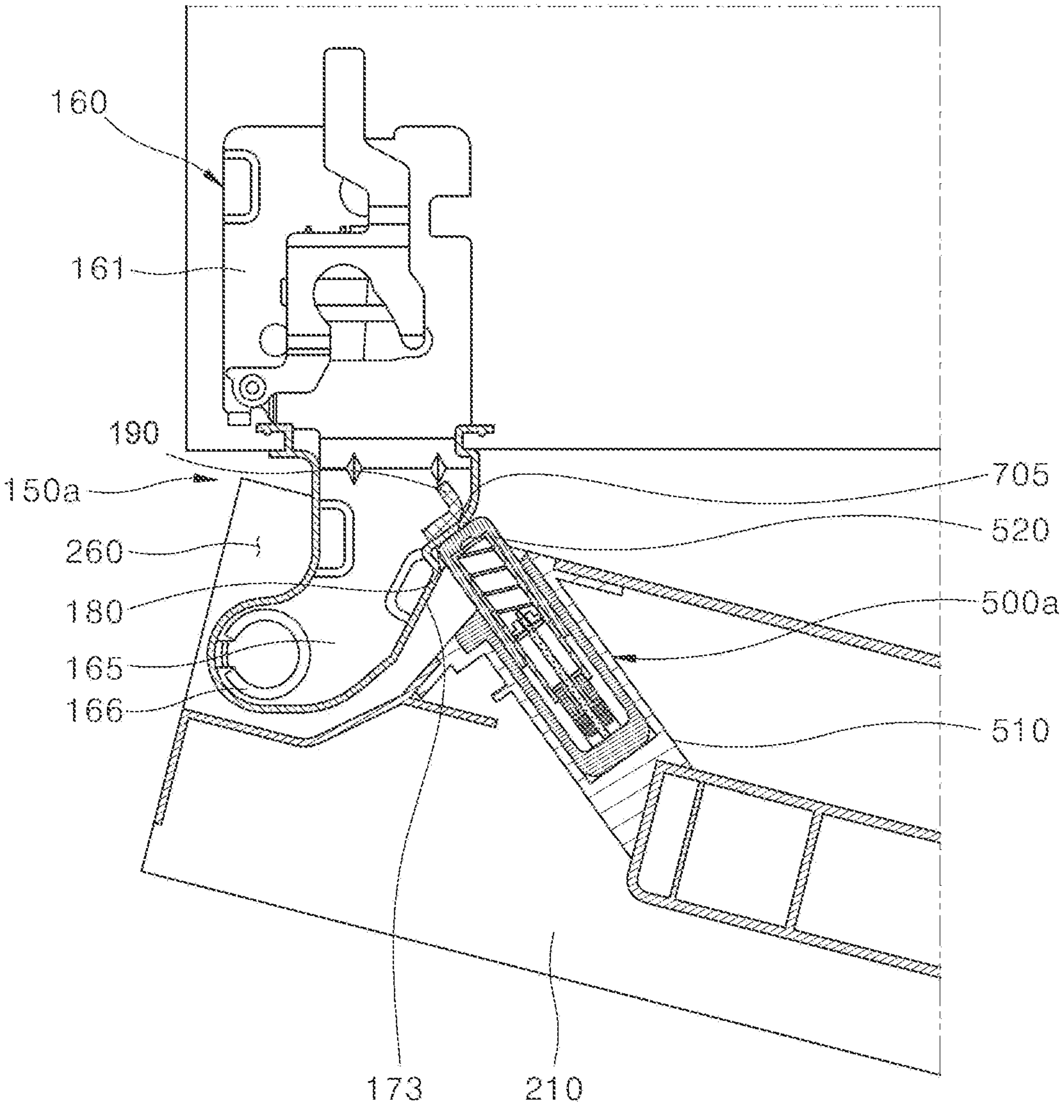
FIG. 41 is a planar cross-sectional view of structures of the hinge assembly and the damper assembly of the third embodiment.
Figure 42:
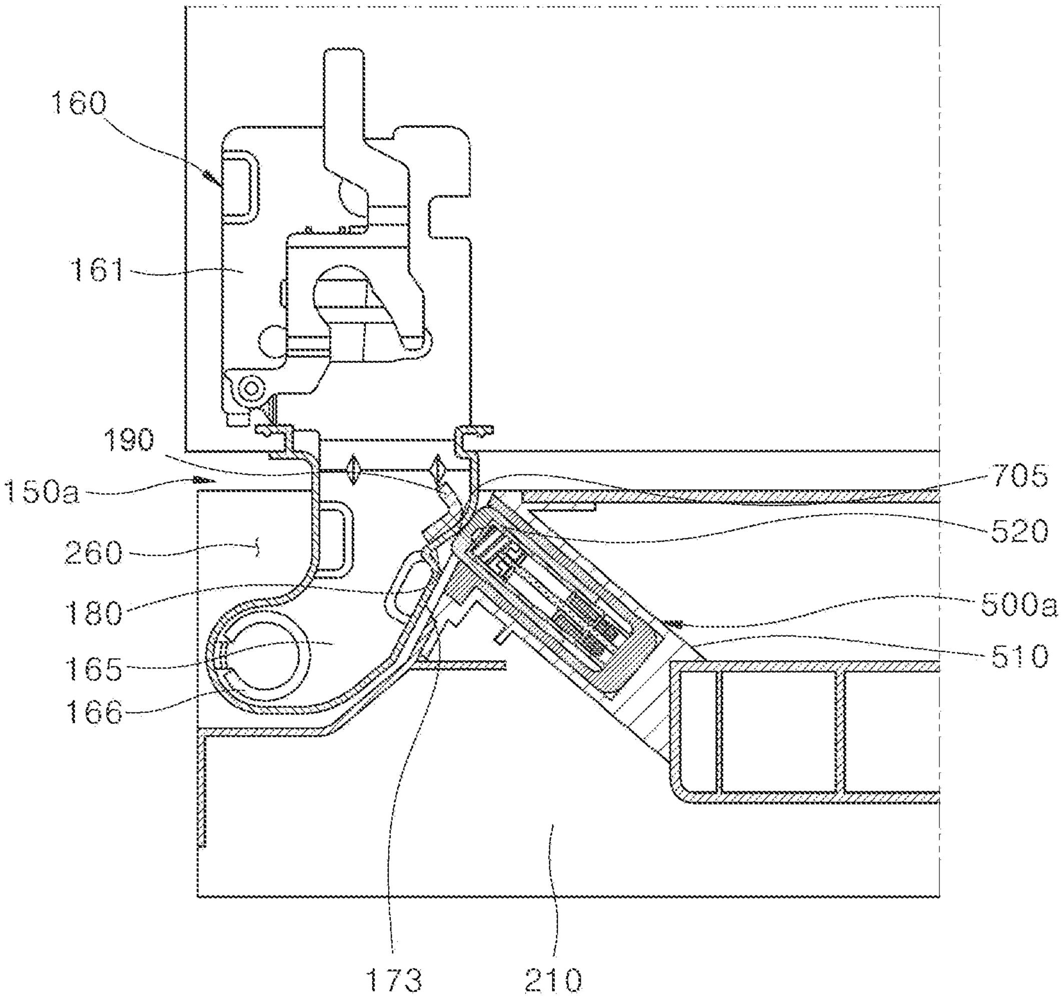
FIG. 42 is a planar cross-sectional view of a state in which the damper assembly illustrated in FIG. 41 is moved along a door that is rotated in a closing direction.

FIG. 41 is a planar cross-sectional view of structures of the hinge assembly and the damper assembly of the third embodiment, and FIG. 42 is a planar cross-sectional view of a state in which the damper assembly illustrated in FIG. 41 is moved along a door that is rotated in a closing direction.

Hereinafter, the operation and effect of the refrigerator of the third embodiment are described with reference to FIGS. 39 to 41.

Referring to FIGS. 39 to 40, the damper assembly 500$a$ may be installed at the first door 210 and generate a damping force while contacting the hinge assembly 150$a$. The damper assembly 500$a$ may be installed in the first door 210 in an inclined manner, and the movement part 520 may be inserted into the fixation part 510 while moving in a direction parallel with the major axis of the damper assembly 500$a$ disposed in an inclined manner.

As the first door 210 rotates in the closing direction, the damper assembly 500$a$ may generate a damping force while contacting the hinge assembly 150$a$. At this time, the movement part 520 may contact a certain portion of the hinge case 170, while contacting the hinge case 170 of the hinge assembly 150$a$.

In this embodiment, the movement part 520 may contact the damper contact part 180 provided at a certain position of the cover lateral surface 173, rather than contacting any portion of the cover lateral surface 173.

The damper contact part 180 may be concavely formed on the cover lateral surface 173 in a direction between the front-rear direction and the lateral direction, and form a planar surface depressed on the cover lateral surface 173 in a direction between the front-rear direction and the lateral direction. The damper contact part 180 may form an inclination surface having a different gradient from the inclination surface of the cover lateral surface 173, while forming an inclination surface like the cover lateral surface 173.

The damper assembly 500*a* may generate a damping force while contacting the damper contact part 180. That is, at a time when the movement part 520 moves while contacting the damper contact part 180, the damper assembly 500*a* may generate a damping force.

The movement part 520 may have a contact end 705, at the lateral end thereof, and the contact end 705 may form a planar surface that crosses the direction in which the movement part 520 moves. Additionally, the damper contact part 180 may form a planar surface parallel with the contact end 705.

Accordingly, as the damper assembly 500*a* and the hinge assembly 150*a* contact each other, the movement part 520 and the hinge case 170 may surface-contact each other. That is, in the state where the movement part 520 and the hinge case 170 are in surface-to-surface contact, the damper assembly 500*a* and the hinge assembly 150*a* may contact each other.

In the case where the first door 210 continues to rotate in the closing direction in the state where the movement part 520 and the hinge case 710 contact each other as described above, the movement part 520 may continue to slide relative to the hinge case 170 while the movement part 520 keeps surface-contacting the surface of the damper contact part 180.

In the case where the movement part 520 surface-contacts the hinge case 170 and the movement part 520 slides relative to the hinge case 170 in the state where the movement part 520 surface-contacts the hinge case 170, a force applied to the movement part 520 or the hinge case 170 may spread the entire contact end 705 or the entire damper contact part 180 evenly, without concentrating on any one point, while the movement part 520 contacts the hinge case 170.

Thus, damage to the damper assembly 500*a* and the hinge assembly 150*a*, caused by the concentration of a force applied to the movement part 520 or the hinge case 170 to one any point, may be effectively prevented, while the movement part 520 contacts the hinge case 170.

Further, a reinforcement member 190 may be disposed in the hinge case 170. The reinforcement member 190 may support the damper contact part 180, inside the hinge case 170, while contacting the back surface of the damper contact part 180 in the hinge case 170.

The reinforcement member 190 may support the damper contact part 180 as a contact portion with the damper assembly 500*a*, inside the hinge case 170, to improve the strength of the damper contact part 180 effectively and prevent damage to the hinge case 170.

That is, while the movement part 520 and the hinge case 170 surface-contact each other since the damper contact part 180 is concavely formed on the lateral surface of the hinge case 170, the strength of the damper contact part 180 is enhanced by the reinforcement member 190 installed in the hinge case 170, to prevent damage to the hinge case 170 effectively.

Additionally, at the movement part 520, the housing 610 (see FIG. 8) of the damper 600 (see FIG. 8) may be disposed in the damper cover 700, and the housing 610 may serve as a reinforcement material that supports the damper cover 700, inside the housing 610.

That is, at the movement part 520, the damper 600, the housing 610 of which serves as a reinforcement material supporting the damper cover 700, and the damper cover 700 interact with each other while the damper cover 700 serves as a cover protecting the damper 600.

Accordingly, while the movement part 520 and the hinge case 170 surface-contact each other, the strength of the damper cover 700 is enhanced by the damper 600, to prevent damage to the movement part 520 effectively.

Further, a curved surface may connect between the damper contact part 180 and the cover lateral surface 173. As an example, a boundary between the end portion of the rear side of the damper contact part 180 and the cover lateral surface 173 may connect in a rounded manner.

Accordingly, even if the slide of the movement part 520 relative to the hinge case 170 continues in an area past the damper contact part 180, an excessive impact is not applied to the movement part 520 and the hinge case 170, and the movement part 520 may keep sliding smoothly.

[Fourth Example of Hinge Assembly—Fourth Embodiment of Refrigerator]

Figure 43:
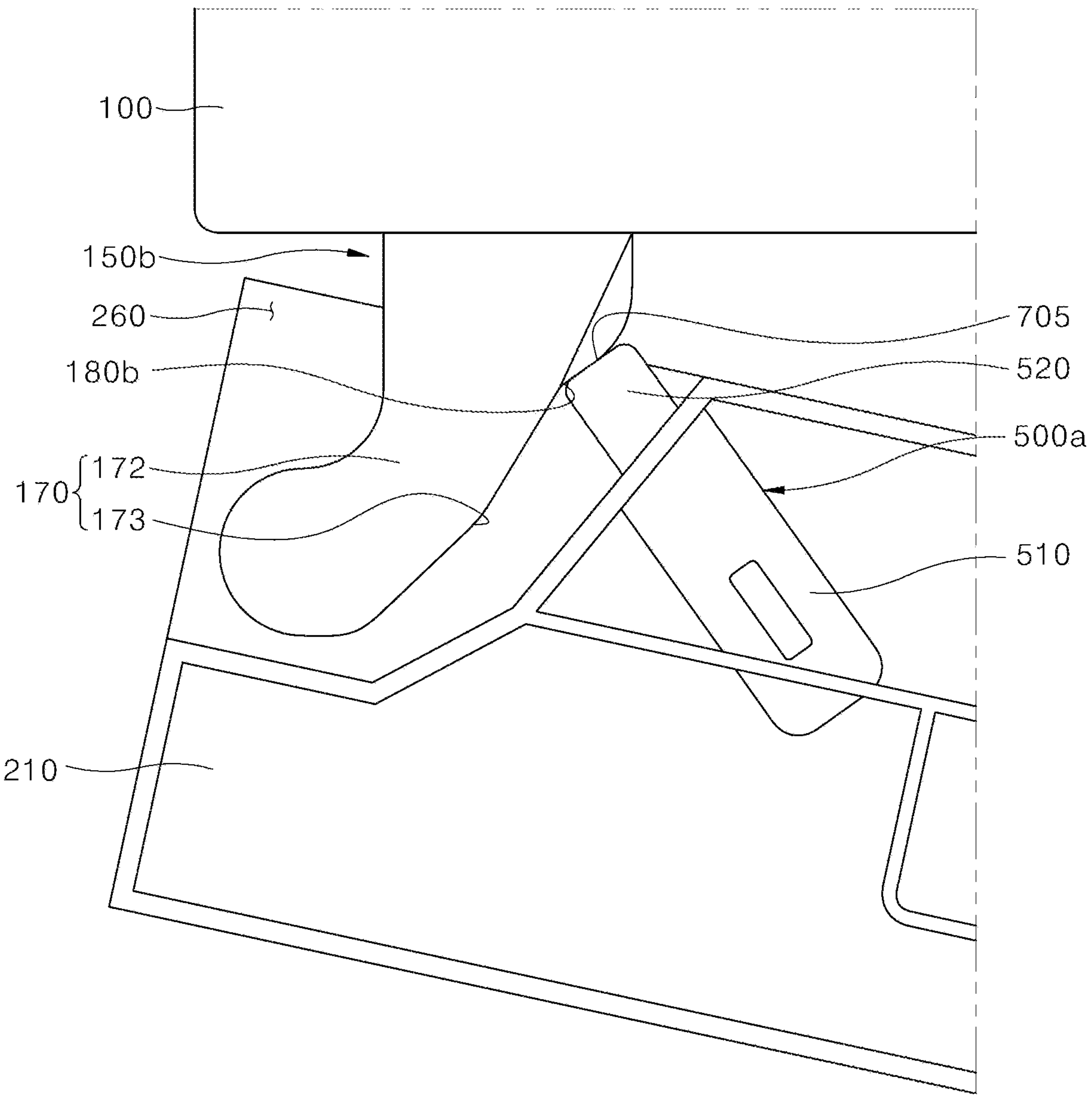
FIG. 43 is a planar cross-sectional view of structures of a hinge assembly and a damper assembly of a fourth embodiment.
Figure 44:
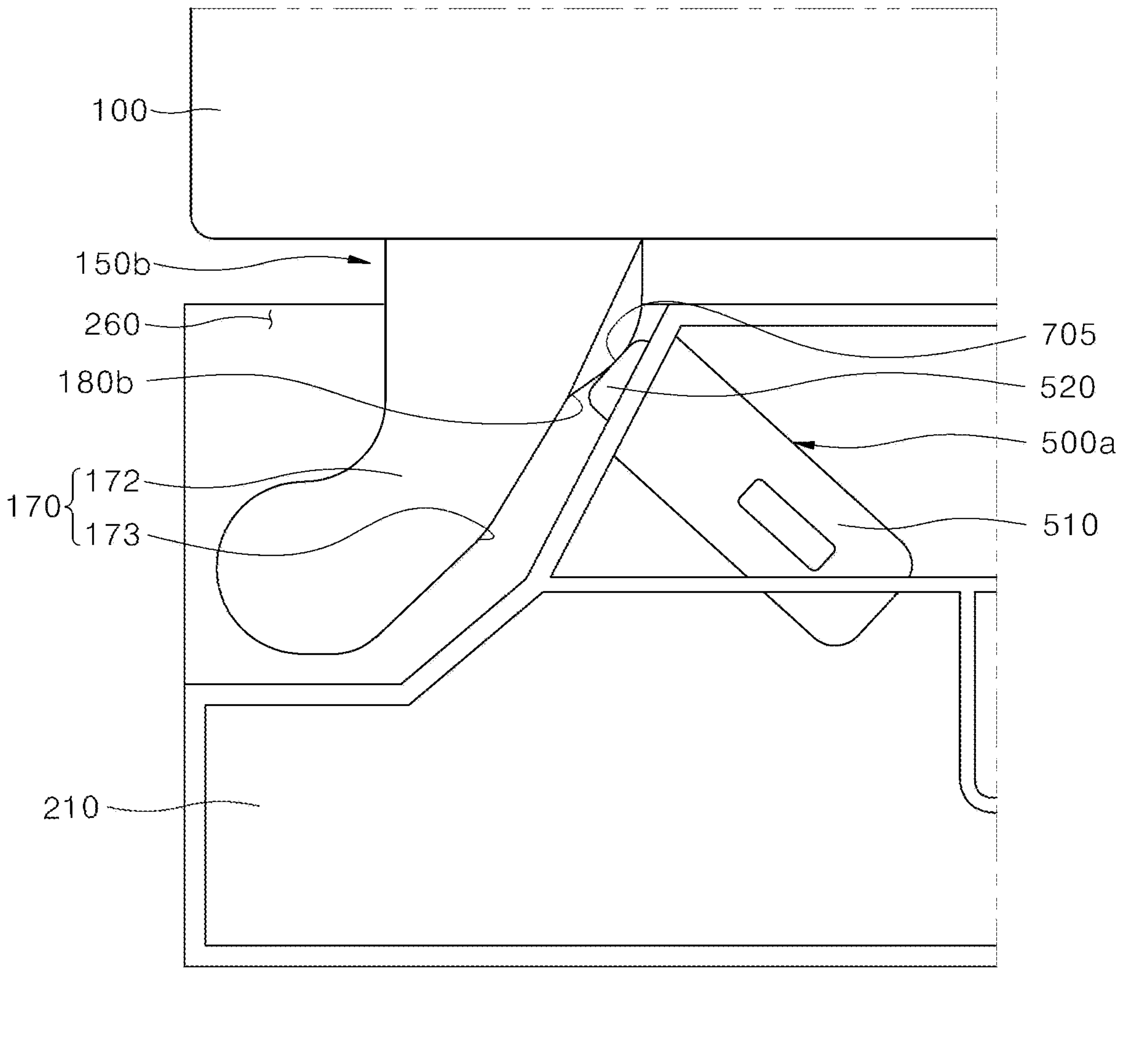
FIG. 44 is a planar cross-sectional view of a state in which the damper assembly illustrated in FIG. 43 is moved along a door that is rotated in a closing direction.

FIG. 43 is a planar cross-sectional view of structures of a hinge assembly and a damper assembly of a fourth embodiment, and FIG. 44 is a planar cross-sectional view of a state in which the damper assembly illustrated in FIG. 43 is moved along a door that is rotated in a closing direction.

Referring to FIG. 43, the hinge assembly 150*b* of the refrigerator of the fourth embodiment and the hinge assembly 150*a* (see FIG. 38) illustrated in the above-described embodiment differ in terms of a damper contact part 180*b*.

In this embodiment, the damper contact part 180*b* may be provided to protrude from the cover lateral surface 173, while being provided to contact the contact end 705 formed at the end portion of the movement part 520. The damper contact part 180*b* may be disposed on the inclination surface that is formed on one lateral surface of the cover lateral surface 173, facing the damper assembly 500*a*, while being disposed on the cover lateral surface 173 of the hinge case 170.

The damper contact part 180*b* may be convexly formed on the cover lateral surface 173. The damper contact part 180*b* may be formed in such a way that a portion of the cover lateral surface 173 protrudes in the lateral direction.

As an example, the damper contact part 180*b* may protrude convexly from the cover lateral surface 173 in the lateral direction. The damper contact part 180*b* may form a planar surface that protrudes from the cover lateral surface 173 in the lateral direction.

Specifically, the damper contact part 180*b* may be convexly formed on the cover lateral surface 173 in a direction between the front-rear direction and the lateral direction, and form a planar surface that protrudes on the cover lateral surface 173 in a direction between the front-rear direction and the lateral direction.

The damper contact part 180*b* may form an inclination surface having a different gradient from the inclination surface of the cover lateral surface 173, while forming an inclination surface like the inclination surface of the cover lateral surface 173. As an example, the damper contact part 180*b* may form an inclination surface that is similar to the inclination surface of the damper contact part 180 (see FIG. 38) illustrated in the above-described embodiment. For example, the damper contact part 180*b* may form an inclination surface that inclines further in the second direction, i.e., in the lateral direction, than the inclination surface of the cover lateral surface 173.

In this embodiment, the damper assembly 500*a*, as illustrated in FIG. 44, may generate a damping force while contacting the damper contact part 180*b*. That is, at a time when the movement part 520 moves while contacting the damper contact part 180*b*, the damper assembly 500*a* may generate a damping force.

In summary, unlike the damper contact part 180 illustrated in the above embodiment, i.e., the damper contact part 180 concavely formed on the cover lateral surface 173, the damper contact part 180*b* of this embodiment may be provided in such a way that the damper contact part 180*b* protrudes convexly on the cover lateral surface 173, and the damper assembly 500*a* may generate a damping force while contacting the damper contact part 180*b*.

In the case where the hinge assembly 150*b* has a small size and the hinge case 170 has a small size, it is difficult to ensure a space need to form a damper contact part having a concave shape, in the hinge case 170.

Additionally, if there is a long distance between the hinge assembly 150*b* and the damper assembly 500*a*, a distance between the damper contact part and the damper assembly 500*a* becomes too long, in the case of a damper contact part having a concave shape.

Considering this, the damper contact part 180*b* of this embodiment is provided in such a way that the damper contact part 180*b* convexly protrudes from the cover lateral surface 173 toward the damper assembly 500*a*.

Even in the case where the hinge assembly 150*b* has a small size and the hinge case 170 has a small size, the damper contact part 180*b* may be formed in/at the hinge case 170 without difficulty, and even in the case where there is a long distance between the hinge assembly 150*b* and the damper assembly 180*b*, contact between the damper assembly 500*a* and the damper contact part 180*b*, for generation of a damping force, may be performed effectively.

[Another Example of Hinge Assembly Structure—Fifth Embodiment of Refrigerator]

Figure 45:
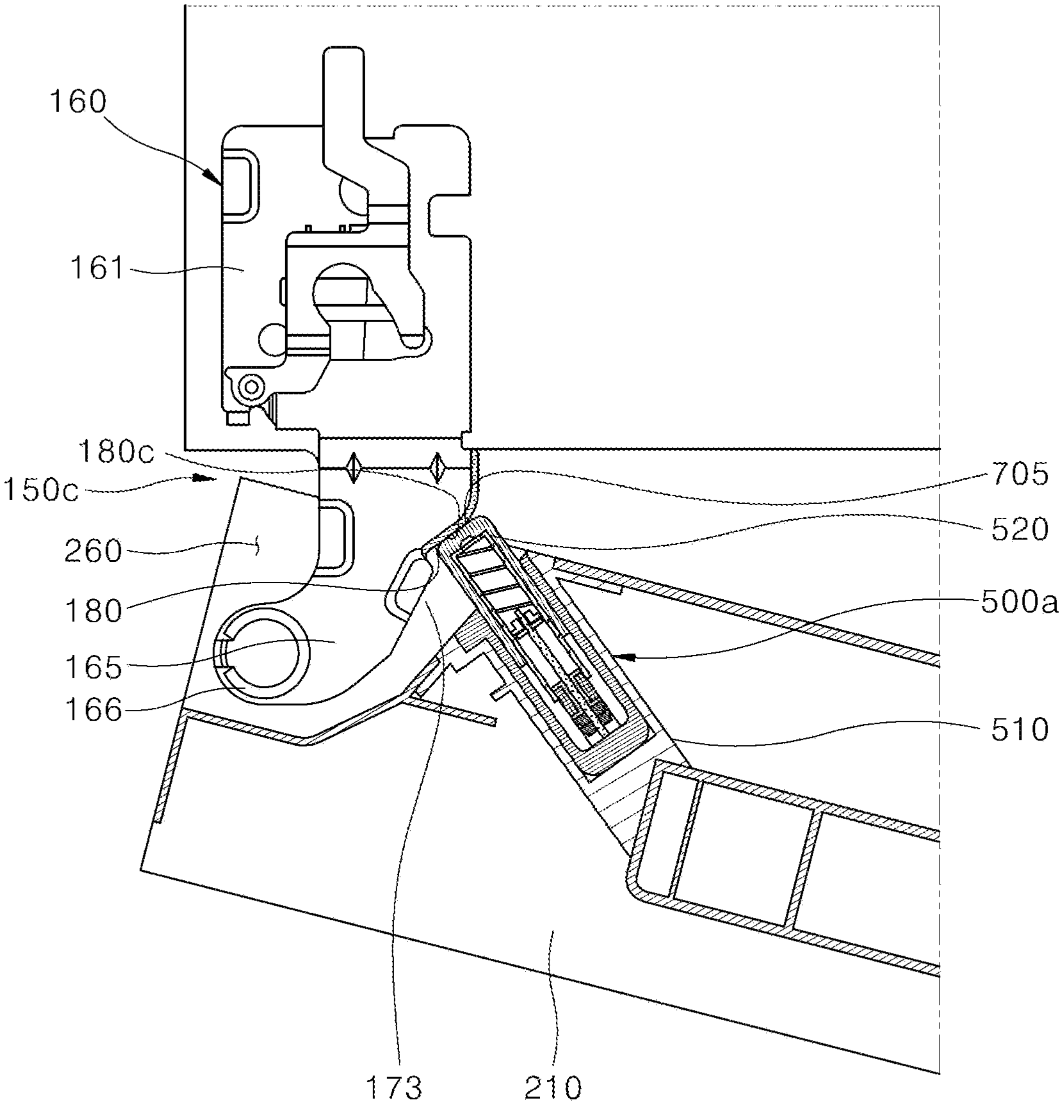
FIG. 45 is a planar cross-sectional view of structures of a hinge assembly and a damper assembly of a fifth embodiment.
Figure 46:
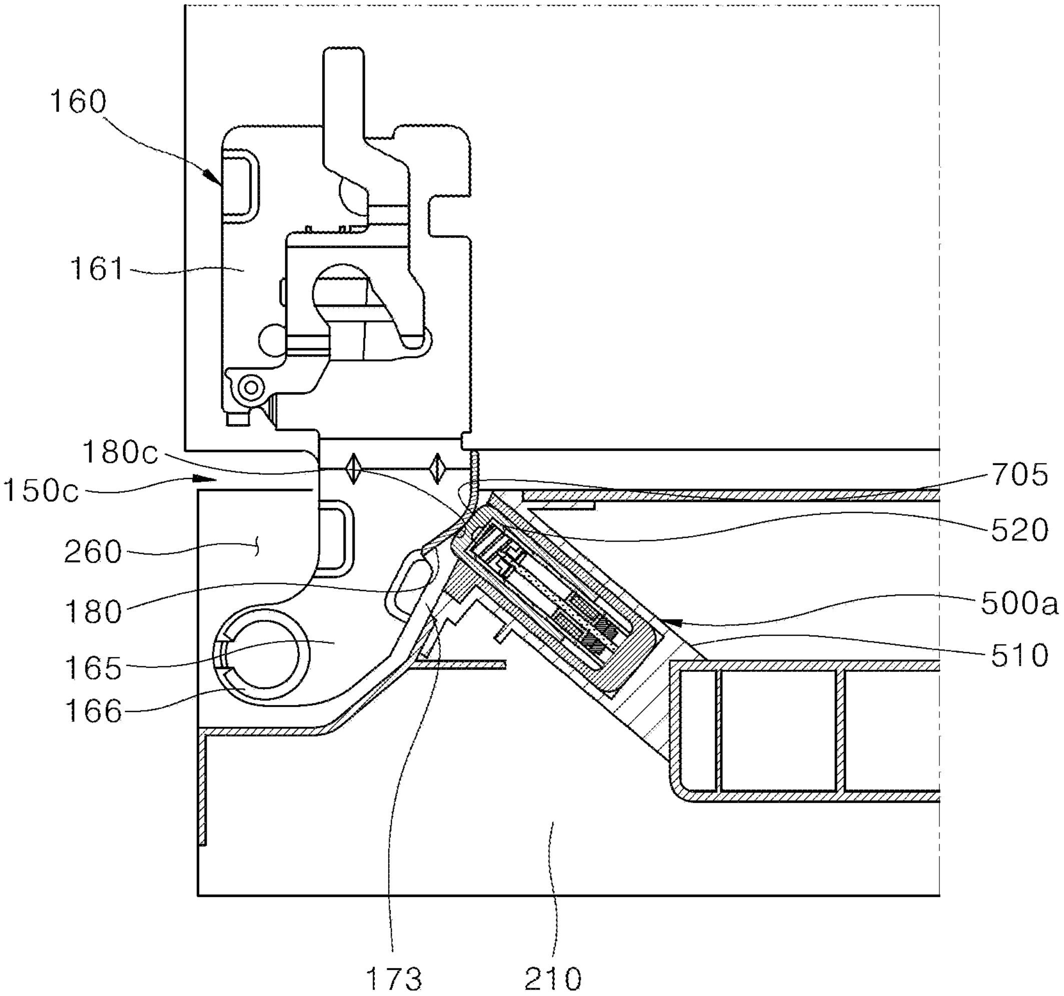
FIG. 46 is a planar cross-sectional view of a state in which the damper assembly illustrated in FIG. 43 is moved along a door that is rotated in a closing direction.
Figure 47:
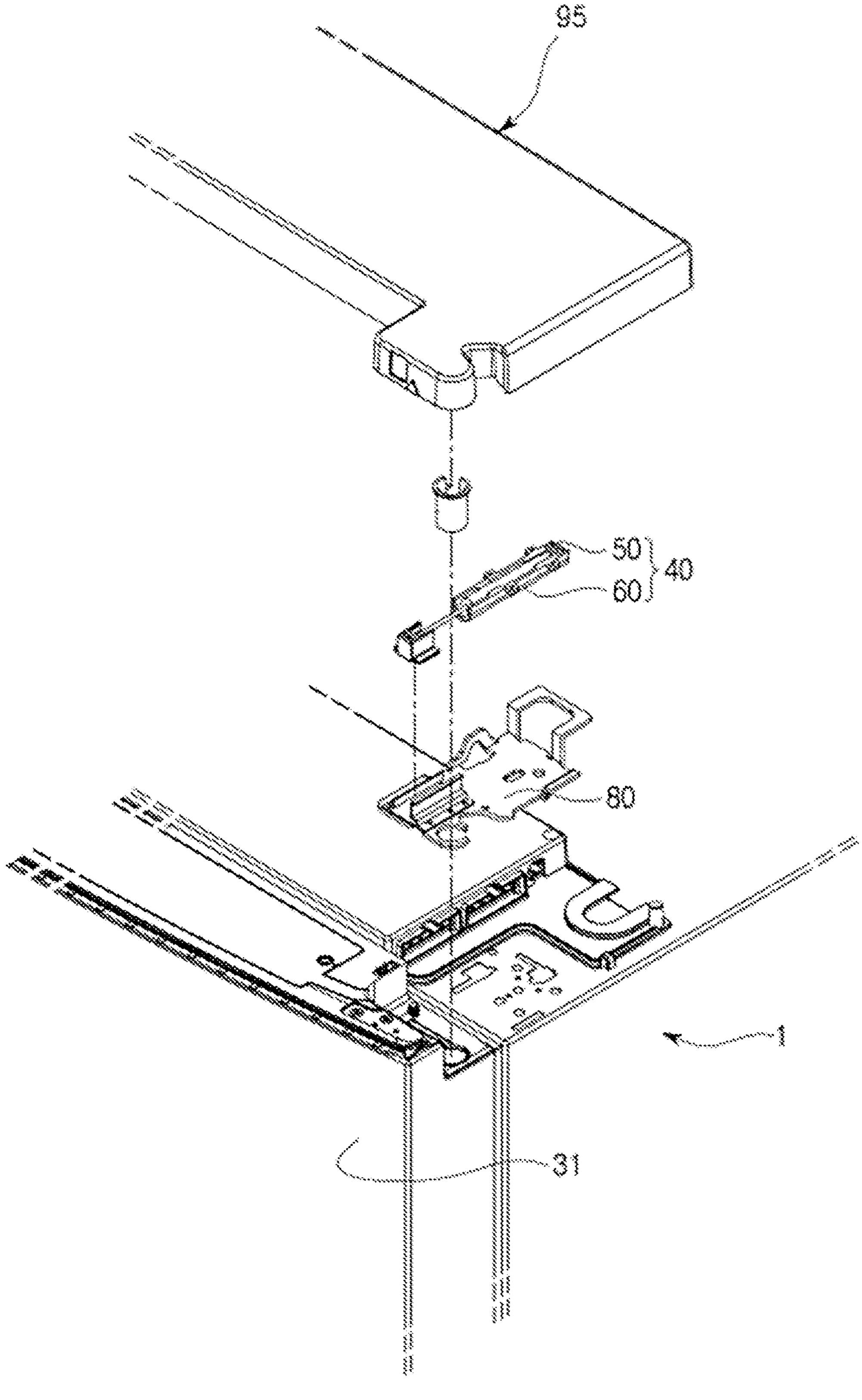
FIG. 47 RELATED ART
FIG. 47 is an exploded perspective view of a main portion of a refrigerator of a related art.
Figure 48:
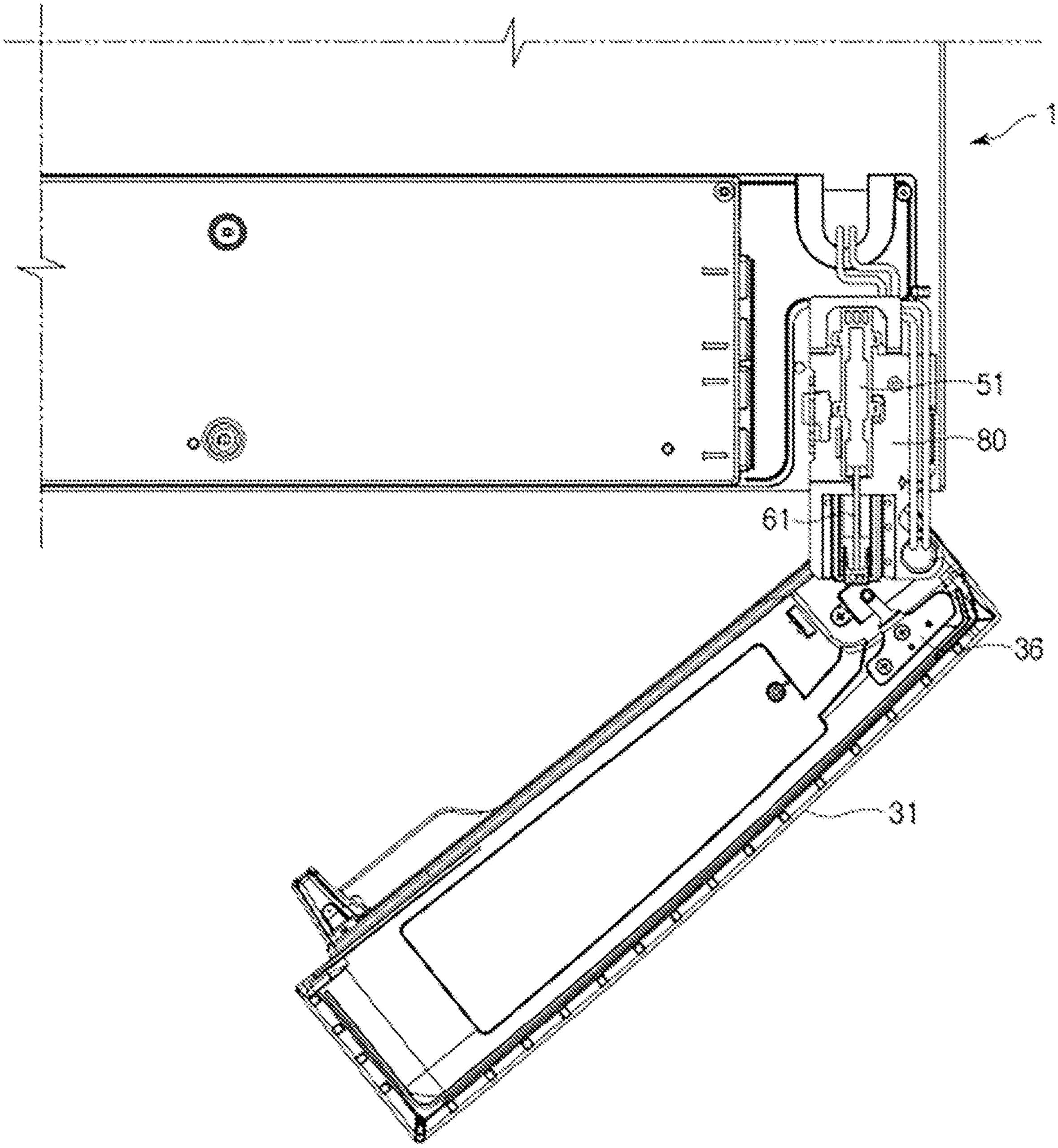
FIG. 48 RELATED ART
FIG. 48 is a cross-sectional view of a damper installation structure of a refrigerator of a related art.

FIG. 45 is a planar cross-sectional view of structures of a hinge assembly and a damper assembly of a fifth embodiment, and FIG. 46 is a planar cross-sectional view of a state in which the damper assembly illustrated in FIG. 43 is moved along a door that is rotated in a closing direction.

Referring to FIG. 45, at the hinge assembly 150*c* of this embodiment, a damper contact part 180*c* may be provided at the hinge case 160 rather than the hinge case 170. That is, the damper assembly 500*a* may generate a damping force while contacting the hinge 160 rather than the hinge case 170.

In this embodiment, the damper contact part 180*c* is provided at the second hinge main body 165, for example. The damper contact part 180*c* may be disposed on one lateral surface of the second hinge main body 165, facing the damper assembly 500*a*.

As an example, the damper contact part 180*c* may be provided in the form of a vertical wall body that protrudes upward on one lateral surface of the second hinge main body 165. The damper contact part 180*c* may be formed in such a way that the damper contact part 180*c* is integrated with the hinge 160, and may be made of a metallic material the same as that of the hinge 160.

As an example, the damper contact part 180*c* may have a similar shape to that of the damper contact part 180 (see FIG. 38) of the third embodiment, that is, may be formed to be concave in a direction between the front-rear direction and the lateral direction.

As another example, the damper contact part 180*c* may have a similar shape to that of the damper contact part 180*b* (see FIG. 43) of the fourth embodiment, that is, may be formed to be convex in a direction between the front-rear direction and the lateral direction.

The damper contact part 180*c*, as described above, may be effectively applied to a hinge assembly 150*c* without a hinge case, and in the case where the strength of the damper contact part 180*c* needs to improve, may effectively improve the strength of the damper contact part 180*c*.

The embodiments are described above with reference to a number of illustrative embodiments thereof. However, the embodiments are provided as examples, and numerous other modifications and embodiments can be drawn by one having ordinary skill in the art from the embodiments. Thus, the technical scope of protection of the subject matter of the invention is to be defined according to the following claims.

DESCRIPTION OF REFERENCE NUMERALS

100: Cabinet
101: Pillar rotation member
150,150*a*,150*b*,150*c*: Hinge assembly
160: Hinge
161: First hinge main body
165: Second hinge main body
166: Hinge shaft
167: Coupling groove
170: Hinge case
172: Cover upper surface
173: Cover lateral surface
175: Coupling surface
180,180*b*,180*c*: Damper contact part
190: Reinforcement member
191: First reinforcement part
193: Fitting projection
195: Second reinforcement part
210: First door
220: Second door
230: Lower door
240: Dispenser
250: Pillar
251: Pillar cam
260: Hinge mounting space
261: Hinge mounting part
265: Damper assembly mounting part
500: Damper assembly
510: Fixation part
520: Movement part
600: Damper
610: Housing
611: Elastic member
612: Oil
620: Rod
621: Step part
630: Guide
640: Sealer
650: Sponge
651: Sponge cover
660: Washer
670: Piston
671: First piston part
672: Second piston part
673: Oil flow path part
673*a*: First flow path
673*b*: Second flow path
673*c*: Third flow path
674: Inlet
675: Outlet
680: Ring
681: Oil return passage
690: Bracket
691: Drawn part
700: Damper cover
701: Cover body

705: Contact end
710: Rail part
711: Reinforcement part
720: Holding part
721: Insertion part
740: First guide rib
800: Damper case
801: Case body
810: Guide part
820: Slit part
830: Second guide rib
840: Fastening part
841: Fastening hole
850: Case groove
900: Reinforcement plate
950: Drawn groove

What is claimed is:

1. A refrigerator comprising:
a cabinet having a storage compartment;
a door configured to open and close the storage compartment;
a hinge assembly configured to rotatably connect the door to the cabinet; and
a damper provided on the door and configured to move in association with a rotation of the door, the damper being configured to generate a damping force by contacting the hinge assembly or the cabinet as the door is rotated towards a closed position, the damper including a contact end at a side of the damper,
wherein the hinge assembly includes:
a damper contact part configured to contact the contact end of the damper as the door is rotated towards the closed position;
a hinge fixed to the cabinet, the hinge being connected to the door; and
a hinge case configured to accommodate at least a portion of the hinge, the hinge case being connected to the hinge or the cabinet, the hinge case including:
an upper part located at an upper side of the hinge; and
a lateral part connecting the hinge and the upper part in an up-down direction,
wherein the damper contact part is located on the lateral part and is located at the hinge case.

2. The refrigerator of claim 1, wherein the damper contact part has a concave shape in a lateral direction on the lateral part.

3. The refrigerator of claim 1, wherein the damper contact part has a planar surface depressed in a lateral direction on the lateral part.

4. The refrigerator of claim 1, wherein the lateral part has an inclination surface extending in a direction between a lateral direction of the refrigerator and a front-rear direction of the refrigerator, and
wherein the damper contact part has an inclination surface having a different inclination than the lateral part.

5. The refrigerator of claim 4, wherein the inclination surface of the lateral part and the inclination surface of the damper contact part extend further away from a rotational center of the door along the front-rear direction.

6. The refrigerator of claim 5, wherein the inclination surface of the damper contact part inclines further in the lateral direction than the inclination surface of the lateral part.

7. The refrigerator of claim 1, wherein the damper further includes:
a fixation part fixed to the door; and
a movement part movable relative to the fixation part, and
wherein the damper is configured to generate the damping force as the movement part moves while contacting the damper contact part.

8. The refrigerator of claim 7, wherein the damper contact part has a planar surface that extends in a direction that crosses a direction in which the movement part moves.

9. The refrigerator of claim 1, wherein damper further includes:
a fixation part fixed to the door; and
a movement part movable relative to the fixation part, the movement part having the contact end at a side of the movement part, and
wherein at least a portion of the damper contact part includes a surface parallel with the contact end.

10. The refrigerator of claim 1,
wherein the hinge assembly includes:
a reinforcement member connected to the damper contact part to support the damper contact part.

11. The refrigerator of claim 10,
wherein the reinforcement member is connected to the hinge.

12. The refrigerator of claim 11, wherein the hinge and the reinforcement member are made of a material having greater strength than a material of the hinge case.

13. The refrigerator of claim 11, wherein the reinforcement member includes a first reinforcement part connected to the hinge case at the damper contact part.

14. The refrigerator of claim 13, wherein the reinforcement member further includes a second reinforcement part connected to the first reinforcement part and the hinge.

15. The refrigerator of claim 14, wherein the first reinforcement part includes a surface parallel with the damper contact part, and
wherein the second reinforcement part includes a surface extending away from the first reinforcement part.

16. The refrigerator of claim 1, wherein the damper contact part includes a groove that is configured to receive the contact end of the damper.

17. The refrigerator of 16, wherein the groove extends to a cover upper surface of the hinge case and does not extend to a cover lower surface of the hinge case.

18. The refrigerator of 17, wherein a shape of the contact end of the damper corresponds to a shape of the groove.

19. A refrigerator comprising:
a cabinet having a storage compartment;
a door configured to open and close the storage compartment;
a hinge assembly configured to rotatably connect the door to the cabinet; and
a damper provided on the door and configured to move in association with a rotation of the door, the damper being configured to generate a damping force by contacting the hinge assembly or the cabinet as the door is rotated towards a closed position, and the damper including a contact end at a first side of the damper,
wherein the hinge assembly includes:
a damper contact part configured to contact the contact end as the door is rotated towards the closed position; and
a reinforcement member connected to the damper contact part to support the damper contact part,
wherein, in a state where the contact end contacts a first surface of the damper contact part, the damper is pressed by the hinge assembly, and wherein the reinforcement member is connected to a second surface of the damper contact part opposite the first surface.

20. A refrigerator comprising:

a cabinet having a storage compartment;

a door configured to open and close the storage compartment;

a hinge assembly configured to rotatably connect the door to the cabinet; and a damper provided on the door and configured to move in association with a rotation of the door, the damper being configured to generate a damping force by contacting the hinge assembly or the cabinet as the door is rotated towards a closed position, and the damper including a contact end at a first side of the damper, wherein the hinge assembly includes:

a damper contact part configured to contact the contact end as the door is rotated towards the closed position;

a reinforcement member connected to the damper contact part to support the damper contact part;

a hinge fixed to the cabinet, the hinge being connected to the door; and a hinge case configured to accommodate at least a portion of the hinge, the hinge case being connected to the hinge or the cabinet, wherein the damper contact part is located at the hinge case, wherein the damper contacts the damper contact part from outside the hinge case, and wherein the reinforcement member is located in the hinge case.

* * * * *